US012769663B2

(12) United States Patent
Gholkar et al.

(10) Patent No.: US 12,769,663 B2
(45) Date of Patent: Oct. 20, 2026

(54) COHERENCY BYPASS TAGGING FOR READ-SHARED DATA

(71) Applicant: Intel Corporation, Santa Clara, CA (US)

(72) Inventors: Neha Gholkar, Sunnyvale, CA (US); Akhilesh Kumar, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/084,054

(22) Filed: Dec. 19, 2022

(65) Prior Publication Data

US 2024/0202125 A1 Jun. 20, 2024

(51) Int. Cl.

*G06F 12/00* (2006.01)
*G06F 12/0817* (2016.01)
*G06F 12/084* (2016.01)
*G06F 12/0891* (2016.01)

(52) U.S. Cl.

CPC .......... *G06F 12/084* (2013.01); *G06F 12/082* (2013.01); *G06F 12/0891* (2013.01)

(58) Field of Classification Search

CPC .. G06F 12/084; G06F 12/082; G06F 12/0891; G06F 12/0837; G06F 12/0815; G06F 12/0888; G06F 2212/1008; G06F 2212/1016; G06F 2212/502; G06F 12/0811; G06F 2212/1024

See application file for complete search history.

(56) References Cited

U.S. PATENT DOCUMENTS

| | | | | |
|---|---|---|---|---|
| 2017/0337136 | A1* | 11/2017 | Basu | G06F 12/0837 |
| 2018/0165196 | A1* | 6/2018 | Bernat | G06F 13/1663 |
| 2019/0004801 | A1* | 1/2019 | Haber | G06F 9/30036 |
| 2021/0209023 | A1* | 7/2021 | Gabor | G06F 12/0811 |
| 2022/0019534 | A1* | 1/2022 | Turner | G06F 12/0831 |

* cited by examiner

*Primary Examiner* — Arvind Talukdar

(74) *Attorney, Agent, or Firm* — Essential Patents Group, LLP

(57) ABSTRACT

An example of an apparatus may include memory, two or more caches, and circuitry coupled to the memory and the two or more caches to selectively maintain coherency of data shared among the memory and the two or more caches based on coherency bypass information associated with the data. Other examples are disclosed and claimed.

11 Claims, 29 Drawing Sheets

120

```
//malloc allocates memory and returns a mutable pointer to memory
 mutable_ptr = malloc(PSIZE);

//read Matrix_P from a file and writes to *mutable_ptr
 fread(mutable_ptr, PSIZE, 1, MatrixP);
```

Mutable Scope

```
//TRANSITION: MUTATION -> IMMUTABLE
 immutable_ptr = FREEZE(mutable_ptr, PSIZE)

/* MATRIX_P is widely shared across threads/cores via immutable_ptr*/
    #pragma openmp for
    for(i=0; i<ASIZE; i++)
        for(j=0;j<PSIZE;j++)
            A[i] += A[j]*immutable_ptr[j]
```

Immutable Scope
bypass coherency
for immutable_ptr

```
/*To Update Matrix_P*/
//TRANSITIONAL:IMMUTABLE -> MUTABLE
 mutable_ptr = UNFREEZE(immutable_ptr, PSIZE)

/* MATRIX_P is updated via mutable_ptr*/
    #pragma openmp for
    for(i=0; i<PSIZE; i++)
        mutable_ptr[i] = A[i]/N
```

Mutable Scope

FIG. 2F

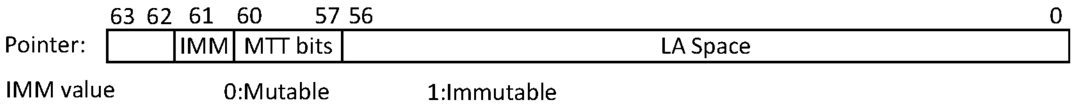

FIG. 3A

On each alloc call (e.g. on char *ptr = malloc_imm(40, IMM))

- Software calls *malloc library* implementation:

malloc

- *p* = alloc num_bytes from heap
  - Set *IMM* for every nB in *p* Choose *metadata value (to be used for the whole block)*
  - return *p* ^ (*IMM*<<61)

On each load/store

- Hardware performs ld/st in parallel to metadata checking
  *(match metadata value embedded in ptr(61) to that of memory (in metadata table) or LLC/SF bit)*

FIG. 3B

300

| Encoding | Mnemonic |
|---|---|
| 00H | Uncacheable (UC) |
| 01H | Write Combining (WC) |
| 02H | Immutable |
| 03H | Reserved |
| 04H | Write Through (WT) |
| 05H | Write Protected (WP) |
| 06H | Write Back (WB) |
| 07H | Uncached(UC-) |
| 08H-FFH | Reserved |

FIG. 3C

COHERENCY BYPASS TAGGING FOR READ-SHARED DATA

BACKGROUND

In high-performance multi-processor systems, each processor may have a local cache for each processor and memory that is shared among the processors. Accordingly, multiple copies of shared data may be present in the system with one copy in the shared memory and other copies in the local cache of different processors. Cache coherence refers to method to ensure that changes in the shared data are propagated to all processors and their local caches in the system. There is an ongoing need for improved computational devices to enable ever increasing demand for modeling complex systems, providing reduced computation times, and reduce power consumption. In particular, there is an ongoing desire to increase number of processors, include data processing and communication accelerators, improve caches with larger capacity and bandwidth, multiple levels of caches to reduce latency and power, and improved memory bandwidth to support demands of high-performance multi-processor systems. With increasing number of caches and their sizes, the overhead to maintain cache coherency in terms of the directory and snoop filter structures required as well as messages exchanged keeps increasing. This overhead results in higher cost due to area of the structures required, higher power to keep these structures active and exchange messages, and performance impact due to limited power and bandwidth spent on maintaining cache coherency. Such improvements may become critical as the desire to improve computational performance and efficiency become even more prevalent.

BRIEF DESCRIPTION OF DRAWINGS

Various examples in accordance with the present disclosure will be described with reference to the drawings, in which:

FIG. 2F is an illustrative diagram of an example of pseudo-code for a workload in one implementation.

FIG. 3A is an illustrative diagram of an example of linear address masking (LAM) for a pointer in one implementation.

FIG. 3B is an illustrative diagram of an example of pseudo-code for a selective coherency bypass in one implementation.

FIG. 3C is an illustrative diagram of an example of table of memory type encoding in one implementation

DETAILED DESCRIPTION

Figure 1:
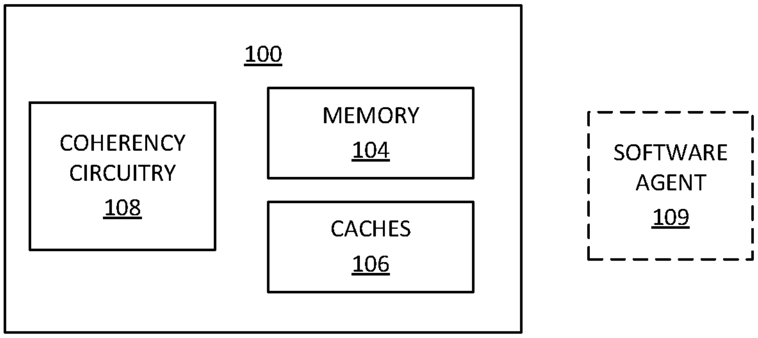
FIG. 1 is a block diagram of an example of an integrated circuit that includes selective coherency bypass technology in one implementation.

The present disclosure relates to methods, apparatus, systems, and non-transitory computer-readable storage media for coherency bypass tagging for read-shared data. According to some examples, the technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including integrated circuitry which is operable to tag read-shared data for coherency bypass.

In the following description, numerous details are discussed to provide a more thorough explanation of the examples of the present disclosure. It will be apparent to one skilled in the art, however, that examples of the present disclosure may be practiced without these specific details. In other instances, well-known structures and devices are shown in block diagram form, rather than in detail, in order to avoid obscuring examples of the present disclosure.

Note that in the corresponding drawings of the examples, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary examples to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—e.g. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the examples described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

A shared-memory multiprocessor system may refer to an architecture that includes multiple processors or cores, all of which directly access all the main memory in the system. The architecture may permit any of the cores to access data that any of the other processors has created or will use. An interconnection network may directly connect all the cores to the shared memories. In some implementations, the system needs to retain cache coherence across all caches of all processors in the system.

A caching hierarchy may be implemented with core-local caches (e.g., level 1 (L1), level 2 (L2)) at lower levels and shared caches such as a last level cache (LLC) at higher levels. Copies of data may reside in multiple core-local caches simultaneously. Coherency mechanisms ensure that any changes in the values of shared data are propagated correctly throughout the system. The coherency mechanisms may rely on a combination of structures such as the shared LLC cache, a directory-based structure, a snoop filter (SF), etc. to inclusively track metadata for addresses or cache blocks residing in core-local caches. The metadata may include coherency state information, sharer information, etc. The LLC may also maintain a data copy in addition to the metadata. The trackers in the LLC and the SF may be useful for the functional correctness of the coherency flows. Accordingly, a coherency mechanism may implement coherency flows that force local caches to invalidate/evict/flush addresses that are evicted out of the tracking structures, SF, and LLC (e.g., due to capacity limitations, cache or memory policies, etc.).

One problem with conventional coherency mechanisms involves power consumption. On eviction from the LLC/SF, the LLC/SF may send coherency requests over the interconnect to the local caches. Subsequently, the LLC/SF may receive responses from the local caches. The movement of coherency traffic over the interconnect and processing the various requests consumes power.

Another problem with conventional coherency mechanisms involves circuit area overhead. Invalidation requests for addresses that are in a shared state may be broadcasted to all local caches. The coherency traffic has high power, bandwidth, and performance impacts. To reduce such impacts, some implementations may limit coherency traffic by tracking the owner and all the sharers of data in the LLC/SF. One approach is to track all sharers precisely with one (1) bit per core per LLC/SF entry in the LLC/SF. The precise-tracking approach has high circuit area overheads due to the extra bits. A more coarse-grain sharer tracking approach clusters sharers and tracks the sharers with one (1) bit per cluster. While the coarser tracking approach helps to track all sharers with lower circuit area overheads, the coarser-tracking results in redundant coherency traffic targeted towards non-sharer local caches in a tagged cluster. In addition to the redundant traffic, message buffers are needed in the LLC/SF/local caching agents to buffer coherency requests and responses while the requests/responses are waiting to be sent or processed, respectively.

Another problem with conventional coherency mechanisms involves performance overhead. Processing coherency requests takes a portion of the recipient (LLC/SF/L2) bandwidth. Sending coherency-related messages over an on-chip interconnect also consumes interconnect bandwidth. The bandwidth utilized for coherency degrades the performance of bandwidth sensitive workloads that may have benefitted from additional bandwidth at various levels.

The various problems with conventional coherency mechanisms may scale proportionately with increasing core counts and workload data sizes in data intensive workloads such as machine learning, artificial intelligence, high fidelity physical simulations, visualization, etc. Some examples described herein overcome one or more of the foregoing problems. Some examples may address the complexity and overheads of maintaining cache coherence. Without being limited to theory of operations, some examples may leverage an observation that most of the data stored in memory and caches are either read-only or updated infrequently. Typical coherency mechanism makes the worst-case assumption that any data is modifiable, which may be true over a long period of time, but putting enormous resources to track copies of data in multiple cache at all times is very wasteful. Some examples may allow software or hardware to identify execution phases where a data object is read-only and thus can bypass coherency, and activate coherency during phases when data objects can be updated. Some examples may provide a mechanism for software or hardware identify and convey when coherency tracking can be bypassed and when coherency tracking is needed to make data updates visible quickly to other compute agents.

Some examples provide coherency bypass tagging (CBT) technology. Some coherency overhead may be redundant for shared data that is not expected to be modified (which may be referred to interchangeably as shared read-only data or read-shared data). Such shared data that is not expected to be modified may be referred to herein as immutable data. Some examples may implement CBT technology with immutable data tagging (IDT) to improve performance by mitigating coherency overheads for widely-shared data. For example, CBT technology may utilize IDT to identify immutable data, tag the immutable data, and bypass various coherency mechanisms for the data tagged as immutable data to conserve coherency resources and to redirect coherency resources to where the resources are most effective.

In some examples, IDT may include technology that allows software to provide hints about data immutability to the hardware so that the hardware can bypass coherency flows for the immutable data identified by software. The software hints may help to reduce overall coherency overhead. Some examples may additionally or alternatively include a microarchitectural approach of automatically tagging immutable data in hardware by monitoring data sharing patterns (e.g., without relying on any hints from the software). In some examples, IDT may further include technology to support modifications to the immutable data by dynamically transitioning the data from an immutable state to a mutable (e.g., coherent) state on demand when the otherwise immutable data needs to be modified. After the modification is complete, the modified data may then be transitioned back to the immutable state to benefit from relaxed coherency support. In some examples, the CBT technology described herein is not a replacement of the other coherency mechanisms deployed in various implementations. Instead, the various examples of CBT technology described herein provide complimentary technology to reduce stress on the utilized coherency mechanisms.

A wide variety of applications may benefit from CBT technology to bypass coherency overheads and release the coherency tracking, interconnect and agent bandwidth, and energy resources so that the coherency mechanisms can be used more effectively where coherency is required. For example, shared data structures are utilized in wide variety of parallel applications. The size of such shared data structures may be relatively large for scientific applications and workloads. Non-limiting examples of such applications/workloads include high performance computing (HPC), machine learning (e.g., models, weights & coefficients in training and inference workloads, embedded tables in recommendation systems, etc.), properties of some Livermore unstructured Lagrange explicit shock hydrodynamics (LULESH) kernels, genomics (e.g., reference genome data), and code footprints for parallel applications (e.g., instructions).

Examples of IDT allows data to be tagged as immutable data in the hardware so that the hardware can bypass coherency flows for the data tagged as immutable data. For example, the hardware may quash invalidation requests when immutable data is evicted from the LLC/SF. As used herein, a quashed invalidation request/response may refer to suppressing the operation entirely (e.g., no request/response messages are sent), bypassing the invalidation operation, ignoring the invalidation operation, skipping the invalidation operation, etc. The quashed invalidation requests/responses reduce or eliminate invalidation traffic (e.g., requests and responses) for immutable data and may advantageously provide bandwidth and power savings. The quashed invalidation requests/responses may also free up resources (e.g., including but not limited to message buffers and queues) that can be used elsewhere where the resources may be more effective. As fewer invalidation messages are exchanged, a recipient's (e.g., LLC/L2/SF) bandwidth is freed up and the extra bandwidth may be utilized for other performance critical tasks. Advantageously, some examples of CBT technology may reduce or eliminate redundant coherency overheads for mostly shared data and ensure that coherency resources are used more effectively where the coherency resources are required (e.g., for frequently modified data). In some implementations, a processor may advantageously achieve higher performance for data intensive workloads such as machine learning, artificial intelligence, high fidelity physical simulations and visualization.

With reference to FIG. 1, an example of an integrated circuit 100 may include a memory 104, two or more caches 106, and coherency circuitry 108 coupled to the memory 104 and the two or more caches 106 to selectively maintain coherency of data shared among the memory 104 and the two or more caches 106 based on coherency bypass information associated with the data. For example, the circuitry 108 may be configured to bypass a coherency operation for a copy of data stored in one of the two or more caches 106 based on a value of a tag associated with the copy of data. In some examples, the circuitry 108 may be further configured to evict a first instance of the copy of data from a first cache (e.g., a LLC) of the two or more caches 106 in response to an eviction request, and quash an invalidation request for a second instance of the copy of data from a second cache of the two or more caches 106 in response to the eviction request if the value of a tag associated with the first instance of the copy of data indicates that the coherency operation is to be bypassed. The circuitry 108 may also be configured to maintain a ghost copy of the second instance of the copy of data in the second cache in accordance with a local cache policy of the second cache, after the first instance is evicted from the first cache.

In some implementations, the circuitry 108 may also be configured to determine if a copy of data to be stored in one of the two or more caches 106 is a candidate for coherency bypass, and set the value of a tag associated with the copy of data based on the determination. For example, the circuitry 108 may be configured to determine if the copy of data is a candidate for coherency bypass based on a hint from a software agent 109 (e.g., the software agent 109 is not part of the integrated circuit 100, and may be transient in nature).

Additionally, or alternatively, the circuitry 108 may be configured to determine if the copy of data is a candidate for coherency bypass based on a hardware indication of whether the copy of data is read-shared among the two or more caches 106. For example, the circuitry 108 may be further configured to monitor a pattern of hardware access for the copy of data, and determine if the copy of data is a candidate for coherency bypass based on the monitored pattern. In some examples, the circuitry 108 may be configured to set the value of the tag associated with the copy of data to indicate that a coherency operation is to be bypassed if the monitored pattern indicates that the copy of data is read-shared among the two or more caches 106.

In some implementations, the circuitry 108 may also be configured to transition respective states of all instances of a copy of data to selectively maintain coherency based on a hint from the software agent 109. For example, the circuitry 108 may be configured to determine if a value of a tag associated with a copy of data to be modified indicates that the coherency operation is to be bypassed, and transition respective states of all instances of the copy of data to indicates that coherency is to be maintained for all instances of the copy of data to be modified.

Figure 27:
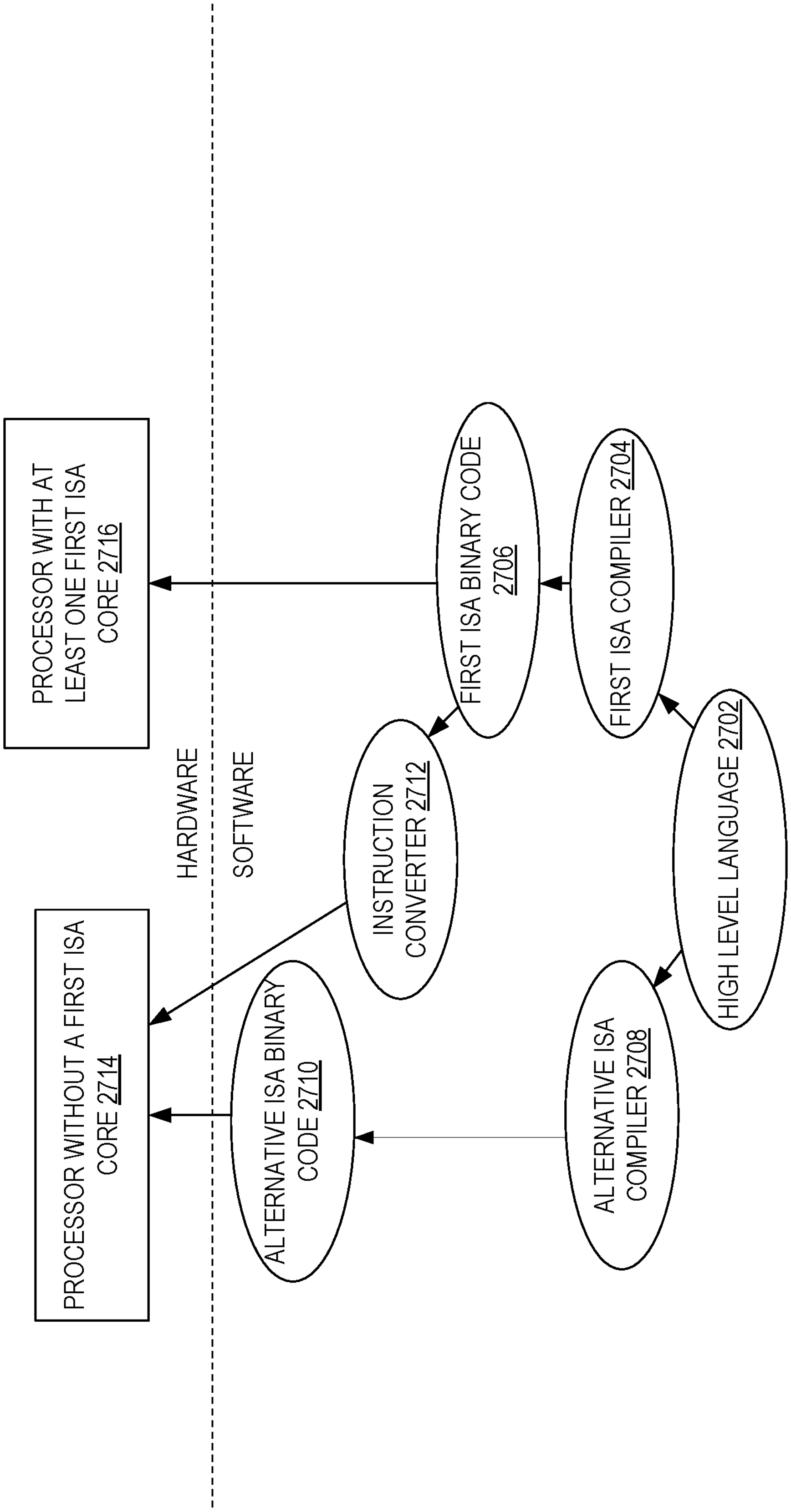
FIG. 27 is a block diagram illustrating the use of a software instruction converter to convert binary instructions in a source instruction set architecture to binary instructions in a target instruction set architecture according to examples.

For example, the memory 104, the caches 106, and/or the circuitry 108 may be implemented/integrated/incorporated as/with/in any of the systems, processors, and controllers/agents described herein. In particular, the memory 104, the caches 106, and/or the circuitry 108 may be implemented by, integrated with, and/or incorporated in the processor 400 and/or the cache agent 412 (FIGS. 4 to 7), the cache home agent 800 and/or cache controller 840 (FIG. 8), the System on a Chip (SoC) 900 and/or the system agent unit 910 (FIG. 9), the system 1000 and/or the hub 1015 (FIG. 10), the server 1100 (FIG. 11), the core 1200 (FIG. 12), the multiprocessor system 1600, the processor 1670, the processor 1615, the coprocessor 1638, and/or the processor/coprocessor 1680 (FIG. 16), the processor 1700 (FIG. 17), the core 1890 (FIG. 18B), the execution units 1862 (FIGS. 18B and 19), and the processor 2116 (FIG. 27).

As noted above, an example of data that may be a suitable candidate for coherency bypass includes shared data that is not expected to be modified (e.g., read-shared data), nominally referred to herein as immutable data. Examples of IDT include technology to tag infrequently modified shared data as immutable data. The coherency mechanisms then check for data tagged as immutable data to selectively bypass coherency overheads. Some examples provide an interface that allows users to tag data structures as immutable. For example, IDT-specific load instructions, memory allocation, de-allocation, and referencing mechanisms, and/or pointer morphing mechanisms may be utilized to provide hints to the hardware for tagging immutable data. Some implementations may additionally or alternatively provide technology for software defined coherency, IDT-specific memory types optimized for read-only data, or CBT/IDT instructions for shared data accesses.

Figure 2A:
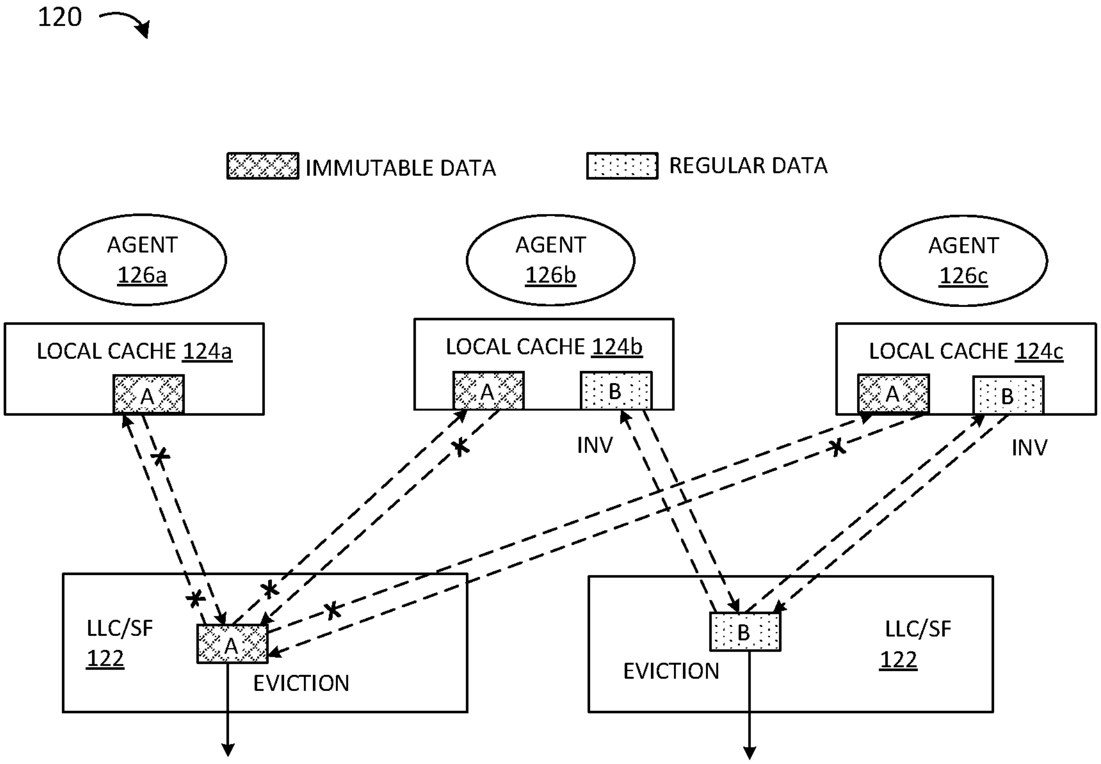
FIGS. 2A to 2D are illustrative diagrams of examples of various coherency flows that support immutable data tagging (IDT) in one implementation.

FIGS. 2A to 2D show examples of various coherency flows that support IDT. A system 120 includes LLC/SF 122 and local caches 124*a-c*. In this example, data A is shared across agents 126*a-c* and is not modified over its lifetime. The data A is considered immutable data and is a candidate for IDT. Accordingly, data A gets tagged as immutable data. In this example, data B is regular data that is expected to be modified by one or more agents 126*a-c*. Accordingly, data B is considered mutable. As shown in FIG. 2A, copies of data A and data B are resident in LLC/SF 122 and various of the local caches 124*a-c*. When the data B is evicted from the LLC/SF 122, the LLC/SF 122 sends invalidation requests (e.g., as depicted by the dashed lines) to the local caches 124*a-c* per any suitable coherency flow. When the data A is evicted from the LLC/SF 122, because the data A is tagged as immutable data, invalidation requests for the data A from the LLC/SF 122 are quashed (e.g., as depicted by an X through the dashed line). Quashing the invalidation requests for data tagged as immutable data leads to fewer coherency requests and responses over the interconnect saving energy, bandwidth, and coherency resources.

Figure 2B:
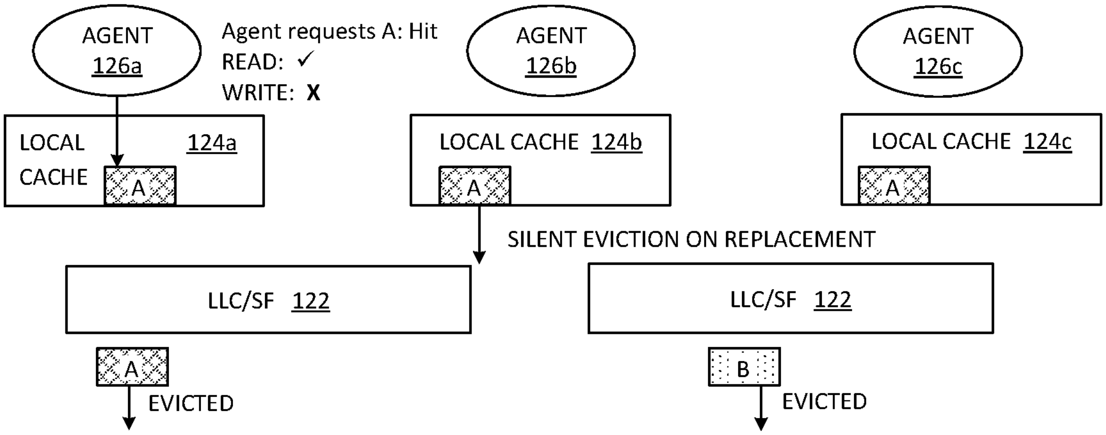

As a result of quashing invalidation requests for the data A, as shown in FIG. 2B, ghosted copies (e.g., copies in local caches 124*a-c* without corresponding copies in LLC/SF 122) of data A persist in local caches 124*a-c* even after data A is evicted out of LLC/SF 122. However, data B's copies that are invalidated on data B's eviction per the coherency mechanism are no longer validly present in the LLC/SF 122 or the local caches 124*a-c*.

After eviction from LLC/SF 122, immutable data A is not tracked in the LLC/SF 122. LLC/SF 122 has no corresponding metadata required by coherency flows to support writes to data A in the local caches 124*a-c*. Accordingly, writes to data A may be treated as exceptions or failures but reads of data A are allowed, as shown in FIG. 2B. Advantageously, read transactions for ghosted copies of immutable data that hit in the local caches 124*a-c* may complete from the local caches 124*a-c* without accessing main memory. However, write transactions that attempt to modify data tagged as immutable are prohibited because immutable data is excluded from coherency coverage.

Figure 2C:
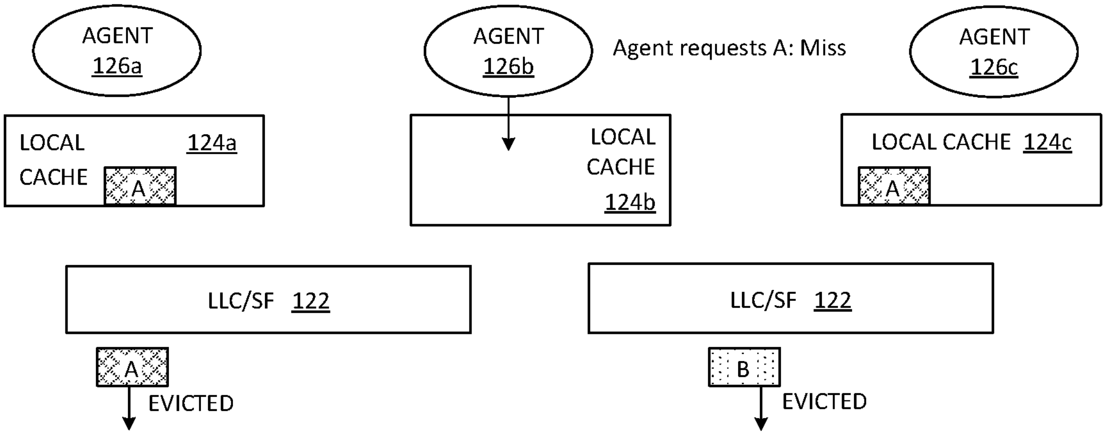
Figure 2D:
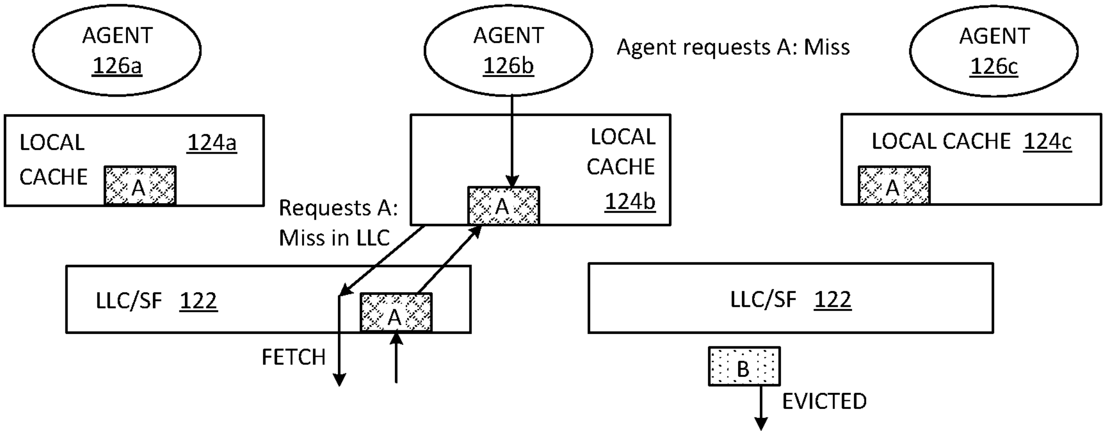

Copies of data A in the local caches 124*a-c* may be silently dropped on allocation (e.g., in accordance with a local replacement policy), as shown in FIG. 2B. Subsequently, if the local agent 126*b* requests data A, the request misses in the local cache 124*b*, as shown in FIG. 2C. The miss triggers a request to the LLC where another miss triggers a fetch and the data A is brought in from main memory to the LLC/SF 122 with a local copy of data A brought into the local cache 124*b* from the LLC/SF 122, as shown in FIG. 2D.

While some data structures may be read-shared throughout their lifetime, some data structures may undergo infrequent transitions or modifications. For example, weight matrices in training workloads are read-shared during an epoch but the weight matrices are updated periodically at epoch boundaries to correct the error in the model iteratively. To support such infrequent modifications to shared data, some examples provide technology for dynamic on-demand transitioning data from an immutable state to a mutable state to provide suitable coherency flows when the data is to be modified.

Figure 2E:
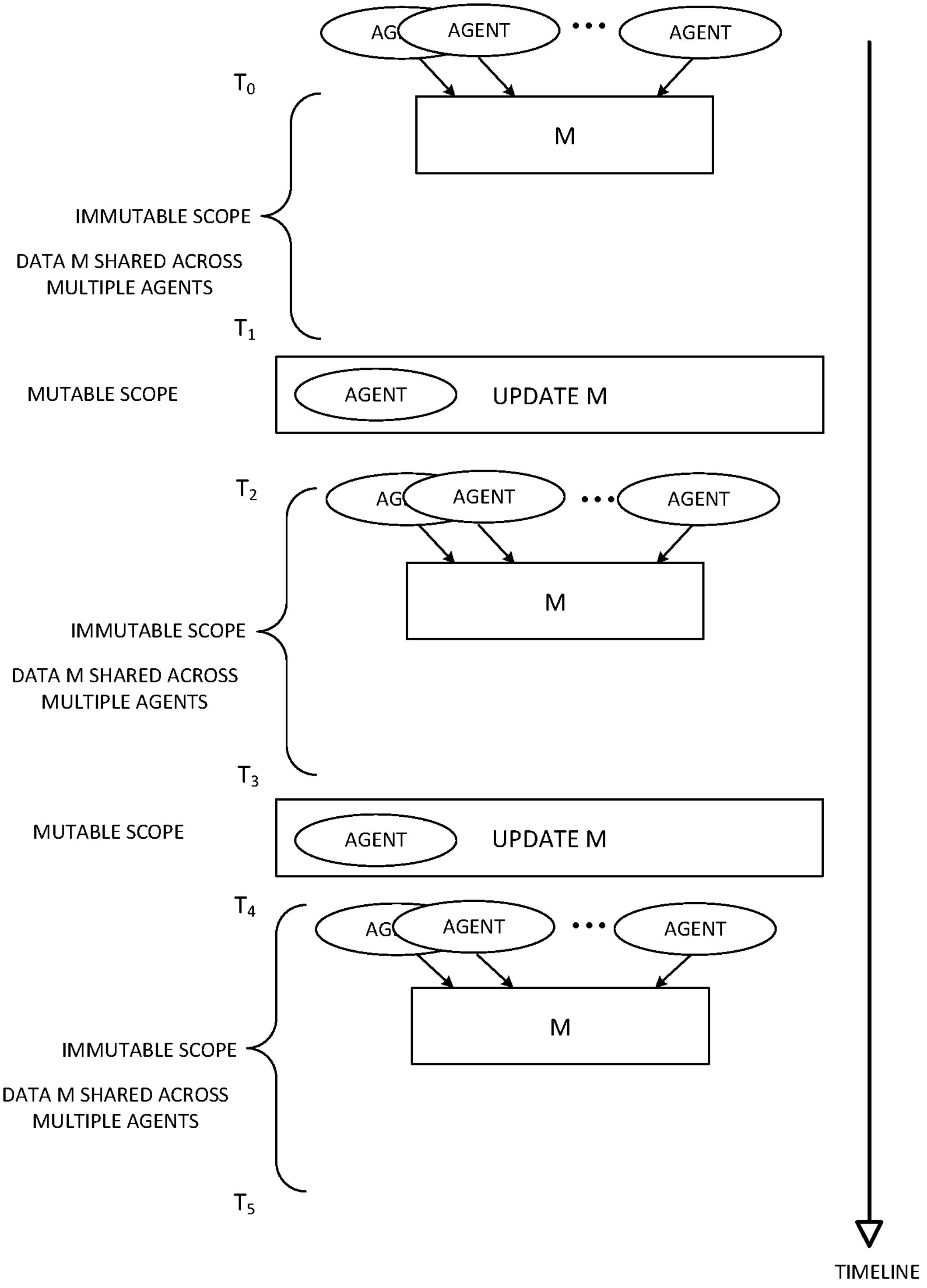
FIG. 2E is an illustrative diagram of an example of a timeline of a workload in one implementation.

FIG. 2E shows an example timeline of a workload where data M goes through infrequent transitions (e.g., indicated by agent updates between times T1-T2 and T3-T4). The data M is shared across multiple agents from T0 to T1. The data M is then updated between times T1-T2. The updated data M is again shared across multiple agents from T2 to T3, and so on. An immutable scope may refer to regions where the data M is not modified (e.g., scopes TO-T1, T2-T3, T4-T5) and the data M is read-shared across agents. A mutable scope may refer to regions where the data M can be modified (e.g., scopes T1-T2, T4-T5). In some example, suitable policies may be applied to enforce suitable scope rules. For example, bypass coherency for immutable data may be available within immutable scopes. Suitable coherency mechanisms may be utilized in mutable scopes to support data modifications.

Example implementations for IDT include software managed tagging and hardware managed tagging. Some implementations may utilize only software managed tagging or hardware managed tagging. Some implementations may utilize both software managed tagging and hardware managed tagging.

Examples of software managed tagging may utilize input from a user (e.g., a domain expert, an application developer, etc.) to identify suitable shared data for IDT. For example, in machine learning training workloads, weight matrices are widely shared data structures that are known by the user to be modified only at epoch boundaries. In this case, a developer may annotate the allocation of such a data structure to indicate that the data structure is a candidate for IDT.

In some examples, software may provide IDT hints to hardware through registers, tables, or other data structures accessible by the hardware. For example, Linear Address Masking (LAM), page table attributes, model specific registers (MSRs), or other similar mechanisms may be utilized by software to provide IDT hints to the hardware. The IDT hints may be extracted by the hardware and stored (e.g., in memory as tags, metadata, etc.) to disallow any address aliasing to immutable data. In some examples, IDT instructions may be utilized to access immutable data. A tag/metadata mismatch while accessing the data raises an exception.

In some examples, software may be responsible for triggering dynamic mutable to immutable, and vice versa, scope transitions. Selective cache flushes on immutable data tag changes may be needed at scope boundaries. In one example process, a mutable to immutable scope transition may need to flush modified data from caches, to invalidate shared data, and to flush translation-look-aside buffer (TLB) entries. In another example process, an immutable to mutable scope transition may need to invalidate ghosted data from caches and to invalidate TLB entries.

In some examples, instructions may be provided to perform the tasks that need to be completed at scope boundaries. For example an instruction "ptr*FREEZE(mutable_ptr, SIZE)" may support the mutable to immutable scope transition, while another instruction "ptr*UNFREEZE(immutable_ptr, SIZE)" may support the immutable to mutable scope transition, where the first operand (mutable_ptr, immutable_ptr) is a pointer to the data of a size indicated by the second operand (SIZE). For example, the FREEZE instruction may perform tasks such as flushing modified data from caches, invalidating shared data, flushing TLB entries, and changing the tag from mutable to immutable. For example, the UNFREEZE instruction may perform tasks such as invalidating ghosted data from caches, invaliding TLB entries, and changing the tag from mutable to immutable.

FIG. 2F shows an example of pseudo-code for a workload with dynamic scope transitions. During a mutable scope, memory of size PSIZE is allocated and the location of the memory is stored in mutable_ptr. A matrix P is read from a file and written to the memory location pointed to by mutable_ptr. Any further modifications to the matrix P may be made during the mutable scope. Then the workload transitions the matrix P to an immutable scope by calling the FREEZE instruction, returning a pointer immutable_ptr to the immutable data. The immutable data of the matrix P may then be widely shared as needed across threads/cores/etc. via immutable_ptr. During the immutable scope, coherency is bypassed for the matrix P, advantageously reducing coherency traffic and improving performance. If/when the matrix P needs to be updated, the workload may transition the matrix P to a mutable scope by calling the UNFREEZE instruction, returning a new value for mutable_ptr. Thereafter, during the mutable scope, the matrix P may be updated as needed while maintaining coherency for the mutable data of the matrix P.

Examples of software managed tagging may be implemented at any suitable granularity such as cache line granularity, page granularity, etc. In one example of software managed tagging at a cacheline granularity, utilization of LAM allows software to make use of untranslated address bits of 64-bit linear addresses for metadata. FIG. 3A shows an example of LAM for a pointer where pointer metadata is stored in the linear address bits (e.g., in a LAM region). One bit of the pointer metadata may be reserved to store an immutability tag. In the illustrated example, bit positions zero through 56 hold the address for the linear address (LA) space, bit positions 57 through 60 hold values for other memory tagging technology (MTT) bits, and bit position 61 holds a value of an immutability (IMM) tag. In this example, a value of 0 in the IMM bit indicates that the data pointed to by the pointer is to be treated as mutable and a value of 1 in the IMM bit indicates that the data pointed to by the pointer is to be treated as immutable.

FIG. 3B shows an example of application usage pseudocode (e.g., with C/C++ heap protection). In one example, application allocates memory with immutability tag bit set in the linear address bit 61. This tag bit is checked on every load or store instruction to verify if the operation is consistent with IMM bit for the memory location. A load is allowed to proceed in either case, but store causes an exception if IMM bit is set indicating that it is an immutable memory address that cannot be updated.

In one example of software managed tagging at a page granularity, page information may be utilized to tag pages for coherency bypass. A system may support a variety of memory types. A page attribute may include a memory type encoding to indicate the type of memory associated with the pages. In some examples, one of the supported memory types may be defined as immutable memory. FIG. 3C shows an example table 600 of memory type encoding values and memory types associated with each encoding value. In some example, page information associated with each page, such as the memory type encoding, may be utilized to tag pages for coherency bypass.

In some example, a page attribute table (PAT) may refer to a table of supported attributes that can be assigned to pages. The PAT may be programmed by hardware configuration registers or MSRs (e.g., an IA32_CR_PAT MSR for some INTEL processors). An example PAT MSR may contain eight page attribute fields (e.g., PA0 through PA7) where the three low-order bits of each page attribute field are used to specify a memory type. For example, each of the eight page attribute fields may contain any of the memory type encodings indicated in the table 300 (FIG. 3C). Each page table entry (PTE) may include three bits to index into the PAT MSR to indicate the page attribute field associated with the PTE. The memory type encoding stored in the indicated page attribute field in the PAT MSR maps to a memory type. Software can tag data as immutable at a page granularity by setting the appropriate three index bits in the relevant PTE to point to an immutable memory type for mostly shared data. In some examples, to select a memory type for a page from the PAT, the three bit index may be made up of a PAT-index flag bit, a page-level cache-disable (PCD) flag bit, and a page-level write-through (PWT) flag bit. The three bits may be encoded in the PTE (e.g., or a page-directory entry) for the page. In this example, software may set those three bits to select an appropriate page attribute field in the PAT MSR that corresponds to the MSR entry with the memory type encoding for the immutable memory type (e.g., 02H).

Cache line granularity may allow fine grained control over immutable data tagging because the granularity is not bound to page boundaries. However, one bit per cache line (e.g., 1b per 64 Bytes) is needed to store the immutable data tag metadata. Tagging immutable data at the page table allows immutability tracking at a page granularity (e.g., 4K). While the overhead of storing metadata at the coarser granularity is smaller, the lower storage overhead comes at the cost of higher overheads of invalidations on scope transitions and the limitation of tagging only at page granularity. Some examples may utilize a hybrid combination of software tagging at a page granularity when the entire page is uniformly tagged as mutable or immutable, while utilizing software tagging at a cache line granularity when a page consists of one or more islands of immutable data.

Examples of hardware managed tagging may utilize autonomous heuristics-based technology that leverages sharing info at the LLC/SF to automatically tag lines in other caches and immutable and track the line attributes using the LLC/SF and directory state (e.g., without relying on software or the domain expert to provide hints about immutable data). Some examples may implement hardware managed tagging at a cache line granularity. Widely shared cache lines may be identified as candidates for IDT. For example, the LLC/SF sharing info may be monitored to identify when a cache line transitions from a single owner to a potentially multi-sharer line within a socket. For example, when a data read request from a core hits in the LLC and causes a cache line to be shared across two or more cores, the newly shared cache line becomes a candidate for IDT. Similarly, the directory state may be monitored to identify cache lines that are shared across sockets. An example of such a transition is when a data read request misses in the LLC but hits in the directory and the directory entry indicates that the cache line may be in a shared state in other sockets. Cache lines indicated to be shared by the directory entry may also become candidates for IDT. After a candidate for IDT is identified, a coherency tag associated with the candidate cache line is set to a value that indicates that coherency is to be bypassed for that cache line (e.g., zero for mutable; one for immutable). For example, the coherency tag for a cache line may be stored and tracked in the LLC/SF. The IDT metadata may also need to be stored in memory to avoid address aliasing. Accordingly, any updates to the metadata may incur memory write overheads. When data tagged as immutable is evicted out of the LLC/SF, invalidations are quashed. Any writes to data tagged by hardware as immutable transition that data to a mutable state. Such a transition triggers system-wide invalidation of ghost copies of the data from the system before modifying the data.

With ever increasing core counts of cache coherent systems, some examples may advantageously make coherency more efficient, reduce the overheads of conventional coherency techniques, and reduce power and performance bottlenecks due to invalidation traffic. Some examples advantageously reduce or eliminate coherency operations (e.g., invalidation requests/responses for read-shared data that is not expected to be modified frequently. Examples of IDT may advantageously reduce area, power, and/or performance overheads of coherency by quashing invalidations traffic for read-shared data. Some examples may conserve power and help to free up resources such as mesh/cache bandwidth and message buffer capacity so those resources may be redirected where the resources are most effective (e.g., for maintaining coherency of frequently modified data). Some examples further provide technology to transition between mutable and immutable scopes to support infrequent changes to the data structure to be able to impact practical workloads that may have infrequently transforming shared data access patterns.

Figure 4:
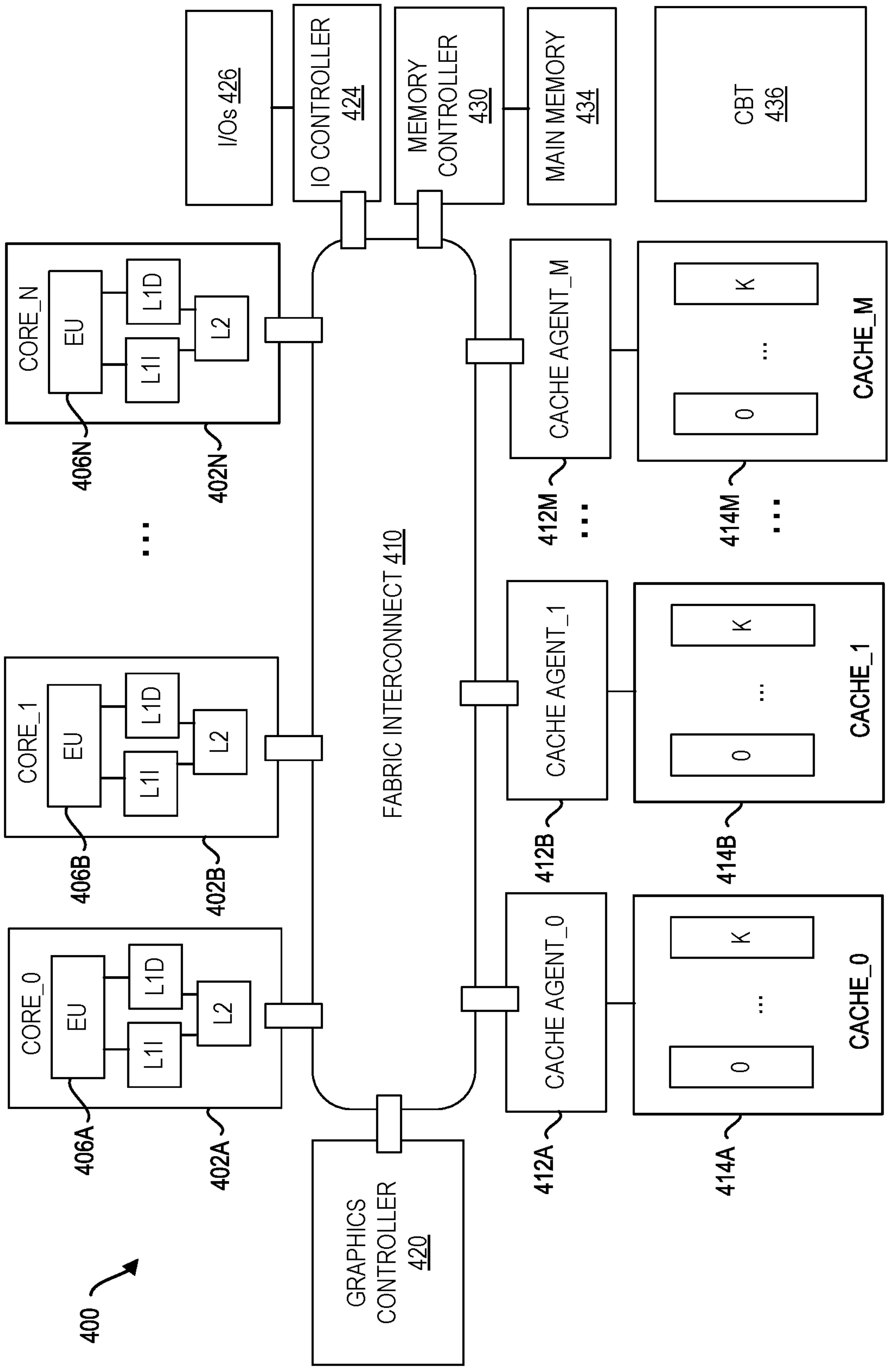
FIG. 4 is a block diagram of an example of a processor that includes multi-level cache selective coherency bypass technology in one implementation.

FIG. 4 is a block diagram of a processor 400 with a plurality of cache agents 412 and caches 414 in accordance with certain examples. In a particular example, processor 400 may be a single integrated circuit, though it is not limited thereto. The processor 400 may be part of a SoC in various examples. The processor 400 may include, for example, one or more cores 402A, 402B . . . 402N (collectively, cores 402). In a particular example, the cores 402 may include a corresponding execution unit (EU) 406A, 406B, or 406N, level one instruction (LII) cache, level one data cache (L1D), and level two (L2) cache. The processor 400 may further include one or more cache agents 412A, 412B . . . 412M (any of these cache agents may be referred to herein as cache agent 412), and corresponding caches 414A, 414B . . . 414M (any of these caches may be referred to as cache 414). In a particular example, a cache 414 is a last level cache (LLC) slice. An LLC may be made up of any suitable number of LLC slices. Each cache may include one or more banks of memory that corresponds (e.g., duplicates) data stored in system memory 434. The processor 400 may further include a fabric interconnect 410 comprising a communications bus (e.g., a ring or mesh network) through which the various components of the processor 400 connect. In one example, the processor 400 further includes a graphics controller 420, an IO controller 424, and a memory controller 430. The IO controller 424 may couple various IO devices 426 to components of the processor 400 through the fabric interconnect 410. Memory controller 430 manages memory transactions to and from system memory 434.

The processor 400 may be any type of processor, including a general-purpose microprocessor, special purpose processor, microcontroller, coprocessor, graphics processor, accelerator, field programmable gate array (FPGA), or other type of processor (e.g., any processor described herein). The processor 400 may include multiple threads and multiple execution cores, in any combination. In one example, the processor 400 is integrated in a single integrated circuit die having multiple hardware functional units (hereafter referred to as a multi-core system). The multi-core system may be a multi-core processor package, but may include other types of functional units in addition to processor cores. Functional hardware units may include processor cores, digital signal processors (DSP), image signal processors (ISP), graphics cores (also referred to as graphics units), voltage regulator (VR) phases, input/output (IO) interfaces (e.g., serial links, DDR memory channels) and associated controllers, network controllers, fabric controllers, or any combination thereof.

System memory 434 stores instructions and/or data that are to be interpreted, executed, and/or otherwise used by the cores 402A, 402B . . . 402N. The cores 402 may be coupled towards the system memory 434 via the fabric interconnect 410. In some examples, the system memory 434 has a dual-inline memory module (DIMM) form factor or other suitable form factor.

The system memory 434 may include any type of volatile and/or non-volatile memory. Non-volatile memory is a storage medium that does not require power to maintain the state of data stored by the medium. Nonlimiting examples of non-volatile memory may include any or a combination of: solid state memory (such as planar or three-dimensional (3D) NAND flash memory or NOR flash memory), 3D crosspoint memory, byte addressable nonvolatile memory devices, ferroelectric memory, silicon-oxide-nitride-oxide-silicon (SONOS) memory, polymer memory (e.g., ferroelectric polymer memory), ferroelectric transistor random access memory (Fe-TRAM) ovonic memory, nanowire memory, electrically erasable programmable read-only memory (EEPROM), a memristor, phase change memory, Spin Hall Effect Magnetic RAM (SHE-MRAM), Spin Transfer Torque Magnetic RAM (STTRAM), or other non-volatile memory devices.

Volatile memory is a storage medium that requires power to maintain the state of data stored by the medium. Examples of volatile memory may include various types of random access memory (RAM), such as dynamic random access memory (DRAM) or static random access memory (SRAM). One particular type of DRAM that may be used in a memory array is synchronous dynamic random access memory (SDRAM). In some examples, any portion of system memory 434 that is volatile memory can comply with JEDEC standards including but not limited to Double Data Rate (DDR) standards, e.g., DDR3, 4, and 5, or Low Power DDR4 (LPDDR4) as well as emerging standards.

A cache (e.g., cache 414) may include any type of volatile or non-volatile memory, including any of those listed above. Processor 400 is shown as having a multi-level cache architecture. In one example, the cache architecture includes an on-die or on-package L1 and L2 cache and an on-die or on-chip LLC (though in other examples the LLC may be off-die or off-chip) which may be shared among the cores 402A, 402B, . . . 402N, where requests from the cores are routed through the fabric interconnect 410 to a particular LLC slice (e.g., a particular cache 414) based on request address. Any number of cache configurations and cache sizes are contemplated. Depending on the architecture, the cache may be a single internal cache located on an integrated circuit or may be multiple levels of internal caches on the integrated circuit. Other examples include a combination of both internal and external caches depending on particular examples.

During operation, a core 402A, 402B . . . or 402N may send a memory request (read request or write request), via the L1 caches, to the L2 cache (and/or other mid-level cache positioned before the LLC). In one case, a memory controller 430 may intercept a read request from an L1 cache. If the read request hits the L2 cache, the L2 cache returns the data in the cache line that matches a tag lookup. If the read request misses the L2 cache, then the read request is forwarded to the LLC (or the next mid-level cache and eventually to the LLC if the read request misses the mid-level cache(s)). If the read request misses in the LLC, the data is retrieved from system memory 434. In another case, the cache agent 412 may intercept a write request from an L1 cache. If the write request hits the L2 cache after a tag lookup, then the cache agent 412 may perform an in-place write of the data in the cache line. If there is a miss, the cache agent 412 may create a read request to the LLC to bring in the data to the L2 cache. If there is a miss in the LLC, the data is retrieved from system memory 434. Various examples contemplate any number of caches and any suitable caching implementations.

A cache agent 412 may be associated with one or more processing elements (e.g., cores 402) and may process memory requests from these processing elements. In various examples, a cache agent 412 may also manage coherency between all of its associated processing elements. For example, a cache agent 412 may initiate transactions into coherent memory and may retain copies of data in its own cache structure. A cache agent 412 may also provide copies of coherent memory contents to other cache agents.

In various examples, a cache agent 412 may receive a memory request and route the request towards an entity that facilitates performance of the request. For example, if cache agent 412 of a processor receives a memory request specifying a memory address of a memory device (e.g., system memory 434) coupled to the processor, the cache agent 412 may route the request to a memory controller 430 that manages the particular memory device (e.g., in response to a determination that the data is not cached at processor 400. As another example, if the memory request specifies a memory address of a memory device that is on a different processor (but on the same computing node), the cache agent 412 may route the request to an inter-processor communication controller (e.g., controller 604 of FIG. 6) which communicates with the other processors of the node. As yet another example, if the memory request specifies a memory address of a memory device that is located on a different computing node, the cache agent 412 may route the request to a fabric controller (which communicates with other computing nodes via a network fabric such as an Ethernet fabric, an Intel® Omni-Path Fabric, an Intel® True Scale Fabric, an InfiniBand-based fabric (e.g., Infiniband Enhanced Data Rate fabric), a RapidIO fabric, or other suitable board-to-board or chassis-to-chassis interconnect).

In particular examples, the cache agent 412 may include a system address decoder that maps virtual memory addresses and/or physical memory addresses to entities associated with the memory addresses. For example, for a particular memory address (or region of addresses), the system address decoder may include an indication of the entity (e.g., memory device) that stores data at the particular address or an intermediate entity on the path to the entity that stores the data (e.g., a computing node, a processor, a memory controller, an inter-processor communication controller, a fabric controller, or other entity). When a cache agent 412 processes a memory request, it may consult the system address decoder to determine where to send the memory request.

In particular examples, a cache agent 412 may be a combined caching agent and home agent, referred to herein in as a caching home agent (CHA). A caching agent may include a cache pipeline and/or other logic that is associated with a corresponding portion of a cache memory, such as a distributed portion (e.g., 414) of a last level cache. Each individual cache agent 412 may interact with a corresponding LLC slice (e.g., cache 414). For example, cache agent 412A interacts with cache 414A, cache agent 412B interacts with cache 414B, and so on. A home agent may include a home agent pipeline and may be configured to protect a given portion of a memory such as a system memory 434 coupled to the processor. To enable communications with such memory, CHAs may be coupled to memory controller 430.

In general, a CHA may serve (via a caching agent) as the local coherence and cache controller and also serve (via a home agent) as a global coherence and memory controller interface. In an example, the CHAs may be part of a distributed design, wherein each of a plurality of distributed CHAs are each associated with one of the cores 402. Although in particular examples a cache agent 412 may comprise a cache controller and a home agent, in other examples, a cache agent 412 may comprise a cache controller but not a home agent.

Various examples of the present disclosure may provide CBT circuitry 436 for any suitable component of the processor 400 (e.g., a core 402, a cache agent 412, a memory controller 430, etc.) that allows the component to bypass coherency operations for the multiple levels of cache (e.g., L1, L2, LLC, etc.) in the entire end-to-end flow. Although the CBT circuitry 436 is shown as a separate module, one or more aspects of the CBT technology may be integrated with various components of the processor 400 (e.g., as part of the cache agents 412, as part of the cores 402, as part of the memory controller 430, etc.).

The bandwidth provided by a coherent fabric interconnect 410 (which may provide an external interface to a storage medium to store the captured trace) may allow lossless monitoring of the events associated with the caching agents 412. In various examples, the events at each cache agent 412 of a plurality of cache agents of a processor may be tracked. Accordingly, the CBT technology may selectively maintain coherency of data for a multi-level cache at runtime without requiring the processor 400 to be globally deterministic.

IO controller 424 may include logic for communicating data between processor 400 and IO devices 426, which may refer to any suitable devices capable of transferring data to and/or receiving data from an electronic system, such as processor 400. For example, an IO device may be a network fabric controller; an audio/video (A/V) device controller such as a graphics accelerator or audio controller; a data storage device controller, such as a flash memory device, magnetic storage disk, or optical storage disk controller; a wireless transceiver; a network processor; a network interface controller; or a controller for another input device such as a monitor, printer, mouse, keyboard, or scanner; or other suitable device.

An IO device 426 may communicate with IO controller 424 using any suitable signaling protocol, such as peripheral component interconnect (PCI), PCI Express (PCIe), Universal Serial Bus (USB), Serial Attached SCSI (SAS), Serial ATA (SATA), Fibre Channel (FC), IEEE 802.3, IEEE 802.11, or other current or future signaling protocol. In various examples, IO devices 426 coupled to the IO controller 424 may be located off-chip (e.g., not on the same integrated circuit or die as a processor) or may be integrated on the same integrated circuit or die as a processor.

Memory controller 430 is an integrated memory controller (e.g., it is integrated on the same die or integrated circuit as one or more cores 402 of the processor 400) that includes logic to control the flow of data going to and from system memory 434. Memory controller 430 may include logic operable to read from a system memory 434, write to a system memory 434, or to request other operations from a system memory 434. In various examples, memory controller 430 may receive write requests originating from cores 402 or IO controller 424 and may provide data specified in these requests to a system memory 434 for storage therein. Memory controller 430 may also read data from system memory 434 and provide the read data to IO controller 424 or a core 402. During operation, memory controller 430 may issue commands including one or more addresses (e.g., row and/or column addresses) of the system memory 434 in order to read data from or write data to memory (or to perform other operations). In some examples, memory controller 430 may be implemented in a different die or integrated circuit than that of cores 402.

Although not depicted, a computing system including processor 400 may use a battery, renewable energy converter (e.g., solar power or motion-based energy), and/or power supply outlet connector and associated system to receive power, a display to output data provided by processor 400, or a network interface allowing the processor 400 to communicate over a network. In various examples, the battery, power supply outlet connector, display, and/or network interface may be communicatively coupled to processor 400.

Figure 5:
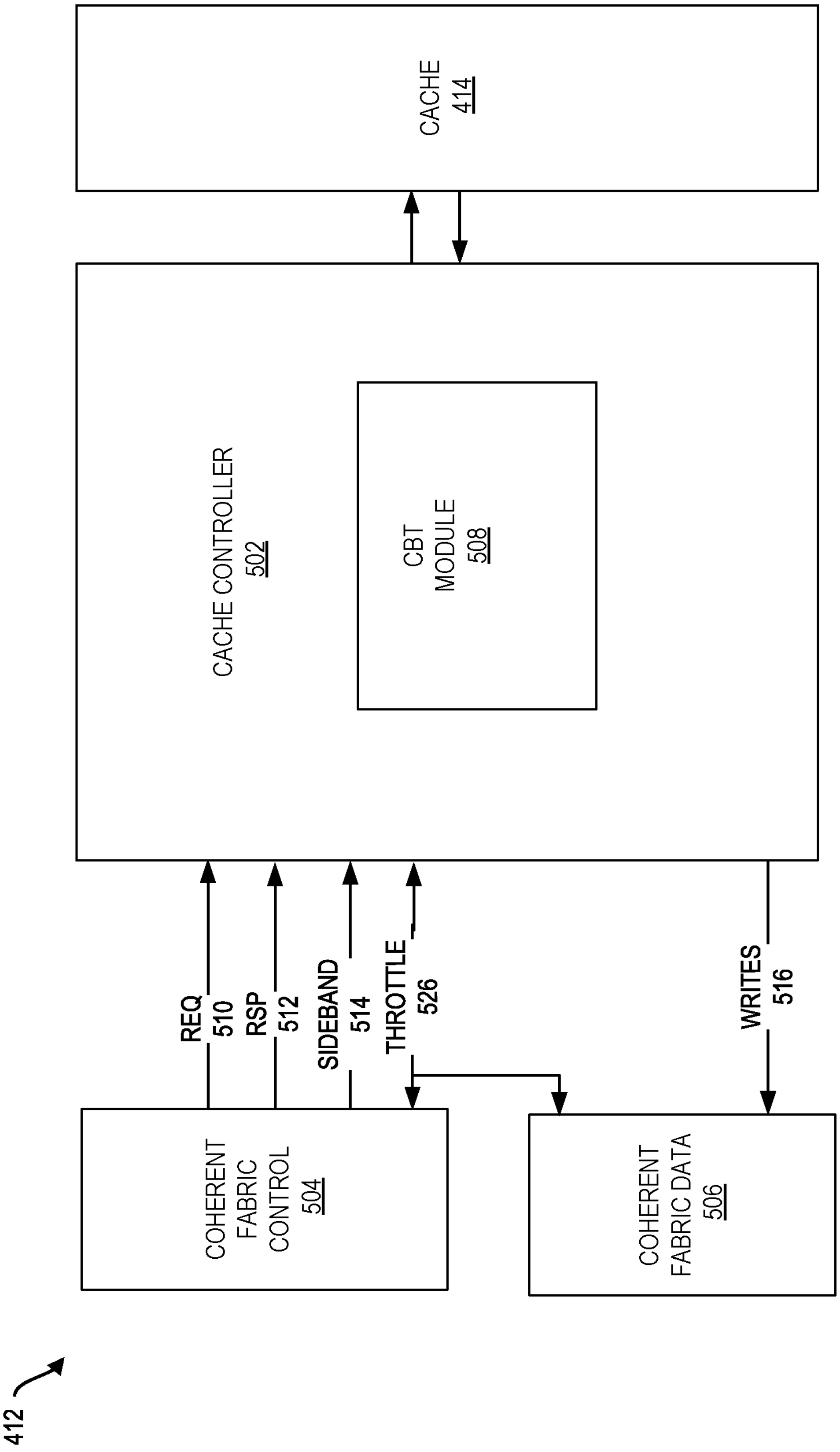
FIG. 5 is a block diagram of an example of a cache agent that includes multi-level cache selective coherency bypass technology in one implementation.

FIG. 5 is a block diagram of a cache agent 412 comprising a CBT module 508 in accordance with certain examples. The CBT module 508 may include one or more aspects of any of the examples described herein. The CBT module 508 may be implemented using any suitable logic. In a particular example, the CBT module 508 may be implemented through firmware executed by a processing element of cache agent 412. In this example, the CBT module 508 provides multi-level cache selective coherency bypass for the cache 414.

In a particular example, a separate instance of a CBT module 508 may be included within each cache agent 412 for each cache controller 502 of a processor 400. In another example, a CBT module 508 may be coupled to multiple cache agents 412 and provide multi-level cache selective coherency bypass for each of the cache agents. The processor 400 may include a coherent fabric interconnect 410 (e.g., a ring or mesh interconnect) that connects the cache agents 412 to each other and to other agents which are able to support a relatively large amount of bandwidth (some of which is to be used to communicate traced information to a storage medium), such as at least one IO controller (e.g., a PCIe controller) and at least one memory controller.

The coherent fabric control interface 504 (which may include any suitable number of interfaces) includes request interfaces 510, response interfaces 512, and sideband interfaces 514. Each of these interfaces is coupled to cache controller 502. The cache controller 502 may issue writes 516 to coherent fabric data 506.

A throttle signal 526 is sent from the cache controller 502 to flow control logic of the interconnect fabric 410 (and/or components coupled to the interconnect fabric 410) when bandwidth becomes constrained (e.g., when the amount of bandwidth available on the fabric is not enough to handle all of the writes 516). In a particular example, the throttle signal 526 may go to a mesh stop or ring stop which includes a flow control mechanism that allows acceptance or rejection of requests from other agents coupled to the interconnect fabric. In various examples, the throttle signal 526 may be the same throttle signal that is used to throttle normal traffic to the cache agent 412 when a receive buffer of the cache agent 412 is full. In a particular example, the sideband interfaces 514 (which may carry any suitable messages such as credits used for communication) are not throttled, but sufficient buffering is provided in the cache controller 502 to ensure that events received on the sideband interface(s) are not lost.

Figure 6:
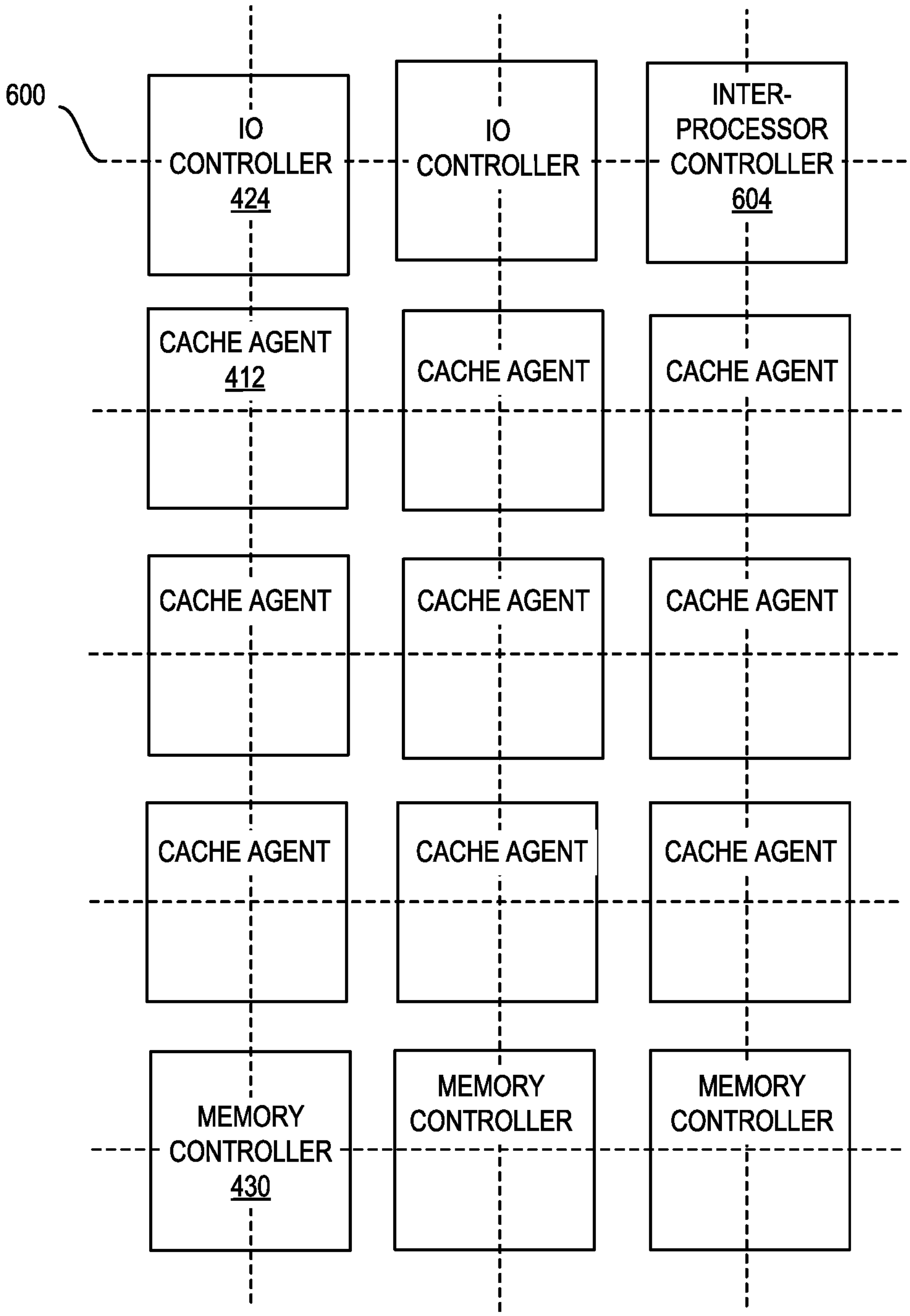
FIG. 6 is an illustrative diagram of an example of a mesh network comprising cache agents that include multi-level cache selective coherency bypass technology in one implementation.

FIG. 6 is an example mesh network 600 comprising cache agents 412 in accordance with certain examples. The mesh network 600 is one example of an interconnect fabric 410 that may be used with various examples of the present disclosure. The mesh network 600 may be used to carry requests between the various components (e.g., IO controllers 424, cache agents 412, memory controllers 430, and inter-processor controller 604).

Inter-processor communication controller 604 provides an interface for inter-processor communication. Inter-processor communication controller 604 may couple to an interconnect that provides a transportation path between two or more processors. In various examples, the interconnect may be a point-to-point processor interconnect, and the protocol used to communicate over the interconnect may have any suitable characteristics of Intel® Ultra Path Interconnect (UPI), Intel® QuickPath Interconnect (QPI), or other known or future inter-processor communication protocol. In various examples, inter-processor communication controller 604 may be a UPI agent, QPI agent, or similar agent capable of managing inter-processor communications.

Figure 7:
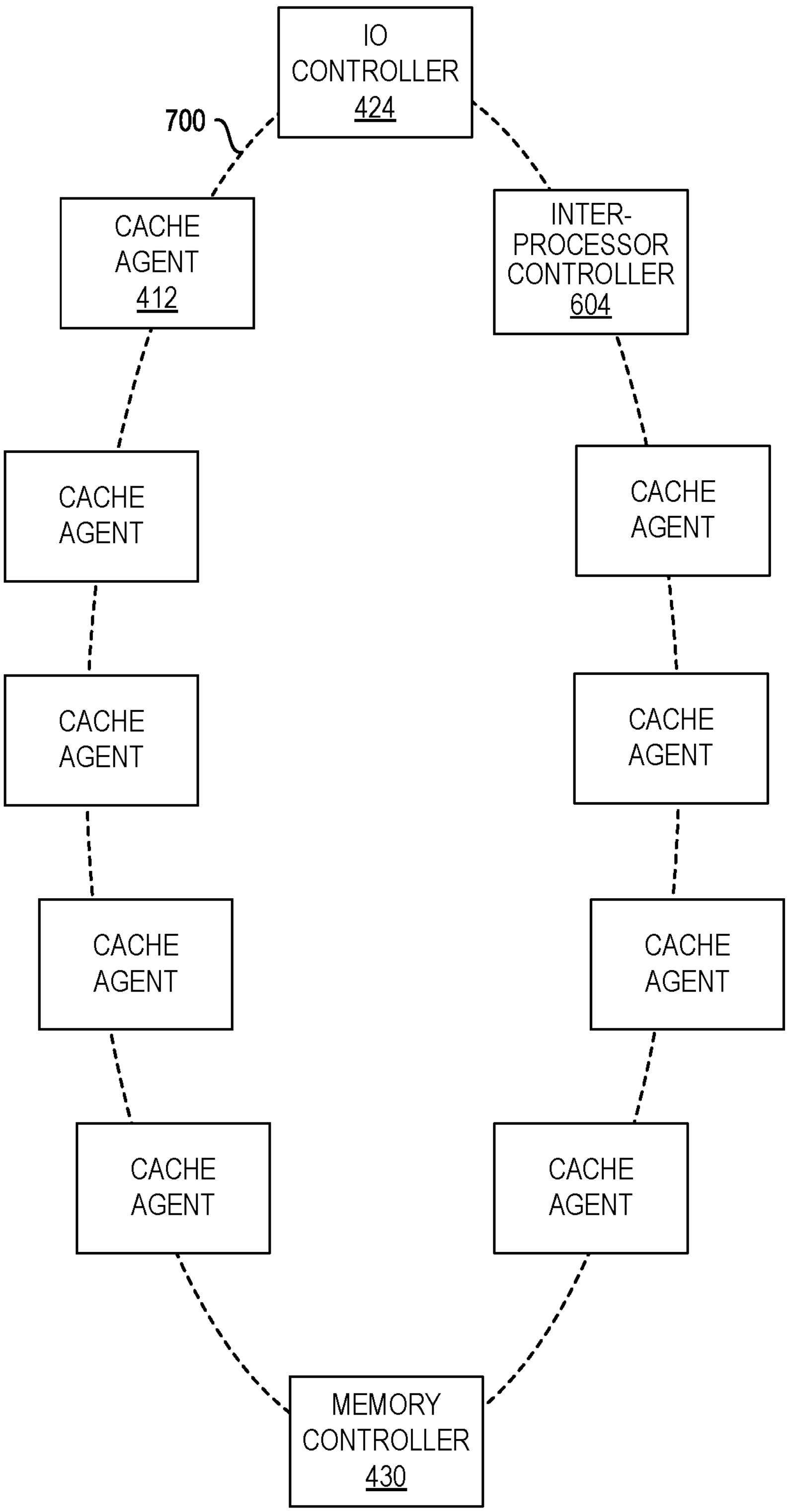
FIG. 7 is an illustrative diagram of an example of a ring network comprising cache agents that include multi-level cache selective coherency bypass technology in one implementation.

FIG. 7 is an example ring network 700 comprising cache agents 412 in accordance with certain examples. The ring network 700 is one example of an interconnect fabric 410 that may be used with various examples of the present disclosure. The ring network 700 may be used to carry requests between the various components (e.g., IO controllers 424, cache agents 412, memory controllers 430, and inter-processor controller 604).

Figure 8:
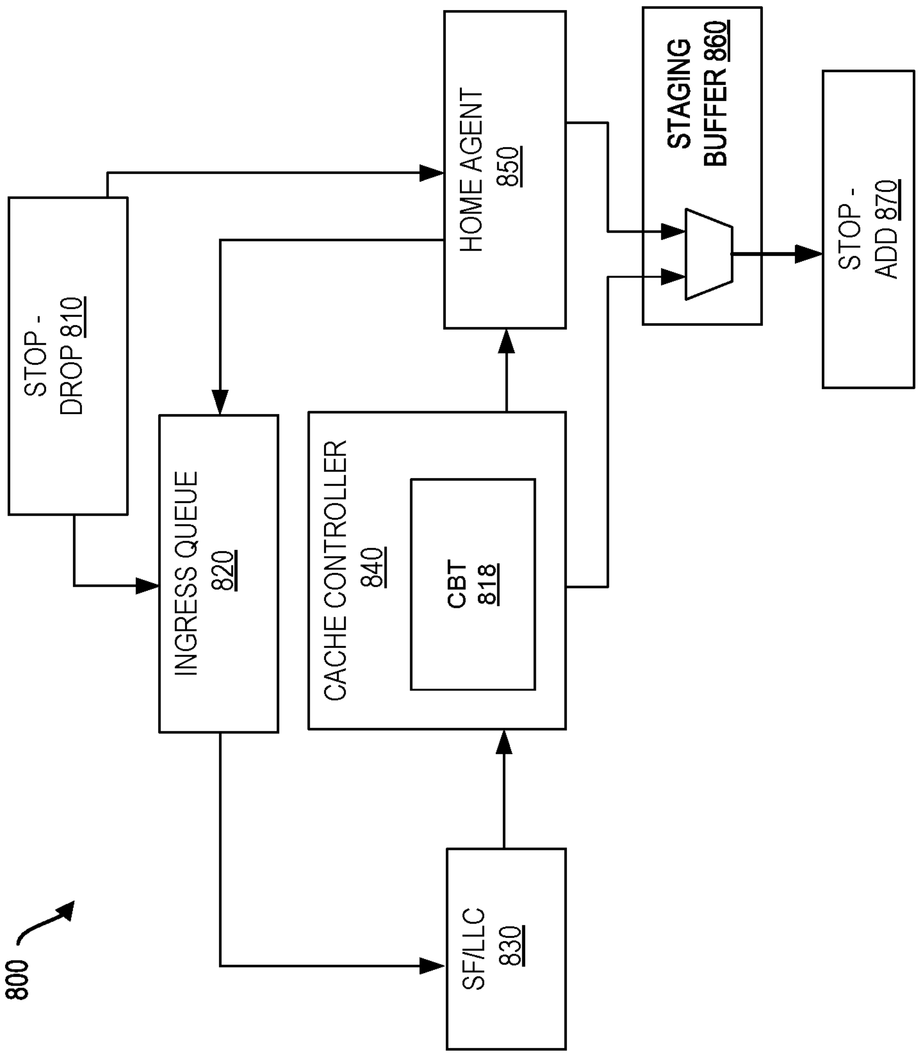
FIG. 8 is a block diagram of an example of a cache home agent that includes multi-level cache selective coherency bypass technology in one implementation.

FIG. 8 is a block diagram of another example of a cache agent 800 comprising CBT technology in accordance with certain examples. In the example depicted, cache agent 800 is a CHA 800, which may be one of many distributed CHAs that collectively form a coherent combined caching home agent for processor 400 (e.g., as the cache agent 412). In general, the CHA includes various components that couple between interconnect interfaces. Specifically, a first interconnect stop 810 provides inputs from the interconnect fabric 410 to CHA 800 while a second interconnect stop 870 provides outputs from the CHA to interconnect fabric 410. In an example, a processor may include an interconnect fabric such as a mesh interconnect or a ring interconnect such that stops 810 and 870 are configured as mesh stops or ring stops to respectively receive incoming information and to output outgoing information.

As illustrated, first interconnect stop 810 is coupled to an ingress queue 820 that may include one or more entries to receive incoming requests and pass them along to appropriate portions of the CHA. In the implementation shown, ingress queue 820 is coupled to a portion of a cache memory hierarchy, specifically a snoop filter (SF) cache and a LLC (SF/LLC) 830 (which may be a particular example of cache 414). In general, a snoop filter cache of the SF/LLC 830 may be a distributed portion of a directory that includes a plurality of entries that store tag information used to determine whether incoming requests hit in a given portion of a cache. In an example, the snoop filter cache includes entries for a corresponding L2 cache memory to maintain state information associated with the cache lines of the L2 cache. However, the actual data stored in this L2 cache is not present in the snoop filter cache, as the snoop filter cache is rather configured to store the state information associated with the cache lines. In turn, LLC portion of the SF/LLC 830 may be a slice or other portion of a distributed last level cache and may include a plurality of entries to store tag information, cache coherency information, and data as a set of cache lines. In some examples, the snoop filter cache may be implemented at least in part via a set of entries of the LLC including tag information.

Cache controller 840 may include various logic to perform cache processing operations. In general, cache controller 840 may be configured as a pipelined logic (also referred to herein as a cache pipeline) that further includes CBT technology implemented with CBT circuitry 818 for coherency bypass requests. The cache controller 840 may perform various processing on memory requests, including various preparatory actions that proceed through a pipelined logic of the caching agent to determine appropriate cache coherency operations. SF/LLC 830 couples to cache controller 840. Response information may be communicated via this coupling based on whether a lookup request (received from ingress queue 820) hits (or not) in the snoop filter/LLC

830. In general, cache controller 840 is responsible for local coherency and interfacing with the SF/LLC 830, and may include one or more trackers each having a plurality of entries to store pending requests.

As further shown, cache controller 840 also couples to a home agent 850 which may include a pipelined logic (also referred to herein as a home agent pipeline) and other structures used to interface with and protect a corresponding portion of a system memory. In general, home agent 850 may include one or more trackers each having a plurality of entries to store pending requests and to enable these requests to be processed through a memory hierarchy. For read requests that miss the snoop filter/LLC 830, home agent 850 registers the request in a tracker, determines if snoops are to be spawned, and/or memory reads are to be issued based on a number of conditions. In an example, the cache memory pipeline is roughly nine (9) clock cycles, and the home agent pipeline is roughly four (4) clock cycles. This allows the CHA 800 to produce a minimal memory/cache miss latency using an integrated home agent.

Outgoing requests from cache controller 840 and home agent 850 couple through a staging buffer 860 to interconnect stop 870. In an example, staging buffer 860 may include selection logic to select between requests from the two pipeline paths. In an example, cache controller 840 generally may issue remote requests/responses, while home agent 850 may issue memory read/writes and snoops/forwards.

With the arrangement shown in FIG. 8, first interconnect stop 810 may provide incoming snoop responses or memory responses (e.g., received from off-chip) to home agent 850. Via coupling between home agent 850 and ingress queue 820, home agent completions may be provided to the ingress queue. In addition, to provide for optimized handling of certain memory transactions as described herein (updates such as updates to snoop filter entries), home agent 850 may further be coupled to cache controller 840 via a bypass path, such that information for certain optimized flows can be provided to a point deep in the cache pipeline of cache controller 840. Note also that cache controller 840 may provide information regarding local misses directly to home agent 850. While a particular cache agent architecture is shown in FIG. 8, any suitable cache agent architectures are contemplated in various examples of the present disclosure.

The figures below detail exemplary architectures and systems to implement examples of the above. In some examples, one or more hardware components and/or instructions described above are emulated as detailed below, or implemented as software modules.

Processor cores may be implemented in different ways, for different purposes, and in different processors. For instance, implementations of such cores may include: 4) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 4) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 4) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a SoC that may include on the same die the described CPU (sometimes referred to as the application core(s) or application processor(s)), the above described coprocessor, and additional functionality. Exemplary core architectures are described next, followed by descriptions of exemplary processors and computer architectures.

Figure 9:
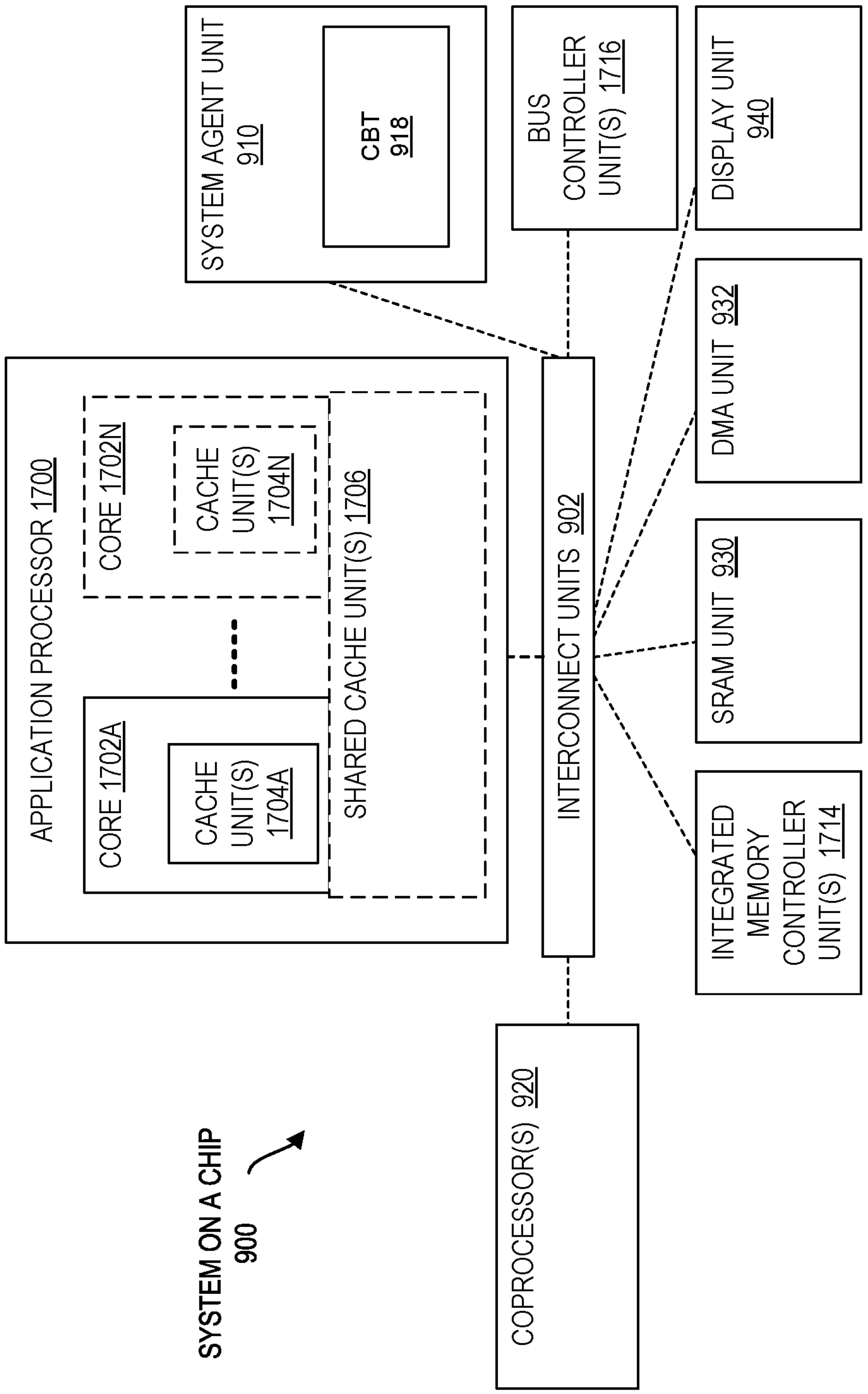
FIG. 9 is a block diagram of an example of a system on a chip that includes multi-level cache selective coherency bypass technology in one implementation.

FIG. 9 depicts a block diagram of a SoC 900 in accordance with an example of the present disclosure. Similar elements in FIG. 17 bear similar reference numerals. Also, dashed lined boxes are optional features on more advanced SoCs. In FIG. 9, an interconnect unit(s) 902 is coupled to: an application processor 1700 which includes a set of one or more cores 1702A-N with cache unit(s) 1704A-N and shared cache unit(s) 1706; a bus controller unit(s) 1716; an integrated memory controller unit(s) 1714; a set or one or more coprocessors 920 which may include integrated graphics logic, an image processor, an audio processor, and a video processor; an static random access memory (SRAM) unit 930; a direct memory access (DMA) unit 932; a display unit 940 for coupling to one or more external displays; and a system agent unit 910 that includes CBT technology, as described herein, implemented with CBT circuitry 918 to selectively bypass coherency end-to-end as the data flows through various levels of cache/memory of the SoC 900. In one example, the coprocessor(s) 920 include a special-purpose processor, such as, for example, a network or communication processor, compression and/or decompression engine, GPGPU, a high-throughput MIC processor, embedded processor, or the like.

Figure 10:
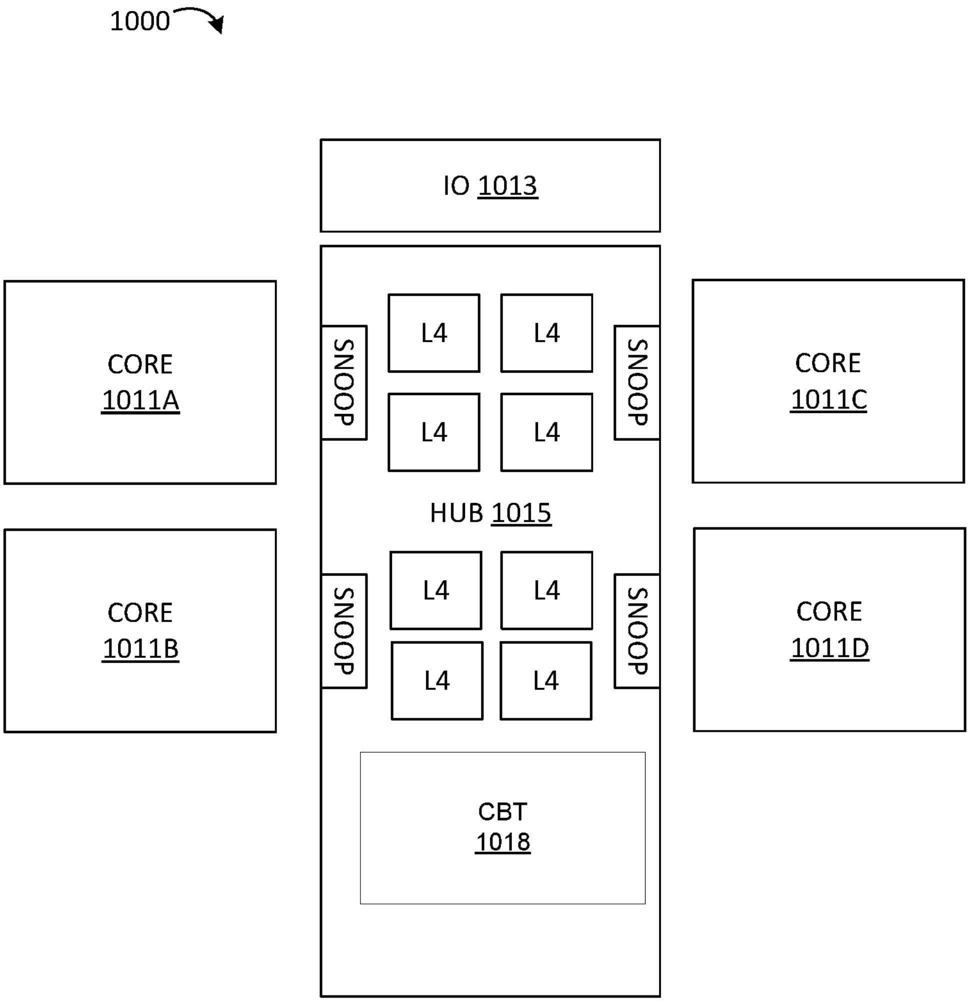
FIG. 10 is a block diagram of an example of a system that includes multi-level cache selective coherency bypass technology in one implementation.

With reference to FIG. 10, an example of a system 1000 includes various caches that may utilize examples of the CBT technology described herein. In some examples, a last-level cache (LLC) may utilize CBT technology. In some examples, as shown in FIG. 10, a level four (L4) cache may utilize CBT technology. For example, the system 1000 includes multiple processor cores 1011A-D and an IO interface 1013 (e.g., a compute express link (CXL) interface coupled to a hub 1015 (e.g., a platform controller hub (PCH)). The hub 1015 includes L4 cache and snoop filters (e.g., ULTRA PATH INTERCONNECT (UPI) snoop filters). One or more of the IO interface 1013, the snoop filters, the cores 1011 (e.g., in connection with either an L1 or L2 cache), and the hub 1015 may be configured to utilize examples of the CBT technology described herein. As illustrated, the hub 1015 is configured to implement CBT circuitry 1018.

Figure 11:
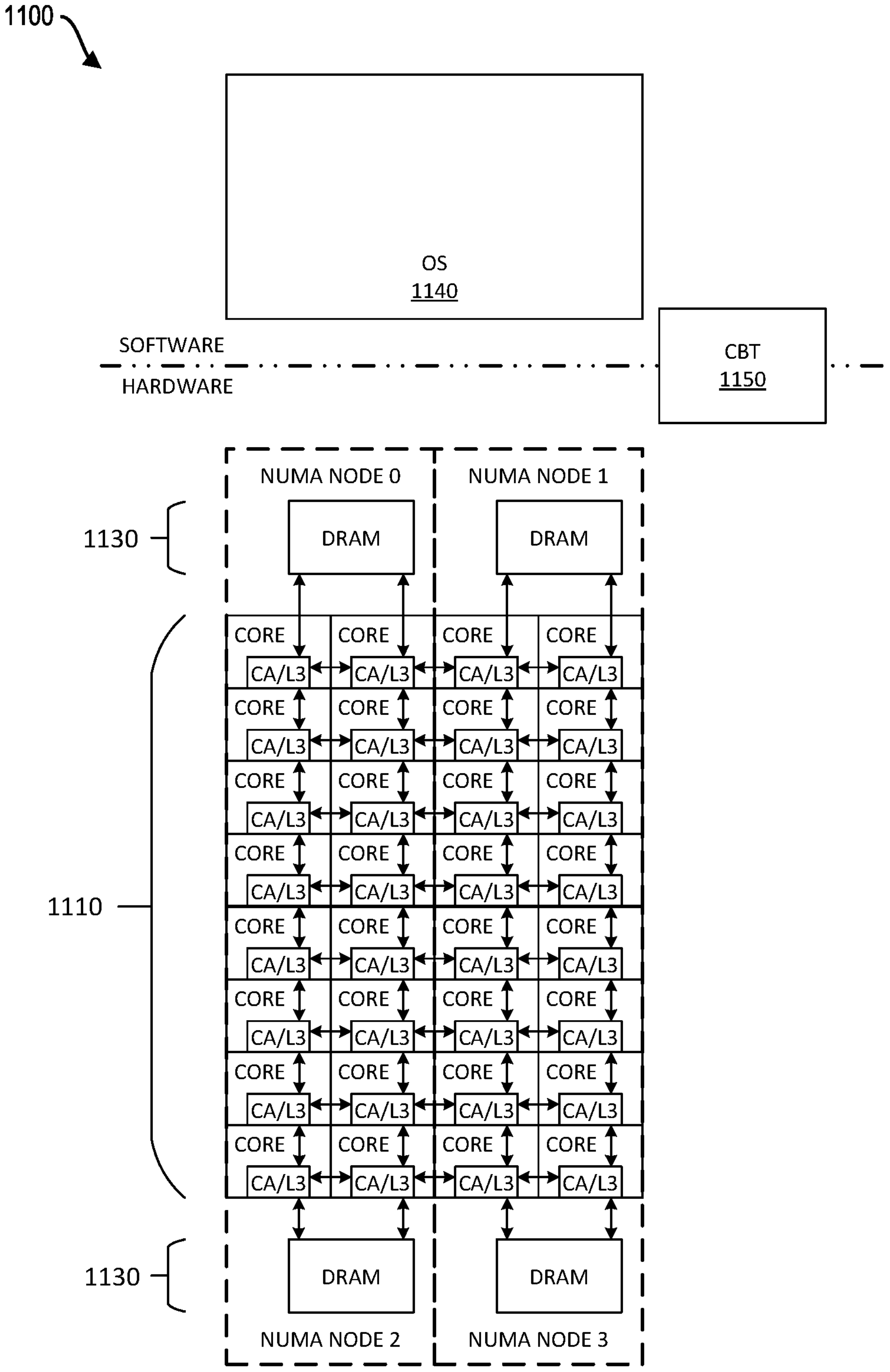
FIG. 11 is an illustrative diagram of an example of a server that includes multi-level cache selective coherency bypass technology in one implementation.

With reference to FIG. 11, an example of a server 1100 includes a processor 1110 that supports SNC. As shown in FIG. 11, multiple cores each include a caching agent (CA) and L3 cache as a last-level cache (LLC) for system memory 1130 (e.g., DRAM) logically partitioned into four clusters (e.g., organized in SNC-4 mode with NUMA node 0 through NUMA node 3). The user can pin each software thread to a specific cluster, and if data is managed data appropriately, LLC and DRAM access latencies and/or on-die interconnect traffic may be reduced. The server 1100 includes an OS 1140 and CBT technology 1150 (e.g., both hardware and software aspects) as described herein.

Figure 12:
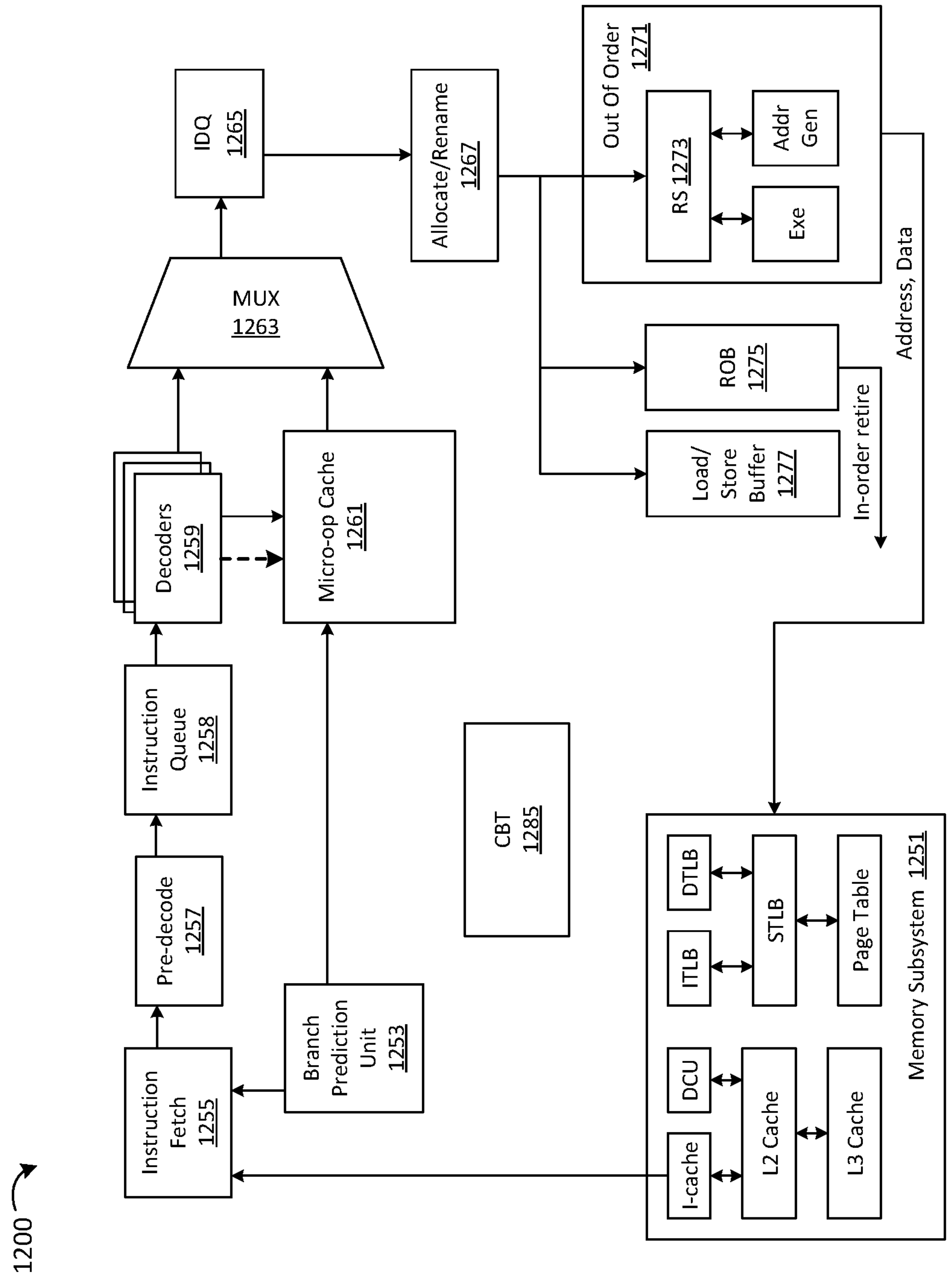
FIG. 12 is an illustrative diagram of an example of a processor that includes multi-level cache selective coherency bypass technology in one implementation.

With reference to FIG. 12, an example of an out-of-order (OOO) processor core 1200 includes a memory subsystem 1251, a branch prediction unit (BPU) 1253, an instruction fetch circuit 1255, a pre-decode circuit 1257, an instruction queue 1258, decoders 1259, a micro-op cache 1261, a mux 1263, an instruction decode queue (IDQ) 1265, an allocate/ rename circuit 1267, an out-of-order core 1271, a reservation station (RS) 1273, a re-order buffer (ROB) 1275, and a load/store buffer 1277, connected as shown. The memory subsystem 1251 includes a level-1 (L1) instruction cache (I-cache), a L1 data cache (DCU), a L2 cache, a L3 cache, an instruction translation lookaside buffer (ITLB), a data translation lookaside buffer (DTLB), a shared translation lookaside buffer (STLB), and a page table, connected as shown. The OOO core 1271 includes the RS 1273, an Exe circuit, and an address generation circuit, connected as shown. The core 1200 may further include CBT circuitry 1285, and other circuitry as described herein, to selectively bypass coherency through the multiple levels of cache.

Figure 13:
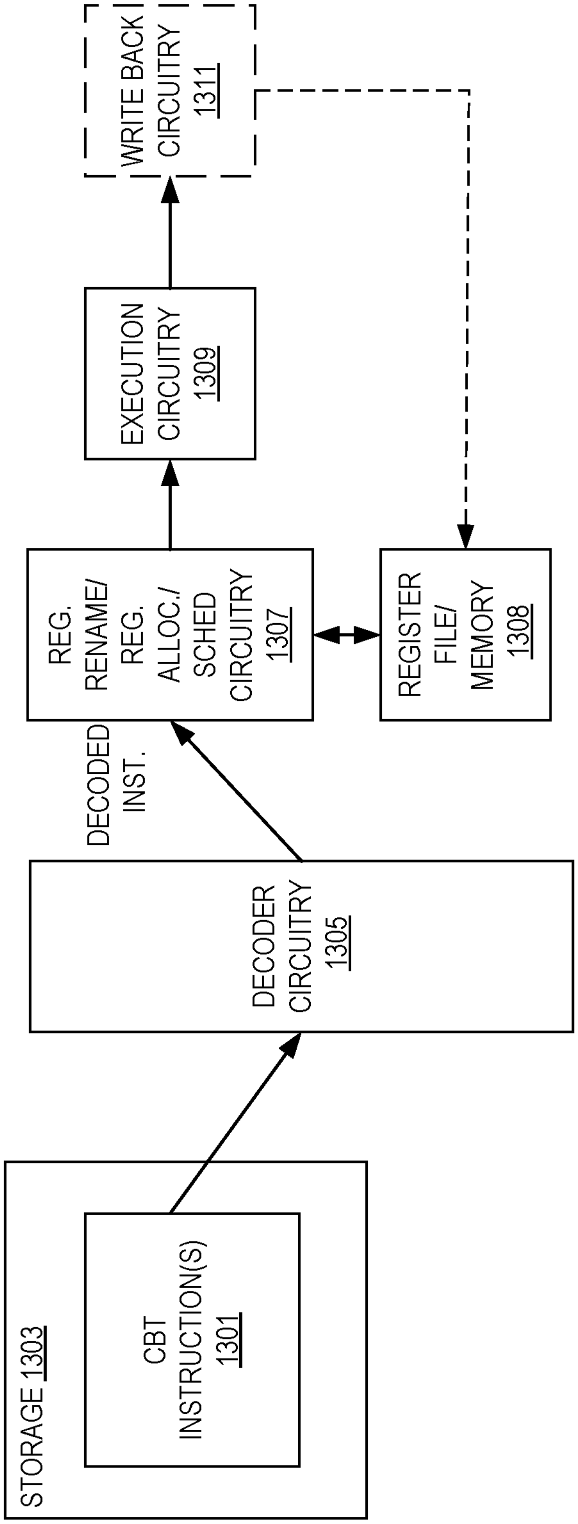
FIG. 13 illustrates examples of computing hardware to process a coherency bypass tagging (CBT) instruction.

FIG. 13 illustrates examples of computing hardware to process a CBT instruction. The instruction may be a coherency bypass instruction, such as an IDT instruction (e.g., FREEZE, UNFREEZE, etc.). As illustrated, storage 1303 stores a CBT instruction 1301 to be executed.

The instruction 1301 is received by decoder circuitry 1305. For example, the decoder circuitry 1305 receives this instruction from fetch circuitry (not shown). The instruction may be in any suitable format, such as that describe with reference to FIG. 21 below. In an example, the instruction includes fields for an opcode, a first source identifier of a memory location of data, and a second source identifier of a size of the data. In some examples, the sources are registers, and in other examples one or more are memory locations. In some examples, one or more of the sources may be an immediate operand. In some examples, the opcode details the coherency tagging operation to be performed (e.g., set a coherency bypass tag for the indicated data, clear a coherency bypass tag for the indicated data, etc.).

More detailed examples of at least one instruction format for the instruction will be detailed later. The decoder circuitry 1305 decodes the instruction into one or more operations. In some examples, this decoding includes generating a plurality of micro-operations to be performed by execution circuitry (such as execution circuitry 1309). The decoder circuitry 1305 also decodes instruction prefixes.

In some examples, register renaming, register allocation, and/or scheduling circuitry 1307 provides functionality for one or more of: 1) renaming logical operand values to physical operand values (e.g., a register alias table in some examples), 2) allocating status bits and flags to the decoded instruction, and 3) scheduling the decoded instruction for execution by execution circuitry out of an instruction pool (e.g., using a reservation station in some examples).

Registers (register file) and/or memory 1308 store data as operands of the instruction to be operated by execution circuitry 1309. Example register types include packed data registers, general purpose registers (GPRs), and floating-point registers.

Execution circuitry 1309 executes the decoded instruction. Example detailed execution circuitry includes execution cluster(s) 1860 shown in FIG. 18(B), etc. The execution of the decoded instruction causes the execution circuitry to update coherency bypass information for data indicated by the first source operand. In some examples, the field for the identifier of the first source operand is to identify a vector register. In some examples, the field for the identifier of the first source operand is to identify a memory location. In some examples, the single instruction is further to include a field for an identifier of a second source operand, where the second source operand is to indicate a size of the data indicated by the first source operand.

In some examples, the execution circuitry 1309 may be further to execute the decoded instruction according to the opcode to set a field value according to the opcode for one or more linear address masks for the data indicated by the first source operand. Alternatively, or additionally, the execution circuitry 1309 may execute the decoded instruction according to the opcode to set a field value according to the opcode for one or more page table attributes for the data indicated by the first source operand.

In some examples, the opcode may indicate that the data indicated by the first source operand is to bypass a coherency operation, and the execution circuitry 1309 may be further to execute the decoded instruction according to the opcode to flush any modified data indicated by the first source operand from one or more caches, invalidate any shared data indicated by the first source operand, flush any translation look-aside buffer entries for data indicated by the first source operand, and set one or more tags associated with data indicated by the first source operand to indicate that copies of the data are to bypass the coherency operation.

In some examples, the opcode may indicate that the data indicated by the first source operand is to maintain coherency, and where the execution circuitry 1309 may be further to execute the decoded instruction according to the opcode to invalidate any ghosted data indicated by the first source operand from one or more caches, invalidate any translation look-aside buffer entries for data indicated by the first source operand, and set one or more tags associated with data indicated by the first source operand to indicate that copies of the data are to maintain coherency.

In some examples, retirement/write back circuitry 1311 architecturally commits the destination register into the registers or memory 1308 and retires the instruction.

An example of a format for a CBT instruction is OPCODE SRC1, SRC2. In some examples, OPCODE is the opcode mnemonic of the instruction. SRC1 and SRC2 are fields for the source operands, such as packed data registers and/or memory.

Figure 14:
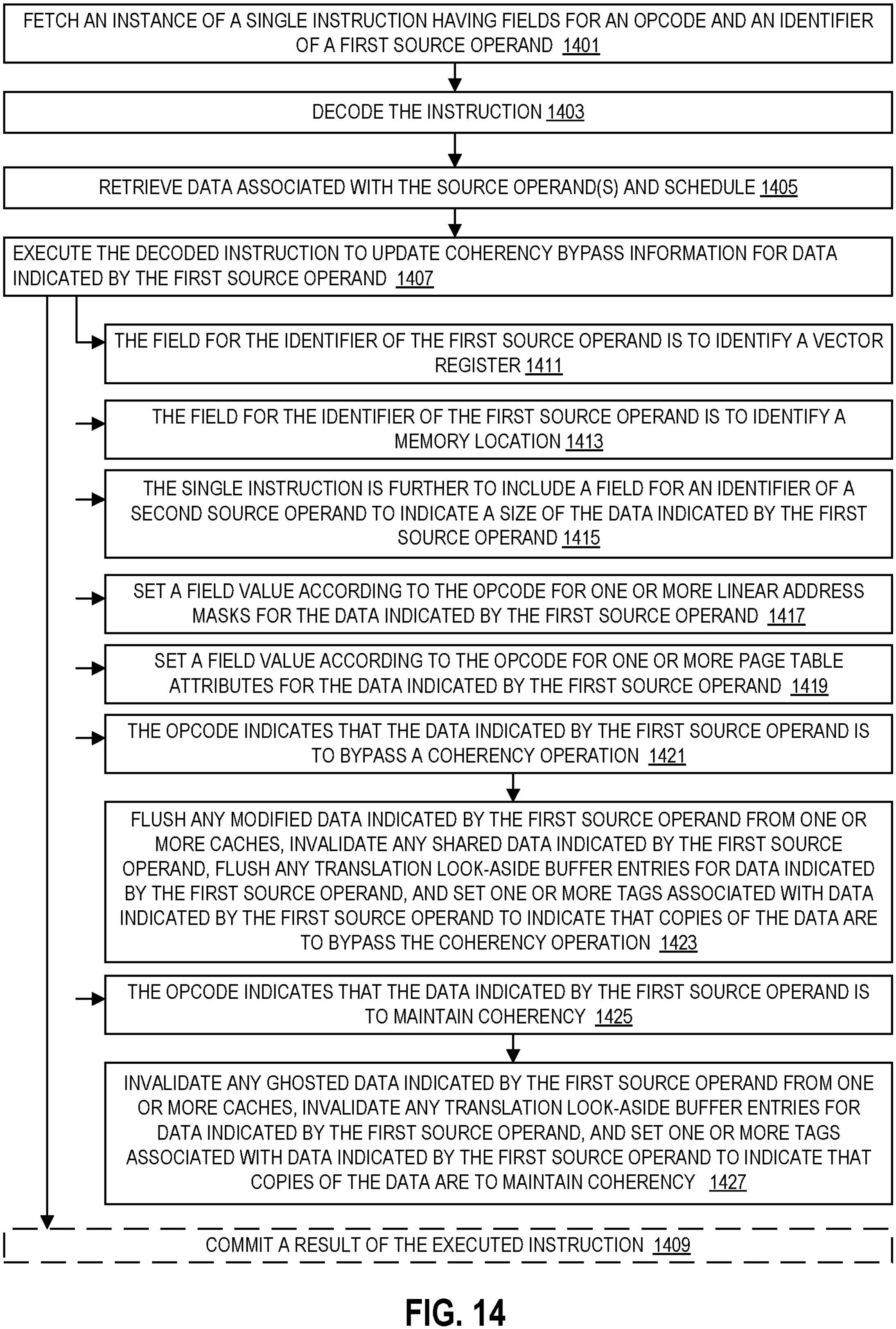
FIG. 14 illustrates an example method performed by a processor to process a CBT instruction.

FIG. 14 illustrates an example method performed by a processor to process a CBT instruction. For example, a processor core as shown in FIG. 18(B), a pipeline as detailed below, etc., performs this method.

At 1401, an instance of single instruction is fetched. For example, a CBT instruction is fetched. The instruction includes fields for an opcode and an identifier of a first source operand. In some examples, the instruction further includes a field for a writemask. In some examples, the instruction is fetched from an instruction cache. The opcode indicates selective coherency bypass operations to perform.

The fetched instruction is decoded at 1403. For example, the fetched CBT instruction is decoded by decoder circuitry such as decoder circuitry 1305 or decode circuitry 1840 detailed herein.

Data values associated with the source operands of the decoded instruction are retrieved when the decoded instruction is scheduled at 1405. For example, when one or more of the source operands are memory operands, the data from the indicated memory location is retrieved.

At 1407, the decoded instruction is executed by execution circuitry (hardware) such as execution circuitry 1309 shown in FIG. 13, or execution cluster(s) 1860 shown in FIG. 18(B). In some examples, the instruction is committed or retired at 1409.

For the CBT instruction, the execution will cause execution circuitry to perform the operations described in connection with FIG. 13. In various examples, executing the decoded instruction according to the opcode will cause execution circuitry to update coherency bypass information for data indicated by the first source operand. In some examples, the field for the identifier of the first source operand is to identify a vector register at 1411. In some examples, the field for the identifier of the first source operand is to identify a memory location at 1413. In some examples, the single instruction is further to include a field for an identifier of a second source operand to indicate a size of the data indicated by the first source operand at 1415.

In some examples, executing the decoded instruction according to the opcode will cause execution circuitry to set a field value according to the opcode for one or more linear address masks for the data indicated by the first source operand at 1417, and/or to set a field value according to the opcode for one or more page table attributes for the data indicated by the first source operand at 1419.

In some examples, the opcode indicates that the data indicated by the first source operand is to bypass a coherency operation at 1421, and executing the decoded instruction according to the opcode will cause execution circuitry to flush any modified data indicated by the first source operand from one or more caches, invalidate any shared data indicated by the first source operand, flush any translation look-aside buffer entries for data indicated by the first source operand, and set one or more tags associated with data indicated by the first source operand to indicate that copies of the data are to bypass the coherency operation at 1423.

In some examples, the opcode indicates that the data indicated by the first source operand is to maintain coherency at 1425, and executing the decoded instruction according to the opcode will cause execution circuitry to invalidate any ghosted data indicated by the first source operand from one or more caches, invalidate any translation look-aside buffer entries for data indicated by the first source operand, and set one or more tags associated with data indicated by the first source operand to indicate that copies of the data are to maintain coherency at 1427.

Figure 15:
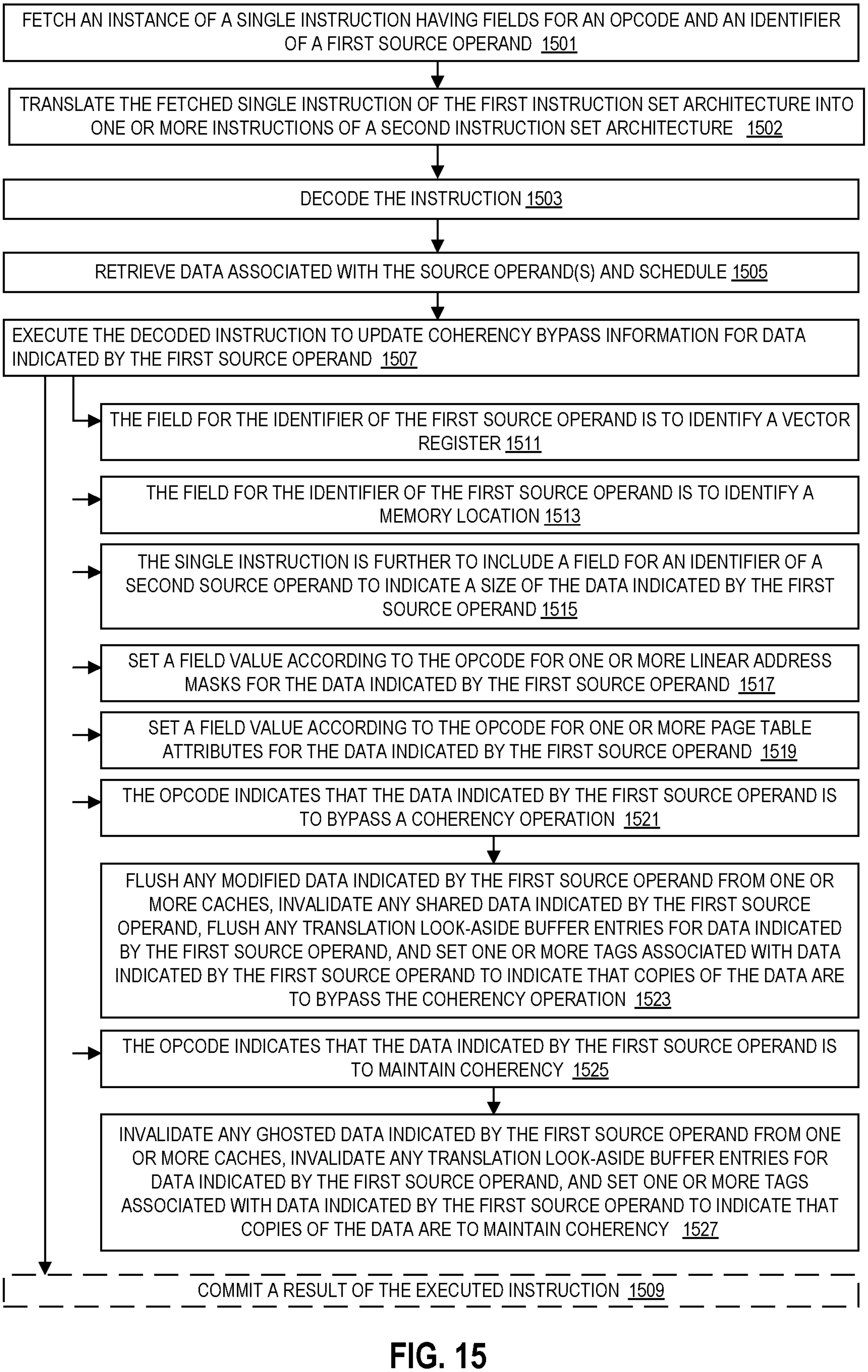
FIG. 15 illustrates an example method to process a CBT instruction using emulation or binary translation.

FIG. 15 illustrates an example method to process a CBT instruction using emulation or binary translation. For example, a processor core as shown in FIG. 18(B), a pipeline and/or emulation/translation layer perform aspects of this method.

An instance of a single instruction of a first instruction set architecture is fetched at 1501. The instance of the single instruction of the first instruction set architecture includes fields for an opcode and an identifier of a first source operand. In some examples, the instruction further includes a field for a writemask. In some examples, the instruction is fetched from an instruction cache. The opcode indicates selective coherency bypass operations to perform.

The fetched single instruction of the first instruction set architecture is translated into one or more instructions of a second instruction set architecture at 1502. This translation is performed by a translation and/or emulation layer of software in some examples. In some examples, this translation is performed by an instruction converter 2712 as shown in FIG. 27. In some examples, the translation is performed by hardware translation circuitry.

The one or more translated instructions of the second instruction set architecture are decoded at 1503. For example, the translated instructions are decoded by decoder circuitry such as decoder circuitry 1305 or decode circuitry 1840 detailed herein. In some examples, the operations of translation and decoding at 1502 and 1503 are merged.

Data values associated with the source operand(s) of the decoded one or more instructions of the second instruction set architecture are retrieved and the one or more instructions are scheduled at 1505. For example, when one or more of the source operands are memory operands, the data from the indicated memory location is retrieved.

At 1507, the decoded instruction(s) of the second instruction set architecture is/are executed by execution circuitry (hardware) such as execution circuitry 1309 shown in FIG. 13, or execution cluster(s) 1860 shown in FIG. 18(B), to perform the operation(s) indicated by the opcode of the single instruction of the first instruction set architecture. For the CBT instruction, the execution will cause execution circuitry to perform the operations described in connection with FIG. 13. In some examples, the instruction is committed or retired at 1509.

In various examples, executing the decoded instruction according to the opcode at 1507 will cause execution circuitry to update coherency bypass information for data indicated by the first source operand. In some examples, the field for the identifier of the first source operand is to identify a vector register at 1511. In some examples, the field for the identifier of the first source operand is to identify a memory location at 1513. In some examples, the single instruction is further to include a field for an identifier of a second source operand to indicate a size of the data indicated by the first source operand at 1515.

In some examples, executing the decoded instruction according to the opcode will cause execution circuitry to set a field value according to the opcode for one or more linear address masks for the data indicated by the first source operand at 1517, and/or to set a field value according to the opcode for one or more page table attributes for the data indicated by the first source operand at 1519.

In some examples, the opcode indicates that the data indicated by the first source operand is to bypass a coherency operation at 1521, and executing the decoded instruction according to the opcode will cause execution circuitry to flush any modified data indicated by the first source operand from one or more caches, invalidate any shared data indicated by the first source operand, flush any translation look-aside buffer entries for data indicated by the first source operand, and set one or more tags associated with data indicated by the first source operand to indicate that copies of the data are to bypass the coherency operation at 1523.

In some examples, the opcode indicates that the data indicated by the first source operand is to maintain coherency at 1525, and executing the decoded instruction according to the opcode will cause execution circuitry to invalidate any ghosted data indicated by the first source operand from one or more caches, invalidate any translation look-aside buffer entries for data indicated by the first source operand, and set one or more tags associated with data indicated by the first source operand to indicate that copies of the data are to maintain coherency at 1527.

Example Computer Architectures

Detailed below are descriptions of example computer architectures. Other system designs and configurations known in the arts for laptop, desktop, and handheld personal computers (PC)s, personal digital assistants, engineering workstations, servers, disaggregated servers, network devices, network hubs, switches, routers, embedded processors, digital signal processors (DSPs), graphics devices, video game devices, set-top boxes, micro controllers, cell phones, portable media players, hand-held devices, and various other electronic devices, are also suitable. In general, a variety of systems or electronic devices capable of incorporating a processor and/or other execution logic as disclosed herein are generally suitable.

Figure 16:
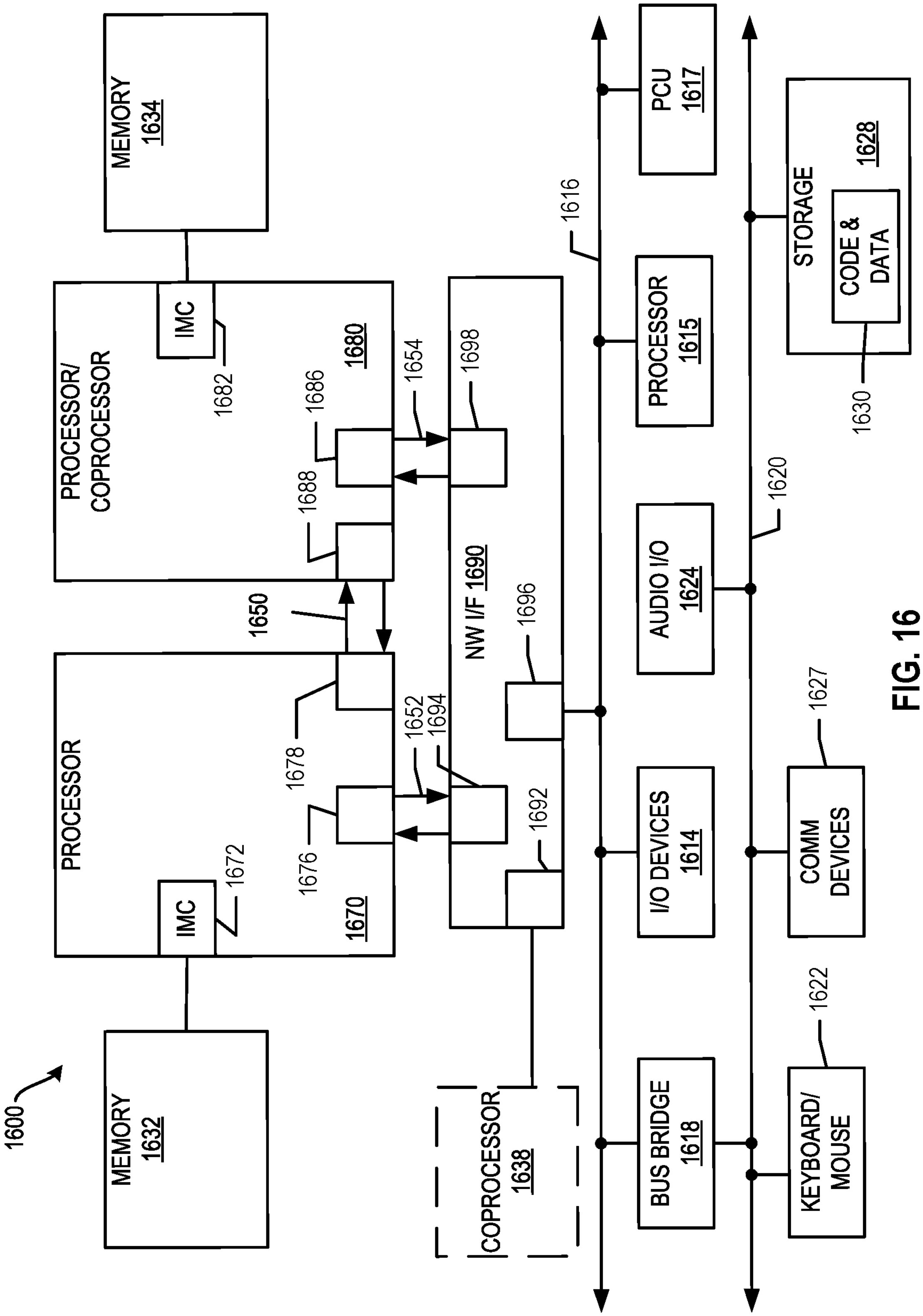
FIG. 16 illustrates an example computing system.

FIG. 16 illustrates an example computing system. Multiprocessor system 1600 is an interfaced system and includes a plurality of processors or cores including a first processor 1670 and a second processor 1680 coupled via an interface 1650 such as a point-to-point (P-P) interconnect, a fabric, and/or bus. In some examples, the first processor 1670 and the second processor 1680 are homogeneous. In some examples, first processor 1670 and the second processor 1680 are heterogenous. Though the example system 1600 is shown to have two processors, the system may have three or more processors, or may be a single processor system. In some examples, the computing system is a system on a chip (SoC).

Processors 1670 and 1680 are shown including integrated memory controller (IMC) circuitry 1672 and 1682, respectively. Processor 1670 also includes interface circuits 1676 and 1678; similarly, second processor 1680 includes interface circuits 1686 and 1688. Processors 1670, 1680 may exchange information via the interface 1650 using interface circuits 1678, 1688. IMCs 1672 and 1682 couple the processors 1670, 1680 to respective memories, namely a memory 1632 and a memory 1634, which may be portions of main memory locally attached to the respective processors.

Processors 1670, 1680 may each exchange information with a network interface (NW I/F) 1690 via individual interfaces 1652, 1654 using interface circuits 1676, 1694, 1686, 1698. The network interface 1690 (e.g., one or more of an interconnect, bus, and/or fabric, and in some examples is a chipset) may optionally exchange information with a coprocessor 1638 via an interface circuit 1692. In some examples, the coprocessor 1638 is a special-purpose processor, such as, for example, a high-throughput processor, a network or communication processor, compression engine, graphics processor, general purpose graphics processing unit (GPGPU), neural-network processing unit (NPU), embedded processor, or the like.

A shared cache (not shown) may be included in either processor 1670, 1680 or outside of both processors, yet connected with the processors via an interface such as P-P interconnect, such that either or both processors' local cache information may be stored in the shared cache if a processor is placed into a low power mode.

Network interface 1690 may be coupled to a first interface 1616 via interface circuit 1696. In some examples, first interface 1616 may be an interface such as a Peripheral Component Interconnect (PCI) interconnect, a PCI Express interconnect or another IO interconnect. In some examples, first interface 1616 is coupled to a power control unit (PCU) 1617, which may include circuitry, software, and/or firmware to perform power management operations with regard to the processors 1670, 1680 and/or co-processor 1638. PCU 1617 provides control information to a voltage regulator (not shown) to cause the voltage regulator to generate the appropriate regulated voltage. PCU 1617 also provides control information to control the operating voltage generated. In various examples, PCU 1617 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 1617 is illustrated as being present as logic separate from the processor 1670 and/or processor 1680. In other cases, PCU 1617 may execute on a given one or more of cores (not shown) of processor 1670 or 1680. In some cases, PCU 1617 may be implemented as a microcontroller (dedicated or general-purpose) or other control logic configured to execute its own dedicated power management code, sometimes referred to as P-code. In yet other examples, power management operations to be performed by PCU 1617 may be implemented externally to a processor, such as by way of a separate power management integrated circuit (PMIC) or another component external to the processor. In yet other examples, power management operations to be performed by PCU 1617 may be implemented within BIOS or other system software.

Various IO devices 1614 may be coupled to first interface 1616, along with a bus bridge 1618 which couples first interface 1616 to a second interface 1620. In some examples, one or more additional processor(s) 1615, such as coprocessors, high throughput many integrated core (MIC) processors, GPGPUs, accelerators (such as graphics accelerators or digital signal processing (DSP) units), field programmable gate arrays (FPGAs), or any other processor, are coupled to first interface 1616. In some examples, second interface 1620 may be a low pin count (LPC) interface. Various devices may be coupled to second interface 1620 including, for example, a keyboard and/or mouse 1622, communication devices 1627 and storage circuitry 1628. Storage circuitry 1628 may be one or more non-transitory machine-readable storage media as described below, such as a disk drive or other mass storage device which may include instructions/code and data 1630. Further, an audio IO 1624 may be coupled to second interface 1620. Note that other architectures than the point-to-point architecture described above are possible. For example, instead of the point-to-point architecture, a system such as multiprocessor system 1600 may implement a multi-drop interface or other such architecture.

Example Core Architectures, Processors, and Computer Architectures

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput) computing. Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip (SoC) that may be included on the same die as the described CPU (sometimes referred to as the application core(s) or application processor(s)), the above described coprocessor, and additional functionality.

Example core architectures are described next, followed by descriptions of example processors and computer architectures.

Figure 17:
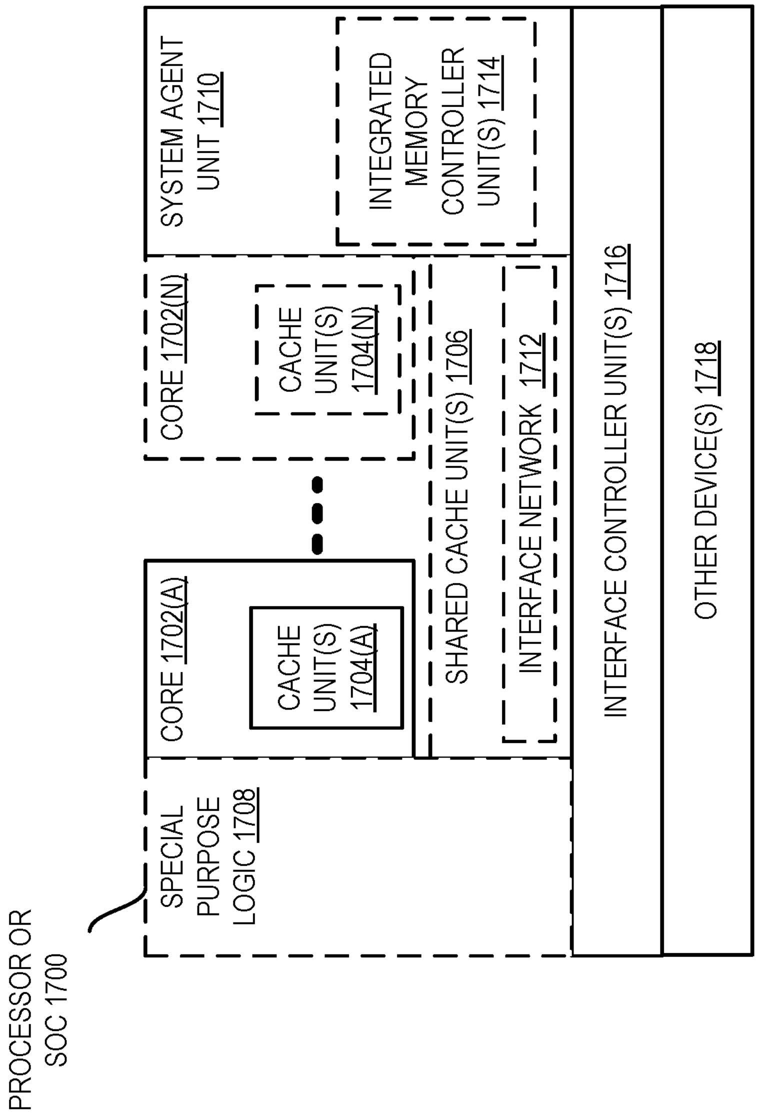
FIG. 17 illustrates a block diagram of an example processor and/or System on a Chip (SoC) that may have one or more cores and an integrated memory controller.

FIG. 17 illustrates a block diagram of an example processor and/or SoC 1700 that may have one or more cores and an integrated memory controller. The solid lined boxes illustrate a processor 1700 with a single core 1702(A), system agent unit circuitry 1710, and a set of one or more interface controller unit(s) circuitry 1716, while the optional addition of the dashed lined boxes illustrates an alternative processor 1700 with multiple cores 1702(A)-(N), a set of one or more integrated memory controller unit(s) circuitry 1714 in the system agent unit circuitry 1710, and special purpose logic 1708, as well as a set of one or more interface controller units circuitry 1716. Note that the processor 1700 may be one of the processors 1670 or 1680, or co-processor 1638 or 1615 of FIG. 16.

Thus, different implementations of the processor 1700 may include: 1) a CPU with the special purpose logic 1708 being integrated graphics and/or scientific (throughput) logic (which may include one or more cores, not shown), and the cores 1702(A)-(N) being one or more general purpose cores (e.g., general purpose in-order cores, general purpose out-of-order cores, or a combination of the two); 2) a coprocessor with the cores 1702(A)-(N) being a large number of special purpose cores intended primarily for graphics and/or scientific (throughput); and 3) a coprocessor with the cores 1702(A)-(N) being a large number of general purpose in-order cores. Thus, the processor 1700 may be a general-purpose processor, coprocessor or special-purpose processor, such as, for example, a network or communication processor, compression engine, graphics processor, GPGPU (general purpose graphics processing unit), a high throughput many integrated core (MIC) coprocessor (including 30 or more cores), embedded processor, or the like. The processor may be implemented on one or more chips. The processor 1700 may be a part of and/or may be implemented on one or more substrates using any of a number of process technologies, such as, for example, complementary metal oxide semiconductor (CMOS), bipolar CMOS (BiCMOS), P-type metal oxide semiconductor (PMOS), or N-type metal oxide semiconductor (NMOS).

A memory hierarchy includes one or more levels of cache unit(s) circuitry 1704(A)-(N) within the cores 1702(A)-(N), a set of one or more shared cache unit(s) circuitry 1706, and external memory (not shown) coupled to the set of integrated memory controller unit(s) circuitry 1714. The set of one or more shared cache unit(s) circuitry 1706 may include one or more mid-level caches, such as level 2 (L2), level 3 (L3), level 4 (L4), or other levels of cache, such as a last level cache (LLC), and/or combinations thereof. While in some examples interface network circuitry 1712 (e.g., a ring interconnect) interfaces the special purpose logic 1708 (e.g., integrated graphics logic), the set of shared cache unit(s) circuitry 1706, and the system agent unit circuitry 1710, alternative examples use any number of well-known techniques for interfacing such units. In some examples, coherency is maintained between one or more of the shared cache unit(s) circuitry 1706 and cores 1702(A)-(N). In some examples, interface controller units circuitry 1716 couple the cores 1702 to one or more other devices 1718 such as one or more IO devices, storage, one or more communication devices (e.g., wireless networking, wired networking, etc.), etc.

In some examples, one or more of the cores 1702(A)-(N) are capable of multi-threading. The system agent unit circuitry 1710 includes those components coordinating and operating cores 1702(A)-(N). The system agent unit circuitry 1710 may include, for example, power control unit (PCU) circuitry and/or display unit circuitry (not shown). The PCU may be or may include logic and components needed for regulating the power state of the cores 1702(A)-(N) and/or the special purpose logic 1708 (e.g., integrated graphics logic). The display unit circuitry is for driving one or more externally connected displays.

The cores 1702(A)-(N) may be homogenous in terms of instruction set architecture (ISA). Alternatively, the cores 1702(A)-(N) may be heterogeneous in terms of ISA; that is, a subset of the cores 1702(A)-(N) may be capable of executing an ISA, while other cores may be capable of executing only a subset of that ISA or another ISA.

Example Core Architectures—In-Order and Out-of-Order Core Block Diagram

Figure 18A:
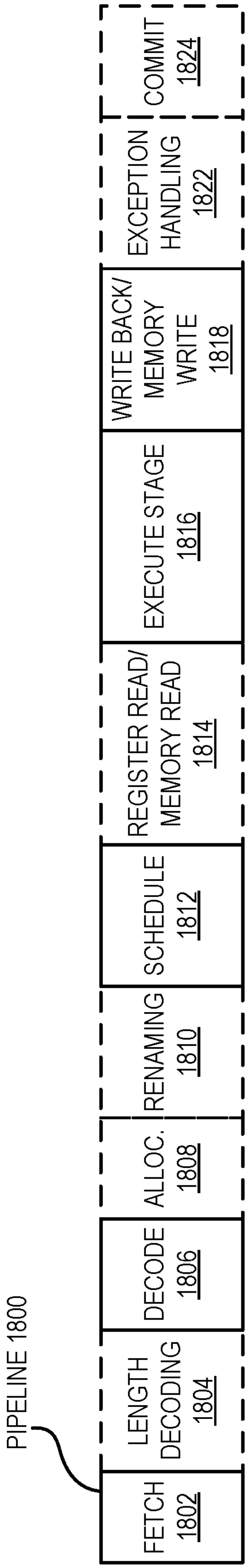
FIG. 18A is a block diagram illustrating both an example in-order pipeline and an example register renaming, out-of-order issue/execution pipeline according to examples.
Figure 18B:
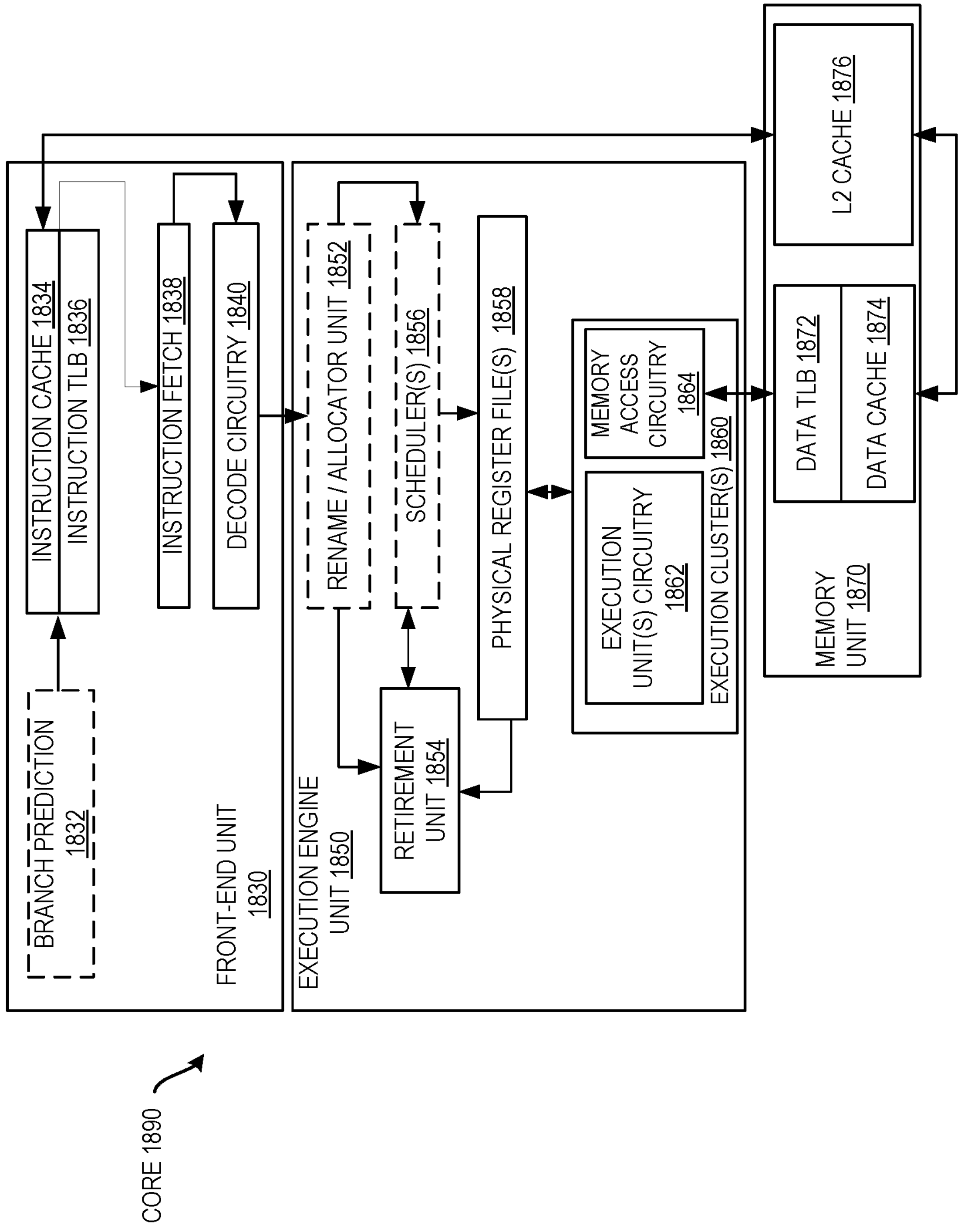
FIG. 18B is a block diagram illustrating both an example in-order architecture core and an example register renaming, out-of-order issue/execution architecture core to be included in a processor according to examples.

FIG. 18A is a block diagram illustrating both an example in-order pipeline and an example register renaming, out-of-order issue/execution pipeline according to examples. FIG. 18B is a block diagram illustrating both an example in-order architecture core and an example register renaming, out-of-order issue/execution architecture core to be included in a processor according to examples. The solid lined boxes in FIGS. 18A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 18A, a processor pipeline 1800 includes a fetch stage 1802, an optional length decoding stage 1804, a decode stage 1806, an optional allocation (Alloc) stage 1808, an optional renaming stage 1810, a schedule (also known as a dispatch or issue) stage 1812, an optional register read/memory read stage 1814, an execute stage 1816, a write back/memory write stage 1818, an optional exception handling stage 1822, and an optional commit stage 1824. One or more operations can be performed in each of these processor pipeline stages. For example, during the fetch stage 1802, one or more instructions are fetched from instruction memory, and during the decode stage 1806, the one or more fetched instructions may be decoded, addresses (e.g., load store unit (LSU) addresses) using forwarded register ports may be generated, and branch forwarding (e.g., immediate offset or a link register (LR)) may be performed. In one example, the decode stage 1806 and the register read/memory read stage 1814 may be combined into one pipeline stage. In one example, during the execute stage 1816, the decoded instructions may be executed, LSU address/data pipelining to an Advanced Microcontroller Bus (AMB) interface may be performed, multiply and add operations may be performed, arithmetic operations with branch results may be performed, etc.

By way of example, the example register renaming, out-of-order issue/execution architecture core of FIG. 18B may implement the pipeline 1800 as follows: 1) the instruction fetch circuitry 1838 performs the fetch and length decoding stages 1802 and 1804; 2) the decode circuitry 1840 performs the decode stage 1806; 3) the rename/allocator unit circuitry 1852 performs the allocation stage 1808 and renaming stage 1810; 4) the scheduler(s) circuitry 1856 performs the schedule stage 1812; 5) the physical register file(s) circuitry 1858 and the memory unit circuitry 1870 perform the register read/memory read stage 1814; the execution cluster(s) 1860 perform the execute stage 1816;

15) the memory unit circuitry 1870 and the physical register file(s) circuitry 1858 perform the write back/memory write stage 1818; 7) various circuitry may be involved in the exception handling stage 1822; and 8) the retirement unit circuitry 1854 and the physical register file(s) circuitry 1858 perform the commit stage 1824.

FIG. 18B shows a processor core 1890 including front-end unit circuitry 1830 coupled to execution engine unit circuitry 1850, and both are coupled to memory unit circuitry 1870. The core 1890 may be a reduced instruction set architecture computing (RISC) core, a complex instruction set architecture computing (CISC) core, a very long instruction word (VLIW) core, or a hybrid or alternative core type. As yet another option, the core 1890 may be a special-purpose core, such as, for example, a network or communication core, compression engine, coprocessor core, general purpose computing graphics processing unit (GPGPU) core, graphics core, or the like.

The front-end unit circuitry 1830 may include branch prediction circuitry 1832 coupled to instruction cache circuitry 1834, which is coupled to an instruction translation lookaside buffer (TLB) 1836, which is coupled to instruction fetch circuitry 1838, which is coupled to decode circuitry 1840. In one example, the instruction cache circuitry 1834 is included in the memory unit circuitry 1870 rather than the front-end circuitry 1830. The decode circuitry 1840 (or decoder) may decode instructions, and generate as an output one or more micro-operations, micro-code entry points, microinstructions, other instructions, or other control signals, which are decoded from, or which otherwise reflect, or are derived from, the original instructions. The decode circuitry 1840 may further include address generation unit (AGU, not shown) circuitry. In one example, the AGU generates an LSU address using forwarded register ports, and may further perform branch forwarding (e.g., immediate offset branch forwarding, LR register branch forwarding, etc.). The decode circuitry 1840 may be implemented using various different mechanisms. Examples of suitable mechanisms include, but are not limited to, look-up tables, hardware implementations, programmable logic arrays (PLAs), microcode read only memories (ROMs), etc. In one example, the core 1890 includes a microcode ROM (not shown) or other medium that stores microcode for certain macroinstructions (e.g., in decode circuitry 1840 or otherwise within the front-end circuitry 1830). In one example, the decode circuitry 1840 includes a micro-operation (micro-op) or operation cache (not shown) to hold/cache decoded operations, micro-tags, or micro-operations generated during the decode or other stages of the processor pipeline 1800. The decode circuitry 1840 may be coupled to rename/allocator unit circuitry 1852 in the execution engine circuitry 1850.

The execution engine circuitry 1850 includes the rename/allocator unit circuitry 1852 coupled to retirement unit circuitry 1854 and a set of one or more scheduler(s) circuitry 1856. The scheduler(s) circuitry 1856 represents any number of different schedulers, including reservations stations, central instruction window, etc. In some examples, the scheduler(s) circuitry 1856 can include arithmetic logic unit (ALU) scheduler/scheduling circuitry, ALU queues, address generation unit (AGU) scheduler/scheduling circuitry, AGU queues, etc. The scheduler(s) circuitry 1856 is coupled to the physical register file(s) circuitry 1858. Each of the physical register file(s) circuitry 1858 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one example, the physical register file(s) circuitry 1858 includes vector registers unit circuitry, writemask registers unit circuitry, and scalar register unit circuitry. These register units may provide architectural vector registers, vector mask registers, general-purpose registers, etc. The physical register file(s) circuitry 1858 is coupled to the retirement unit circuitry 1854 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 1854 and the physical register file(s) circuitry 1858 are coupled to the execution cluster(s) 1860. The execution cluster(s) 1860 includes a set of one or more execution unit(s) circuitry 1862 and a set of one or more memory access circuitry 1864. The execution unit(s) circuitry 1862 may perform various arithmetic, logic, floating-point or other types of operations (e.g., shifts, addition, subtraction, multiplication) and on various types of data (e.g., scalar integer, scalar floating-point, packed integer, packed floating-point, vector integer, vector floating-point). While some examples may include a number of execution units or execution unit circuitry dedicated to specific functions or sets of functions, other examples may include only one execution unit circuitry or multiple execution units/execution unit circuitry that all perform all functions. The scheduler(s) circuitry 1856, physical register file(s) circuitry 1858, and execution cluster(s) 1860 are shown as being possibly plural because certain examples create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) circuitry, and/or execution cluster—and in the case of a separate memory access pipeline, certain examples are implemented in which only the execution cluster of this pipeline has the memory access unit(s) circuitry 1864). It should also be understood that where separate pipelines are used, one or more of these pipelines may be out-of-order issue/execution and the rest in-order.

In some examples, the execution engine unit circuitry 1850 may perform load store unit (LSU) address/data pipelining to an Advanced Microcontroller Bus (AMB) interface (not shown), and address phase and writeback, data phase load, store, and branches.

The set of memory access circuitry 1864 is coupled to the memory unit circuitry 1870, which includes data TLB circuitry 1872 coupled to data cache circuitry 1874 coupled to level 2 (L2) cache circuitry 1876. In one example, the memory access circuitry 1864 may include load unit circuitry, store address unit circuitry, and store data unit circuitry, each of which is coupled to the data TLB circuitry 1872 in the memory unit circuitry 1870. The instruction cache circuitry 1834 is further coupled to the level 2 (L2) cache circuitry 1876 in the memory unit circuitry 1870. In one example, the instruction cache 1834 and the data cache 1874 are combined into a single instruction and data cache (not shown) in L2 cache circuitry 1876, level 3 (L3) cache circuitry (not shown), and/or main memory. The L2 cache circuitry 1876 is coupled to one or more other levels of cache and eventually to a main memory.

The core 1890 may support one or more instructions sets (e.g., the x86 instruction set architecture (optionally with some extensions that have been added with newer versions); the MIPS instruction set architecture; the ARM instruction set architecture (optionally with optional additional extensions such as NEON)), including the instruction(s) described herein. In one example, the core 1890 includes logic to support a packed data instruction set architecture extension (e.g., AVX1, AVX2), thereby allowing the operations used by many multimedia applications to be performed using packed data.

Example Execution Unit(s) Circuitry

Figure 19:
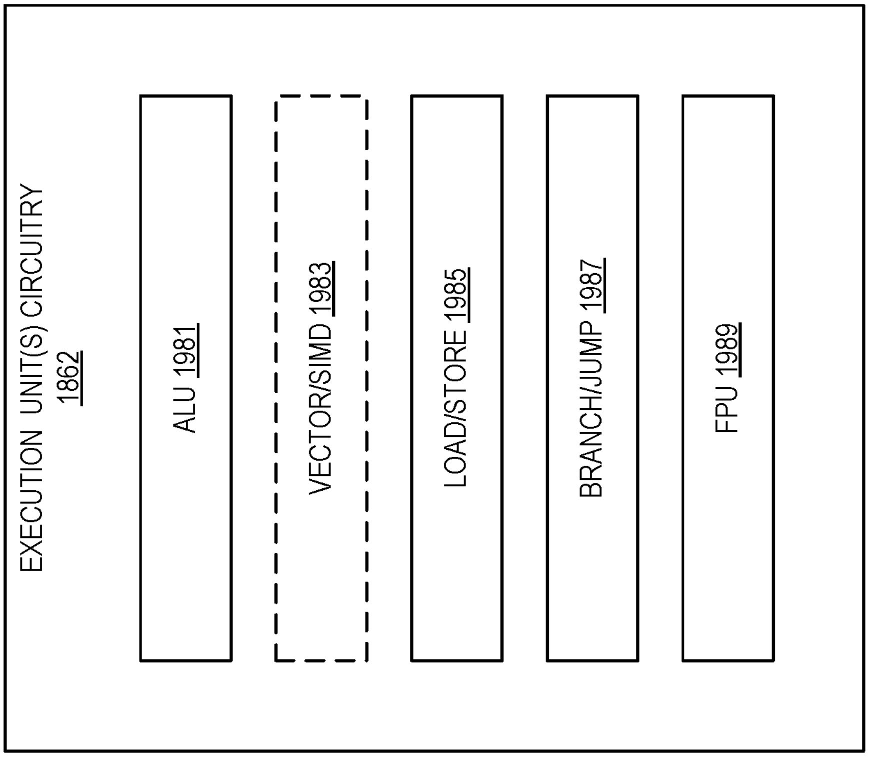
FIG. 19 illustrates examples of execution unit(s) circuitry.

FIG. 19 illustrates examples of execution unit(s) circuitry, such as execution unit(s) circuitry 1862 of FIG. 18B. As illustrated, execution unit(s) circuitry 1862 may include one or more ALU circuits 1981, optional vector/single instruction multiple data (SIMD) circuits 1983, load/store circuits 1985, branch/jump circuits 1987, and/or Floating-point unit (FPU) circuits 1989. ALU circuits 1981 perform integer arithmetic and/or Boolean operations. Vector/SIMD circuits 1983 perform vector/SIMD operations on packed data (such as SIMD/vector registers). Load/store circuits 1985 execute load and store instructions to load data from memory into registers or store from registers to memory. Load/store circuits 1985 may also generate addresses. Branch/jump circuits 1987 cause a branch or jump to a memory address depending on the instruction. FPU circuits 1989 perform floating-point arithmetic. The width of the execution unit(s) circuitry 1862 varies depending upon the example and can range from 16-bit to 1,024-bit, for example. In some examples, two or more smaller execution units are logically combined to form a larger execution unit (e.g., two 128-bit execution units are logically combined to form a 256-bit execution unit).

Example Register Architecture

Figure 20:
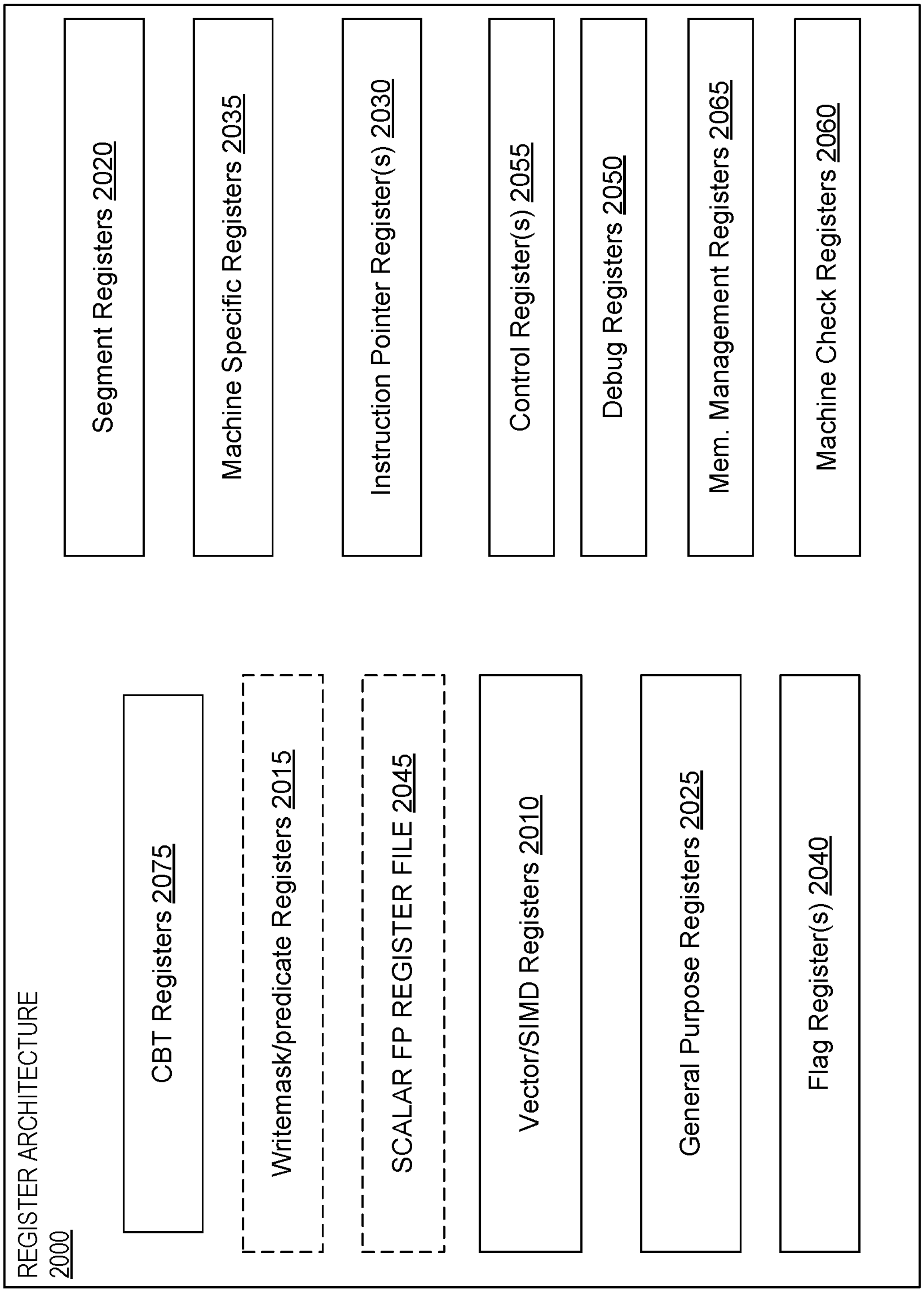
FIG. 20 is a block diagram of a register architecture according to some examples.

FIG. 20 is a block diagram of a register architecture 2000 according to some examples. As illustrated, the register architecture 2000 includes vector/SIMD registers 2010 that vary from 128-bit to 1,024 bits width. In some examples, the vector/SIMD registers 2010 are physically 512-bits and, depending upon the mapping, only some of the lower bits are used. For example, in some examples, the vector/SIMD registers 2010 are ZMM registers which are 512 bits: the lower 256 bits are used for YMM registers and the lower 128 bits are used for XMM registers. As such, there is an overlay of registers. In some examples, a vector length field selects between a maximum length and one or more other shorter lengths, where each such shorter length is half the length of the preceding length. Scalar operations are operations performed on the lowest order data element position in a ZMM/YMM/XMM register; the higher order data element positions are either left the same as they were prior to the instruction or zeroed depending on the example.

In some examples, the register architecture 2000 includes writemask/predicate registers 2015. For example, in some examples, there are 8 writemask/predicate registers (sometimes called k0 through k7) that are each 16-bit, 32-bit, 154-bit, or 128-bit in size. Writemask/predicate registers 2015 may allow for merging (e.g., allowing any set of elements in the destination to be protected from updates during the execution of any operation) and/or zeroing (e.g., zeroing vector masks allow any set of elements in the destination to be zeroed during the execution of any operation). In some examples, each data element position in a given writemask/predicate register 2015 corresponds to a data element position of the destination. In other examples, the writemask/predicate registers 2015 are scalable and consists of a set number of enable bits for a given vector element (e.g., 8 enable bits per 154-bit vector element).

The register architecture 2000 includes a plurality of general-purpose registers 2025. These registers may be 16-bit, 32-bit, 154-bit, etc. and can be used for scalar operations. In some examples, these registers are referenced by the names RAX, RBX, RCX, RDX, RBP, RSI, RDI, RSP, and R8 through R15.

In some examples, the register architecture 2000 includes scalar floating-point (FP) register file 2045 which is used for scalar floating-point operations on 32/64/80-bit floating-point data using the x87 instruction set architecture extension or as MMX registers to perform operations on 154-bit packed integer data, as well as to hold operands for some operations performed between the MMX and XMM registers.

One or more flag registers 2040 (e.g., EFLAGS, RFLAGS, etc.) store status and control information for arithmetic, compare, and system operations. For example, the one or more flag registers 2040 may store condition code information such as carry, parity, auxiliary carry, zero, sign, and overflow. In some examples, the one or more flag registers 2040 are called program status and control registers.

Segment registers 2020 contain segment points for use in accessing memory. In some examples, these registers are referenced by the names CS, DS, SS, ES, FS, and GS.

Machine specific registers (MSRs) 2035 control and report on processor performance. Most MSRs 2035 handle system-related functions and are not accessible to an application program. Machine check registers 2060 consist of control, status, and error reporting MSRs that are used to detect and report on hardware errors.

One or more instruction pointer register(s) 2030 store an instruction pointer value. Control register(s) 2055 (e.g., CR0-CR4) determine the operating mode of a processor (e.g., processor 1670, 1680, 1638, 1615, and/or 1700) and the characteristics of a currently executing task. Debug registers 2050 control and allow for the monitoring of a processor or core's debugging operations.

Memory (mem) management registers 2065 specify the locations of data structures used in protected mode memory management. These registers may include a global descriptor table register (GDTR), interrupt descriptor table register (IDTR), task register, and a local descriptor table register (LDTR) register.

CBT registers 2075 (e.g., which may be MSRs) control and report on multi-level cache selective coherency bypass. In some implementations, the CBT registers 2075 may include or may extend MSRs utilized in connection with INTEL® RDT, CMP, CAT, and CDP (e.g., including the IA32_CR_PAT MSR).

Alternative examples may use wider or narrower registers. Additionally, alternative examples may use more, less, or different register files and registers. The register architecture 2000 may, for example, be used in register file/memory, or physical register file(s) circuitry 1858.

Instruction Set Architectures.

An instruction set architecture (ISA) may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down through the definition of instruction templates (or sub-formats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an example ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. In addition, though the description below is made in the context of x86 ISA, it is within the knowledge of one skilled in the art to apply the teachings of the present disclosure in another ISA.

Example Instruction Formats

Examples of the instruction(s) described herein may be embodied in different formats. Additionally, example systems, architectures, and pipelines are detailed below. Examples of the instruction(s) may be executed on such systems, architectures, and pipelines, but are not limited to those detailed.

Figure 21:
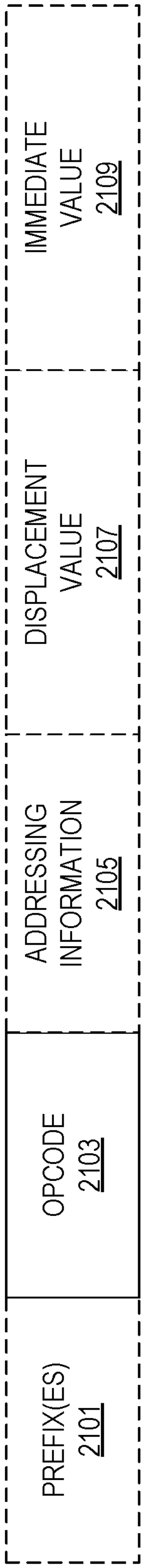
FIG. 21 illustrates examples of an instruction format.

FIG. 21 illustrates examples of an instruction format. As illustrated, an instruction may include multiple components including, but not limited to, one or more fields for: one or more prefixes 2101, an opcode 2103, addressing information 2105 (e.g., register identifiers, memory addressing information, etc.), a displacement value 2107, and/or an immediate value 2109. Note that some instructions utilize some or all the fields of the format whereas others may only use the field for the opcode 2103. In some examples, the order illustrated is the order in which these fields are to be encoded, however, it should be appreciated that in other examples these fields may be encoded in a different order, combined, etc.

The prefix(es) field(s) 2101, when used, modifies an instruction. In some examples, one or more prefixes are used to repeat string instructions (e.g., 0xF0, 0xF2, 0xF3, etc.), to provide section overrides (e.g., 0x2E, 0x36, 0x3E, 0x26, 0x64, 0x65, 0x2E, 0x3E, etc.), to perform bus lock operations, and/or to change operand (e.g., 0x66) and address sizes (e.g., 0x67). Certain instructions require a mandatory prefix (e.g., 0x66, 0xF2, 0xF3, etc.). Certain of these prefixes may be considered "legacy" prefixes. Other prefixes, one or more examples of which are detailed herein, indicate, and/or provide further capability, such as specifying particular registers, etc. The other prefixes typically follow the "legacy" prefixes.

The opcode field 2103 is used to at least partially define the operation to be performed upon a decoding of the instruction. In some examples, a primary opcode encoded in the opcode field 2103 is one, two, or three bytes in length. In other examples, a primary opcode can be a different length. An additional 3-bit opcode field is sometimes encoded in another field.

Figure 22:
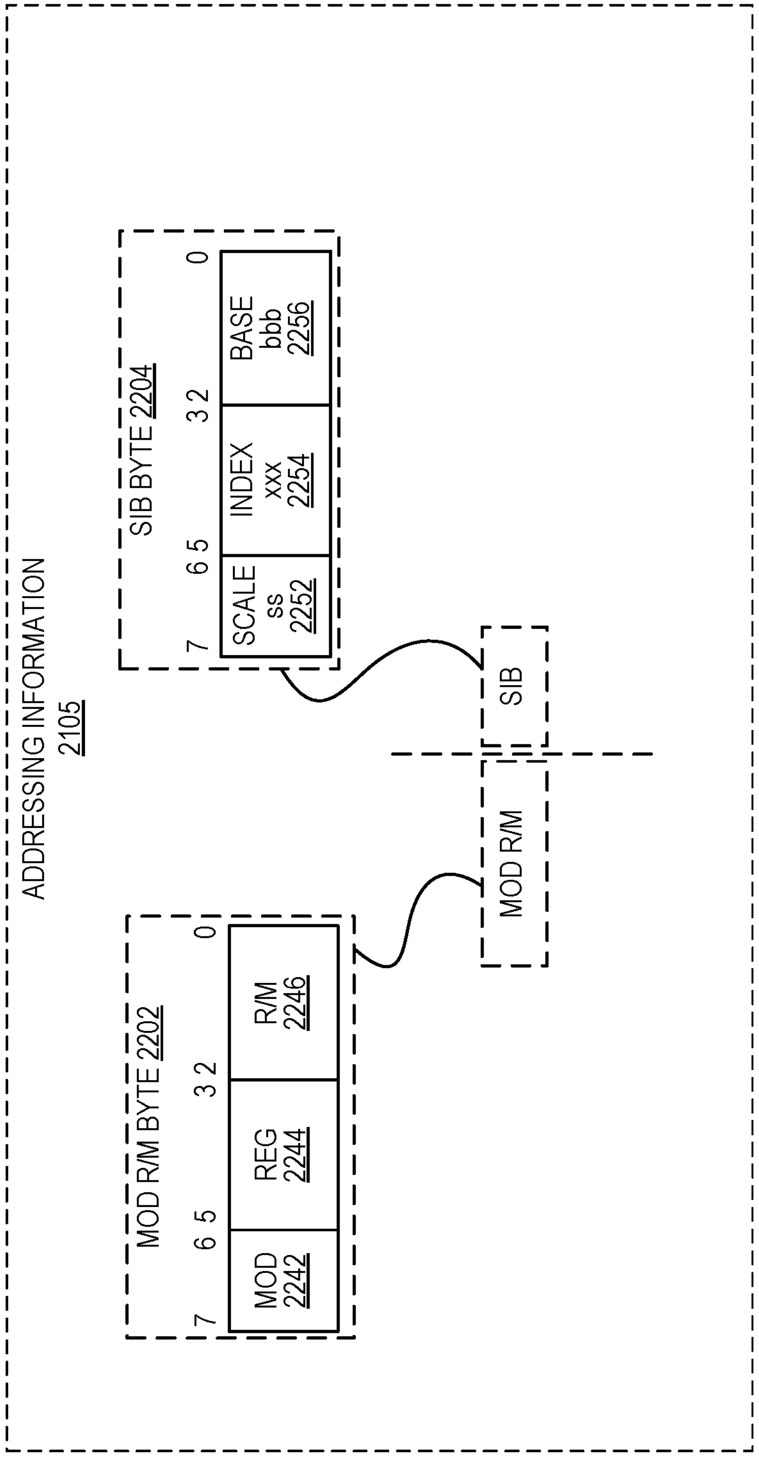
FIG. 22 illustrates examples of an addressing information field.

The addressing information field 2105 is used to address one or more operands of the instruction, such as a location in memory or one or more registers. FIG. 22 illustrates examples of the addressing information field 2105. In this illustration, an optional MOD R/M byte 2202 and an optional Scale, Index, Base (SIB) byte 2204 are shown. The MOD R/M byte 2202 and the SIB byte 2204 are used to encode up to two operands of an instruction, each of which is a direct register or effective memory address. Note that both of these fields are optional in that not all instructions include one or more of these fields. The MOD R/M byte 2202 includes a MOD field 2242, a register (reg) field 2244, and R/M field 2246.

The content of the MOD field 2242 distinguishes between memory access and non-memory access modes. In some examples, when the MOD field 2242 has a binary value of 11 (11*b*), a register-direct addressing mode is utilized, and otherwise a register-indirect addressing mode is used.

The register field 2244 may encode either the destination register operand or a source register operand or may encode an opcode extension and not be used to encode any instruction operand. The content of register field 2244, directly or through address generation, specifies the locations of a source or destination operand (either in a register or in memory). In some examples, the register field 2244 is supplemented with an additional bit from a prefix (e.g., prefix 2101) to allow for greater addressing.

The R/M field 2246 may be used to encode an instruction operand that references a memory address or may be used to encode either the destination register operand or a source register operand. Note the R/M field 2246 may be combined with the MOD field 2242 to dictate an addressing mode in some examples.

The SIB byte 2204 includes a scale field 2252, an index field 2254, and a base field 2256 to be used in the generation of an address. The scale field 2252 indicates a scaling factor. The index field 2254 specifies an index register to use. In some examples, the index field 2254 is supplemented with an additional bit from a prefix (e.g., prefix 2101) to allow for greater addressing. The base field 2256 specifies a base register to use. In some examples, the base field 2256 is supplemented with an additional bit from a prefix (e.g., prefix 2101) to allow for greater addressing. In practice, the content of the scale field 2252 allows for the scaling of the content of the index field 2254 for memory address generation (e.g., for address generation that uses $2^{scale}$*index+base).

Some addressing forms utilize a displacement value to generate a memory address. For example, a memory address may be generated according to $2^{scale}$*index+base+displacement, index*scale+displacement, r/m+displacement, instruction pointer (RIP/EIP)+displacement, register+displacement, etc. The displacement may be a 1-byte, 2-byte, 4-byte, etc. value. In some examples, the displacement field 2107 provides this value. Additionally, in some examples, a displacement factor usage is encoded in the MOD field of the addressing information field 2105 that indicates a compressed displacement scheme for which a displacement value is calculated and stored in the displacement field 2107.

In some examples, the immediate value field 2109 specifies an immediate value for the instruction. An immediate value may be encoded as a 1-byte value, a 2-byte value, a 4-byte value, etc.

Figure 23:
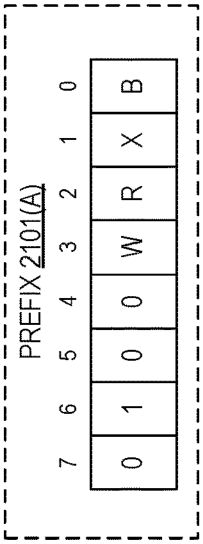
FIG. 23 illustrates examples of a first prefix.

FIG. 23 illustrates examples of a first prefix 2101(A). In some examples, the first prefix 2101(A) is an example of a REX prefix. Instructions that use this prefix may specify general purpose registers, 64-bit packed data registers (e.g., single instruction, multiple data (SIMD) registers or vector registers), and/or control registers and debug registers (e.g., CR8-CR15 and DR8-DR15).

Instructions using the first prefix 2101(A) may specify up to three registers using 3-bit fields depending on the format:

1) using the reg field 2244 and the R/M field 2246 of the MOD R/M byte 2202; 2) using the MOD R/M byte 2202 with the SIB byte 2204 including using the reg field 2244 and the base field 2256 and index field 2254; or 3) using the register field of an opcode.

In the first prefix 2101(A), bit positions 7:4 are set as 0100. Bit position 3 (W) can be used to determine the operand size but may not solely determine operand width. As such, when W=0, the operand size is determined by a code segment descriptor (CS.D) and when W=1, the operand size is 64-bit.

Note that the addition of another bit allows for 16 ($2^4$) registers to be addressed, whereas the MOD R/M reg field 2244 and MOD R/M R/M field 2246 alone can each only address 8 registers.

In the first prefix 2101(A), bit position 2 (R) may be an extension of the MOD R/M reg field 2244 and may be used to modify the MOD R/M reg field 2244 when that field encodes a general-purpose register, a 64-bit packed data register (e.g., a SSE register), or a control or debug register. R is ignored when MOD R/M byte 2202 specifies other registers or defines an extended opcode.

Bit position 1 (X) may modify the SIB byte index field 2254.

Bit position 0 (B) may modify the base in the MOD R/M R/M field 2246 or the SIB byte base field 2256; or it may modify the opcode register field used for accessing general purpose registers (e.g., general purpose registers 2025).

Figure 24A:
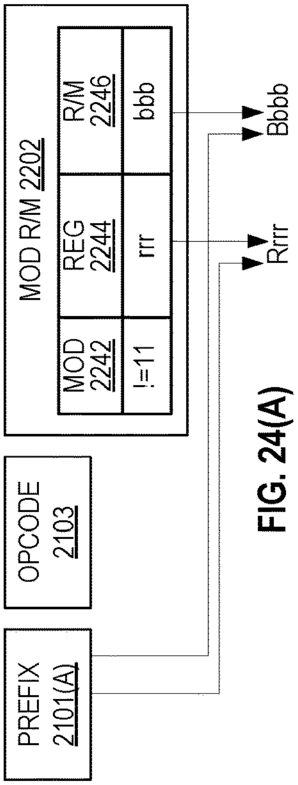
FIGS. 24(A)-(D) illustrate examples of how the R, X, and B fields of the first prefix in FIG. 23 are used.
Figure 24B:
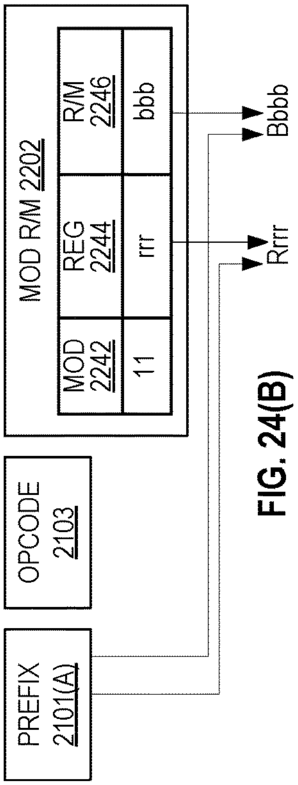
Figure 24C:
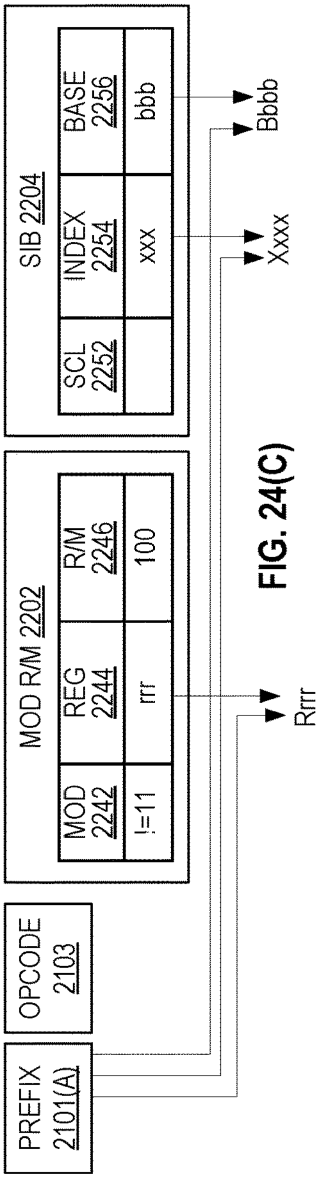
Figure 24D:
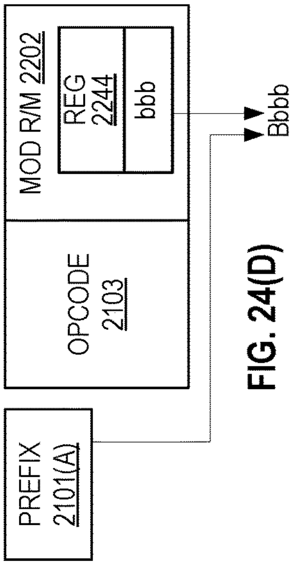

FIGS. 24(A)-(D) illustrate examples of how the R, X, and B fields of the first prefix 2101(A) are used. FIG. 24(A) illustrates R and B from the first prefix 2101(A) being used to extend the reg field 2244 and R/M field 2246 of the MOD R/M byte 2202 when the SIB byte 2204 is not used for memory addressing. FIG. 24(B) illustrates R and B from the first prefix 2101(A) being used to extend the reg field 2244 and R/M field 2246 of the MOD R/M byte 2202 when the SIB byte 2204 is not used (register-register addressing). FIG. 24(C) illustrates R, X, and B from the first prefix 2101(A) being used to extend the reg field 2244 of the MOD R/M byte 2202 and the index field 2254 and base field 2256 when the SIB byte 2204 being used for memory addressing. FIG. 24(D) illustrates B from the first prefix 2101(A) being used to extend the reg field 2244 of the MOD R/M byte 2202 when a register is encoded in the opcode 2103.

Figure 25A:
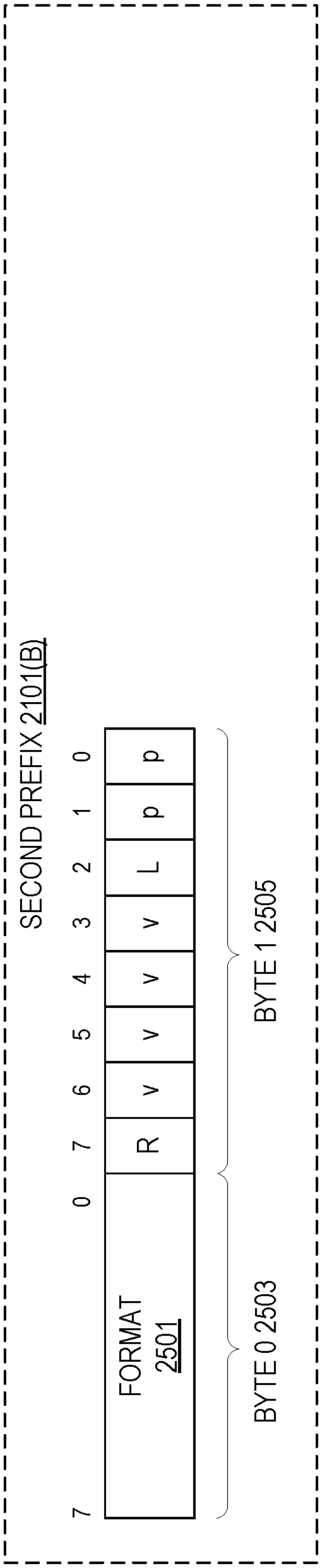
FIGS. 25(A)-(B) illustrate examples of a second prefix.
Figure 25B:
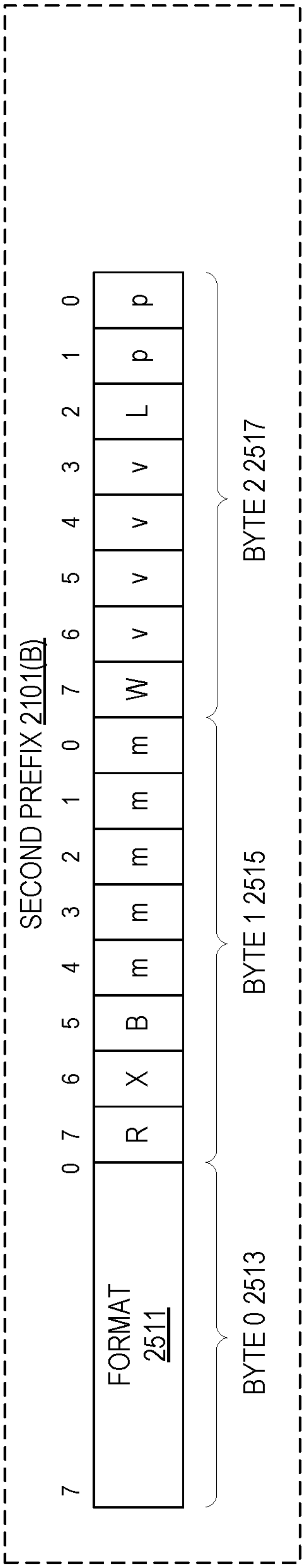

FIGS. 25(A)-(B) illustrate examples of a second prefix 2101(B). In some examples, the second prefix 2101(B) is an example of a VEX prefix. The second prefix 2101(B) encoding allows instructions to have more than two operands, and allows SIMD vector registers (e.g., vector/SIMD registers 2010) to be longer than 64-bits (e.g., 128-bit and 256-bit). The use of the second prefix 2101(B) provides for three-operand (or more) syntax. For example, previous two-operand instructions performed operations such as A=A+B, which overwrites a source operand. The use of the second prefix 2101(B) enables operands to perform nondestructive operations such as A=B+C.

In some examples, the second prefix 2101(B) comes in two forms—a two-byte form and a three-byte form. The two-byte second prefix 2101(B) is used mainly for 128-bit, scalar, and some 256-bit instructions; while the three-byte second prefix 2101(B) provides a compact replacement of the first prefix 2101(A) and 3-byte opcode instructions.

FIG. 25(A) illustrates examples of a two-byte form of the second prefix 2101(B). In one example, a format field 2501 (byte 0 2503) contains the value C5H. In one example, byte 1 2505 includes an "R" value in bit[7]. This value is the complement of the "R" value of the first prefix 2101(A). Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3] shown as vvvv may be used to: 1) encode the first source register operand, specified in inverted (1s complement) form and valid for instructions with 2 or more source operands; 2) encode the destination register operand, specified in Is complement form for certain vector shifts; or 3) not encode any operand, the field is reserved and should contain a certain value, such as 1111b.

Instructions that use this prefix may use the MOD R/M R/M field 2246 to encode the instruction operand that references a memory address or encode either the destination register operand or a source register operand.

Instructions that use this prefix may use the MOD R/M reg field 2244 to encode either the destination register operand or a source register operand, or to be treated as an opcode extension and not used to encode any instruction operand.

For instruction syntax that support four operands, vvvv, the MOD R/M R/M field 2246 and the MOD R/M reg field 2244 encode three of the four operands. Bits[7:4] of the immediate value field 2109 are then used to encode the third source register operand.

FIG. 25(B) illustrates examples of a three-byte form of the second prefix 2101(B). In one example, a format field 2511 (byte 0 2513) contains the value C4H. Byte 1 2515 includes in bits[7:5] "R," "X," and "B" which are the complements of the same values of the first prefix 2101(A). Bits[4:0] of byte 1 2515 (shown as mmmmm) include content to encode, as need, one or more implied leading opcode bytes. For example, 00001 implies a OFH leading opcode, 00010 implies a 0F38H leading opcode, 00011 implies a 0F3AH leading opcode, etc.

Bit[7] of byte 2 2517 is used similar to W of the first prefix 2101(A) including helping to determine promotable operand sizes. Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3], shown as vvvv, may be used to: 1) encode the first source register operand, specified in inverted (1s complement) form and valid for instructions with 2 or more source operands; 2) encode the destination register operand, specified in Is complement form for certain vector shifts; or 3) not encode any operand, the field is reserved and should contain a certain value, such as 1111b.

Instructions that use this prefix may use the MOD R/M R/M field 2246 to encode the instruction operand that references a memory address or encode either the destination register operand or a source register operand.

Instructions that use this prefix may use the MOD R/M reg field 2244 to encode either the destination register operand or a source register operand, or to be treated as an opcode extension and not used to encode any instruction operand.

For instruction syntax that support four operands, vvvv, the MOD R/M R/M field 2246, and the MOD R/M reg field 2244 encode three of the four operands. Bits[7:4] of the immediate value field 2109 are then used to encode the third source register operand.

Figure 26:
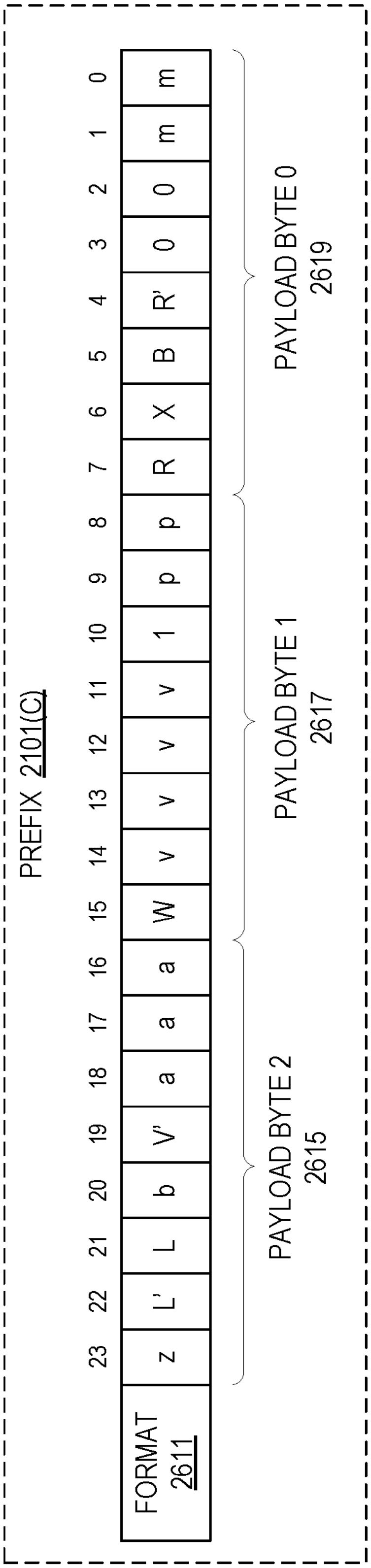
FIG. 26 illustrates examples of a third prefix.

FIG. 26 illustrates examples of a third prefix 2101(C). In some examples, the third prefix 2101(C) is an example of an EVEX prefix. The third prefix 2101(C) is a four-byte prefix.

The third prefix 2101(C) can encode 32 vector registers (e.g., 128-bit, 256-bit, and 512-bit registers) in 64-bit mode. In some examples, instructions that utilize a writemask/opmask (see discussion of registers in a previous figure, such as FIG. 20) or predication utilize this prefix. Opmask register allow for conditional processing or selection control. Opmask instructions, whose source/destination operands are opmask registers and treat the content of an opmask register as a single value, are encoded using the second prefix 2101(B).

The third prefix 2101(C) may encode functionality that is specific to instruction classes (e.g., a packed instruction with "load+op" semantic can support embedded broadcast functionality, a floating-point instruction with rounding semantic can support static rounding functionality, a floating-point instruction with non-rounding arithmetic semantic can support "suppress all exceptions" functionality, etc.).

The first byte of the third prefix 2101(C) is a format field 2611 that has a value, in one example, of 62H. Subsequent bytes are referred to as payload bytes 2615-2619 and collectively form a 24-bit value of P[23:0] providing specific capability in the form of one or more fields (detailed herein).

In some examples, P[1:0] of payload byte 2619 are identical to the low two mm bits. P[3:2] are reserved in some examples. Bit P[4] (R') allows access to the high 16 vector register set when combined with P[7] and the MOD R/M reg field 2244. P[6] can also provide access to a high 16 vector register when SIB-type addressing is not needed. P[7:5] consist of R, X, and B which are operand specifier modifier bits for vector register, general purpose register, memory addressing and allow access to the next set of 8 registers beyond the low 8 registers when combined with the MOD R/M register field 2244 and MOD R/M R/M field 2246. P[9:8] provide opcode extensionality equivalent to some legacy prefixes (e.g., 00=no prefix, 01=66H, 10=F3H, and 11=F2H). P[10] in some examples is a fixed value of 1. P[14:11], shown as vvvv, may be used to: 1) encode the first source register operand, specified in inverted (Is complement) form and valid for instructions with 2 or more source operands; 2) encode the destination register operand, specified in Is complement form for certain vector shifts; or 3) not encode any operand, the field is reserved and should contain a certain value, such as 1111b.

P[15] is similar to W of the first prefix 2101(A) and second prefix 2111(B) and may serve as an opcode extension bit or operand size promotion.

P[18:16] specify the index of a register in the opmask (writemask) registers (e.g., writemask/predicate registers 2015). In one example, the specific value aaa=000 has a special behavior implying no opmask is used for the particular instruction (this may be implemented in a variety of ways including the use of a opmask hardwired to all ones or hardware that bypasses the masking hardware). When merging, vector masks allow any set of elements in the destination to be protected from updates during the execution of any operation (specified by the base operation and the augmentation operation); in other one example, preserving the old value of each element of the destination where the corresponding mask bit has a 0. In contrast, when zeroing vector masks allow any set of elements in the destination to be zeroed during the execution of any operation (specified by the base operation and the augmentation operation); in one example, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the opmask field allows for partial vector operations, including loads, stores, arithmetic, logical, etc. While examples are described in which the opmask field's content selects one of a number of opmask registers that contains the opmask to be used (and thus the opmask field's content indirectly identifies that masking to be performed), alternative examples instead or additional allow the mask write field's content to directly specify the masking to be performed.

P[19] can be combined with P[14:11] to encode a second source vector register in a non-destructive source syntax which can access an upper 16 vector registers using P[19]. P[20] encodes multiple functionalities, which differs across different classes of instructions and can affect the meaning of the vector length/rounding control specifier field (P[22:21]). P[23] indicates support for merging-writemasking (e.g., when set to 0) or support for zeroing and merging-writemasking (e.g., when set to 1).

Example examples of encoding of registers in instructions using the third prefix 2101(C) are detailed in the following tables.

TABLE 1

32-Register Support in 64-bit Mode

| | 4 | 3 | [2:0] | REG. TYPE | COMMON USAGES |
|---|---|---|---|---|---|
| REG | R' | R | Mod R/M reg | GPR, Vector | Destination or Source |
| VVVV | V' | | vvvv | GPR, Vector | 2nd Source or Destination |
| RM | X | B | Mod R/M R/M | GPR, Vector | 1st Source or Destination |
| BASE | 0 | B | Mod R/M R/M | GPR | Memory addressing |
| INDEX | 0 | X | SIB.index | GPR | Memory addressing |
| VIDX | V' | X | SIB.index | Vector | VSIB memory addressing |

TABLE 2

Encoding Register Specifiers in 32-bit Mode

| | [2:0] | REG. TYPE | COMMON USAGES |
|---|---|---|---|
| REG | Mod R/M reg | GPR, Vector | Destination or Source |
| VVVV | vvvv | GPR, Vector | $2^{nd}$ Source or Destination |
| RM | Mod R/M R/M | GPR, Vector | $1^{st}$ Source or Destination |
| BASE | Mod R/M R/M | GPR | Memory addressing |
| INDEX | SIB.index | GPR | Memory addressing |
| VIDX | SIB.index | Vector | VSIB memory addressing |

TABLE 3

Opmask Register Specifier Encoding

| | [2:0] | REG. TYPE | COMMON USAGES |
|---|---|---|---|
| REG | Mod R/M Reg | k0-k7 | Source |
| VVVV | vvvv | k0-k7 | $2^{nd}$ Source |
| RM | Mod R/M R/M | k0-k7 | $1^{st}$ Source |
| {k1} | aaa | k0-k7 | Opmask |

Program code may be applied to input information to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), a field programmable gate array (FPGA), a microprocessor, or any combination thereof.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

Examples of the mechanisms disclosed herein may be implemented in hardware, software, firmware, or a combination of such implementation approaches. Examples may be implemented as computer programs or program code executing on programmable systems comprising at least one processor, a storage system (including volatile and non-volatile memory and/or storage elements), at least one input device, and at least one output device.

One or more aspects of at least one example may be implemented by representative instructions stored on a machine-readable medium which represents various logic within the processor, which when read by a machine causes the machine to fabricate logic to perform the techniques described herein. Such representations, known as "intellectual property (IP) cores" may be stored on a tangible, machine readable medium and supplied to various customers or manufacturing facilities to load into the fabrication machines that make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, examples also include non-transitory, tangible machine-readable media containing instructions or containing design data, such as Hardware Description Language (HDL), which defines structures, circuits, apparatuses, processors and/or system features described herein. Such examples may also be referred to as program products. Emulation (Including Binary Translation, Code Morphing, Etc.).

In some cases, an instruction converter may be used to convert an instruction from a source instruction set architecture to a target instruction set architecture. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 27 is a block diagram illustrating the use of a software instruction converter to convert binary instructions in a source ISA to binary instructions in a target ISA according to examples. In the illustrated example, the instruction converter is a software instruction converter, although alternatively the instruction converter may be implemented in software, firmware, hardware, or various combinations thereof. FIG. 27 shows a program in a high-level language 2702 may be compiled using a first ISA compiler 2704 to generate first ISA binary code 2706 that may be natively executed by a processor with at least one first ISA core 2716. The processor with at least one first ISA core 2716 represents any processor that can perform substantially the same functions as an Intel® processor with at least one first ISA core by compatibly executing or otherwise processing (1) a substantial portion of the first ISA or (2) object code versions of applications or other software targeted to run on an Intel® processor with at least one first ISA core, in order to achieve substantially the same result as a processor with at least one first ISA core. The first ISA compiler 2704 represents a compiler that is operable to generate first ISA binary code 2706 (e.g., object code) that can, with or without additional linkage processing, be executed on the processor with at least one first ISA core 2716. Similarly, FIG. 27 shows the program in the high-level language 2702 may be compiled using an alternative ISA compiler 2708 to generate alternative ISA binary code 2710 that may be natively executed by a processor without a first ISA core 2714. The instruction converter 2712 is used to convert the first ISA binary code 2706 into code that may be natively executed by the processor without a first ISA core 2714. This converted code is not necessarily to be the same as the alternative ISA binary code 2710; however, the converted code will accomplish the general operation and be made up of instructions from the alternative ISA. Thus, the instruction converter 2712 represents software, firmware, hardware, or a combination thereof that, through emulation, simulation or any other process, allows a processor or other electronic device that does not have a first ISA processor or core to execute the first ISA binary code 2706.

Techniques and architectures for coherency bypass tagging for read-shared data are described herein. In the above description, for purposes of explanation, numerous specific details are set forth in order to provide a thorough understanding of certain examples. It will be apparent, however, to one skilled in the art that certain examples can be practiced without these specific details. In other instances, structures and devices are shown in block diagram form in order to avoid obscuring the description

ADDITIONAL NOTES AND EXAMPLES

Example 1 includes an apparatus, comprising memory, two or more caches, and circuitry coupled to the memory and the two or more caches to selectively maintain coherency of data shared among the memory and the two or more caches based on coherency bypass information associated with the data.

Example 2 includes the apparatus of Example 1, wherein the circuitry is further to bypass a coherency operation for a copy of data stored in one of the two or more caches based on a value of a tag associated with the copy of data.

Example 3 includes the apparatus of Example 2, wherein the circuitry is further to evict a first instance of the copy of data from a first cache of the two or more caches in response to an eviction request, and quash an invalidation request for a second instance of the copy of data from a second cache of the two or more caches in response to the eviction request if the value of a tag associated with the first instance of the copy of data indicates that the coherency operation is to be bypassed.

Example 4 includes the apparatus of Example 3, wherein the circuitry is further to maintain a ghost copy of the second instance of the copy of data in the second cache in accordance with a local cache policy of the second cache, after the first instance is evicted from the first cache.

Example 5 includes the apparatus of any of Examples 1 to 4, wherein the circuitry is further to determine if a copy of data to be stored in one of the two or more caches is a candidate for coherency bypass, and set the value of a tag associated with the copy of data based on the determination.

Example 6 includes the apparatus of Example 5, wherein the circuitry is further to determine if the copy of data is a candidate for coherency bypass based on a hint from a software agent.

Example 7 includes the apparatus of any of Examples 5 to 6, wherein the circuitry is further to determine if the copy of data is a candidate for coherency bypass based on a hardware indication of whether the copy of data is read-shared among the two or more caches.

Example 8 includes the apparatus of Example 7, wherein the circuitry is further to monitor a pattern of hardware access for the copy of data, and determine if the copy of data is a candidate for coherency bypass based on the monitored pattern.

Example 9 includes the apparatus of Example 8, wherein the circuitry is further to set the value of the tag associated with the copy of data to indicate that a coherency operation is to be bypassed if the monitored pattern indicates that the copy of data is read-shared among the two or more caches.

Example 10 includes the apparatus of any of Examples 1 to 9, wherein the circuitry is further to transition respective states of all instances of a copy of data to selectively maintain coherency based on a hint from a software agent.

Example 11 includes the apparatus of any of Examples 1 to 10, wherein the circuitry is further to determine if a value of a tag associated with a copy of data to be modified indicates that the coherency operation is to be bypassed, and transition respective states of all instances of the copy of data to indicates that coherency is to be maintained for all instances of the copy of data to be modified.

Example 12 includes an apparatus comprising decoder circuitry to decode a single instruction, the single instruction to include a field for an identifier of a first source operand and a field for an opcode, the opcode to indicate execution circuitry is to update coherency bypass information, and execution circuitry to execute the decoded instruction according to the opcode to update coherency bypass information for data indicated by the first source operand.

Example 13 includes the apparatus of Example 12, wherein the field for the identifier of the first source operand is to identify a vector register.

Example 14 includes the apparatus of Example 12, wherein the field for the identifier of the first source operand is to identify a memory location.

Example 15 includes the apparatus of any of Examples 12 to 14, wherein the single instruction is further to include a field for an identifier of a second source operand to indicate a size of the data indicated by the first source operand.

Example 16 includes the apparatus of any of Examples 12 to 15, wherein the execution circuitry is further to execute the decoded instruction according to the opcode to set a field value according to the opcode for one or more linear address masks for the data indicated by the first source operand.

Example 17 includes the apparatus of any of Examples 12 to 16, wherein the execution circuitry is further to execute the decoded instruction according to the opcode to set a field value according to the opcode for one or more page table attributes for the data indicated by the first source operand.

Example 18 includes the apparatus of any of Examples 12 to 17, wherein the opcode indicates that the data indicated by the first source operand is to bypass a coherency operation, and wherein the execution circuitry is further to execute the decoded instruction according to the opcode to flush any modified data indicated by the first source operand from one or more caches, invalidate any shared data indicated by the first source operand, flush any translation look-aside buffer entries for data indicated by the first source operand, and set one or more tags associated with data indicated by the first source operand to indicate that copies of the data are to bypass the coherency operation.

Example 19 includes the apparatus of any of Examples 12 to 17, wherein the opcode indicates that the data indicated by the first source operand is to maintain coherency, and wherein the execution circuitry is further to execute the decoded instruction according to the opcode to invalidate any ghosted data indicated by the first source operand from one or more caches, invalidate any translation look-aside buffer entries for data indicated by the first source operand, and set one or more tags associated with data indicated by the first source operand to indicate that copies of the data are to maintain coherency.

Example 20 includes a method, comprising fetching an instruction having a field for an opcode and a field for an identifier of a first source operand, decoding the instruction, scheduling execution of the instruction, and executing the decoded instruction according to the opcode to update coherency bypass information for data indicated by the first source operand.

Example 21 includes the method of Example 20, wherein the field for the identifier of the first source operand is to identify a vector register.

Example 22 includes the method of Example 20, wherein the field for the identifier of the first source operand is to identify a memory location.

Example 23 includes the method of any of Examples 20 to 22, wherein the single instruction is further to include a field for an identifier of a second source operand to indicate a size of the data indicated by the first source operand.

Example 24 includes the method of any of Examples 20 to 23, further comprising executing the decoded instruction according to the opcode to set a field value according to the opcode for one or more linear address masks for the data indicated by the first source operand.

Example 25 includes the method of any of Examples 20 to 24, further comprising executing the decoded instruction according to the opcode to set a field value according to the opcode for one or more page table attributes for the data indicated by the first source operand.

Example 26 includes the method of any of Examples 20 to 25, wherein the opcode indicates that the data indicated by the first source operand is to bypass a coherency operation, further comprising executing the decoded instruction according to the opcode to flush any modified data indicated by the first source operand from one or more caches, invalidate any shared data indicated by the first source operand, flush any translation look-aside buffer entries for data indicated by the first source operand, and set one or more tags associated with data indicated by the first source operand to indicate that copies of the data are to bypass the coherency operation.

Example 27 includes the method of any of Examples 20 to 25, wherein the opcode indicates that the data indicated by the first source operand is to maintain coherency, further comprising executing the decoded instruction according to the opcode to invalidate any ghosted data indicated by the first source operand from one or more caches, invalidate any translation look-aside buffer entries for data indicated by the first source operand, and set one or more tags associated with data indicated by the first source operand to indicate that copies of the data are to maintain coherency.

Example 28 includes a method, comprising determining coherency bypass information associated with data, and selectively maintaining coherency of data shared among memory and two or more caches based on the determined coherency bypass information associated with the data.

Example 29 includes the method of Example 28, further comprising bypassing a coherency operation for a copy of data stored in one of the two or more caches based on a value of a tag associated with the copy of data.

Example 30 includes the method of Example 29, further comprising evicting a first instance of the copy of data from a first cache of the two or more caches in response to an eviction request, and quashing an invalidation request for a second instance of the copy of data from a second cache of the two or more caches in response to the eviction request if the value of a tag associated with the first instance of the copy of data indicates that the coherency operation is to be bypassed.

Example 31 includes the method of Example 30, further comprising maintaining a ghost copy of the second instance of the copy of data in the second cache in accordance with a local cache policy of the second cache, after the first instance is evicted from the first cache.

Example 32 includes the method of any of Examples 28 to 31, further comprising determining if a copy of data to be stored in one of the two or more caches is a candidate for coherency bypass, and setting the value of a tag associated with the copy of data based on the determination.

Example 33 includes the method of Example 32, further comprising determining if the copy of data is a candidate for coherency bypass based on a hint from a software agent.

Example 34 includes the method of any of Examples 32 to 33, further comprising determining if the copy of data is a candidate for coherency bypass based on a hardware indication of whether the copy of data is read-shared among the two or more caches.

Example 35 includes the method of Example 34, further comprising monitoring a pattern of hardware access for the copy of data, and determining if the copy of data is a candidate for coherency bypass based on the monitored pattern.

Example 36 includes the method of Example 35, further comprising setting the value of the tag associated with the copy of data to indicate that a coherency operation is to be bypassed if the monitored pattern indicates that the copy of data is read-shared among the two or more caches.

Example 37 includes the method of any of Examples 28 to 36, further comprising transitioning respective states of all instances of a copy of data to selectively maintain coherency based on a hint from a software agent.

Example 38 includes the method of any of Examples 28 to 37, further comprising determining if a value of a tag associated with a copy of data to be modified indicates that the coherency operation is to be bypassed, and transitioning respective states of all instances of the copy of data to indicates that coherency is to be maintained for all instances of the copy of data to be modified.

Example 39 includes at least one non-transitory one machine readable medium comprising a plurality of instructions that, in response to being executed on a computing device, cause the computing device to determine coherency bypass information associated with data, and selectively maintain coherency of data shared among memory and two or more caches based on the determined coherency bypass information associated with the data.

Example 40 includes the at least one non-transitory one machine readable medium of Example 39, comprising a plurality of further instructions that, in response to being executed on the computing device, cause the computing device to bypass a coherency operation for a copy of data stored in one of the two or more caches based on a value of a tag associated with the copy of data.

Example 41 includes the at least one non-transitory one machine readable medium of Example 40, comprising a plurality of further instructions that, in response to being executed on the computing device, cause the computing device to evict a first instance of the copy of data from a first cache of the two or more caches in response to an eviction request, and quash an invalidation request for a second instance of the copy of data from a second cache of the two or more caches in response to the eviction request if the value of a tag associated with the first instance of the copy of data indicates that the coherency operation is to be bypassed.

Example 42 includes the at least one non-transitory one machine readable medium of Example 41, comprising a plurality of further instructions that, in response to being executed on the computing device, cause the computing device to maintain a ghost copy of the second instance of the copy of data in the second cache in accordance with a local cache policy of the second cache, after the first instance is evicted from the first cache.

Example 43 includes the at least one non-transitory one machine readable medium of any of Examples 39 to 42, comprising a plurality of further instructions that, in response to being executed on the computing device, cause the computing device to determine if a copy of data to be stored in one of the two or more caches is a candidate for coherency bypass, and set the value of a tag associated with the copy of data based on the determination.

Example 44 includes the at least one non-transitory one machine readable medium of Example 43, comprising a plurality of further instructions that, in response to being executed on the computing device, cause the computing device to determine if the copy of data is a candidate for coherency bypass based on a hint from a software agent.

Example 45 includes the at least one non-transitory one machine readable medium of any of Examples 43 to 44, comprising a plurality of further instructions that, in response to being executed on the computing device, cause the computing device to determine if the copy of data is a candidate for coherency bypass based on a hardware indication of whether the copy of data is read-shared among the two or more caches.

Example 46 includes the at least one non-transitory one machine readable medium of Example 45, comprising a plurality of further instructions that, in response to being executed on the computing device, cause the computing device to monitor a pattern of hardware access for the copy of data, and determine if the copy of data is a candidate for coherency bypass based on the monitored pattern.

Example 47 includes the at least one non-transitory one machine readable medium of Example 46, comprising a plurality of further instructions that, in response to being executed on the computing device, cause the computing device to set the value of the tag associated with the copy of data to indicate that a coherency operation is to be bypassed if the monitored pattern indicates that the copy of data is read-shared among the two or more caches.

Example 48 includes the at least one non-transitory one machine readable medium of any of Examples 39 to 47, comprising a plurality of further instructions that, in response to being executed on the computing device, cause the computing device to transition respective states of all instances of a copy of data to selectively maintain coherency based on a hint from a software agent.

Example 49 includes the at least one non-transitory one machine readable medium of any of Examples 39 to 48, comprising a plurality of further instructions that, in response to being executed on the computing device, cause the computing device to determine if a value of a tag associated with a copy of data to be modified indicates that the coherency operation is to be bypassed, and transition respective states of all instances of the copy of data to indicates that coherency is to be maintained for all instances of the copy of data to be modified.

Example 50 includes an apparatus, comprising means for determining coherency bypass information associated with data, and means for selectively maintaining coherency of data shared among memory and two or more caches based on the determined coherency bypass information associated with the data.

Example 51 includes the apparatus of Example 80, further comprising means for bypassing a coherency operation for a copy of data stored in one of the two or more caches based on a value of a tag associated with the copy of data.

Example 52 includes the apparatus of Example 51, further comprising means for evicting a first instance of the copy of data from a first cache of the two or more caches in response to an eviction request, and means for quashing an invalidation request for a second instance of the copy of data from a second cache of the two or more caches in response to the eviction request if the value of a tag associated with the first instance of the copy of data indicates that the coherency operation is to be bypassed.

Example 53 includes the apparatus of Example 52, further comprising means for maintaining a ghost copy of the second instance of the copy of data in the second cache in accordance with a local cache policy of the second cache, after the first instance is evicted from the first cache.

Example 54 includes the apparatus of any of Examples 50 to 53, further comprising means for determining if a copy of data to be stored in one of the two or more caches is a candidate for coherency bypass, and means for setting the value of a tag associated with the copy of data based on the determination.

Example 55 includes the apparatus of Example 54, further comprising means for determining if the copy of data is a candidate for coherency bypass based on a hint from a software agent.

Example 56 includes the apparatus of any of Examples 54 to 55, further comprising means for determining if the copy of data is a candidate for coherency bypass based on a hardware indication of whether the copy of data is read-shared among the two or more caches.

Example 57 includes the apparatus of Example 56, further comprising means for monitoring a pattern of hardware access for the copy of data, and means for determining if the copy of data is a candidate for coherency bypass based on the monitored pattern.

Example 58 includes the apparatus of Example 57, further comprising means for setting the value of the tag associated with the copy of data to indicate that a coherency operation is to be bypassed if the monitored pattern indicates that the copy of data is read-shared among the two or more caches.

Example 59 includes the apparatus of any of Examples 50 to 58, further comprising means for transitioning respective states of all instances of a copy of data to selectively maintain coherency based on a hint from a software agent.

Example 60 includes the apparatus of any of Examples 50 to 59, further comprising means for determining if a value of a tag associated with a copy of data to be modified indicates that the coherency operation is to be bypassed, and means for transitioning respective states of all instances of the copy of data to indicates that coherency is to be maintained for all instances of the copy of data to be modified.

Example 61 includes an apparatus, comprising a processor coupled to at least a first cache and a second cache, and circuitry coupled to the first and second caches to selectively maintain coherency of data shared among a memory and the first and second caches based on coherency bypass information associated with the data.

Example 62 includes the apparatus of Example 61, wherein the circuitry is further to bypass a coherency operation for a copy of data stored in one of the first and second caches based on a value of a tag associated with the copy of data.

Example 63 includes the apparatus of Example 62, wherein the circuitry is further to evict a first instance of the copy of data from the first cache in response to an eviction request, and quash an invalidation request for a second instance of the copy of data from the second cache in response to the eviction request if the value of a tag associated with the first instance of the copy of data indicates that the coherency operation is to be bypassed.

Example 64 includes he apparatus of Example 63, wherein the circuitry is further to maintain a ghost copy of the second instance of the copy of data in the second cache in accordance with a local cache policy of the second cache, after the first instance is evicted from the first cache.

Example 65 includes the apparatus of any of Examples 61 to 64, wherein the circuitry is further to determine if a copy of data to be stored in one of the first and second caches is a candidate for coherency bypass, and set the value of a tag associated with the copy of data based on the determination.

Example 66 includes the apparatus of Example 65, wherein the circuitry is further to determine if the copy of data is a candidate for coherency bypass based on a hint from a software agent.

Example 67 includes the apparatus of any of Examples 65 to 66, wherein the circuitry is further to determine if the copy of data is a candidate for coherency bypass based on a hardware indication of whether the copy of data is read-shared among the first and second caches.

Example 68 includes the apparatus of Example 67, wherein the circuitry is further to monitor a pattern of hardware access for the copy of data, and determine if the copy of data is a candidate for coherency bypass based on the monitored pattern.

Example 69 includes the apparatus of any of Examples 61 to 69, further comprising the memory and wherein the circuitry is further coupled to the memory.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" or "A, B, and/or C" is intended to be understood to mean either A, B, or C, or any combination thereof (e.g. A and B, A and C, B and C, and A, B and C).

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain examples also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMS, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain examples are not described with reference to any particular programming language. It will be appreciated that a variety of programming languages may be used to implement the teachings of such examples as described herein.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. An apparatus comprising:

decoder circuitry to decode a single instruction to generate a decoded instruction, wherein the single instruction is to comprise:

a first field which is to provide an indication of a first source operand; and a second field which is to provide an opcode; and execution circuitry coupled to the decoder circuitry, the execution circuitry to execute the decoded instruction according to the opcode to update coherency bypass information, comprising the execution circuitry to:

perform an access to a parameter which is to correspond to a location of data indicated by the first source operand, the access to set the parameter to either of a first value or a second value, wherein:

the first value is to indicate:

that a load accessibility to a first copy of the data is enabled;

that a store accessibility to the first copy of the data is enabled; and that, where a first invalidation of the first copy of the data is detected, a second invalidation of a second copy of the data is to be permitted; and the second value is to indicate:

that the load accessibility to the first copy of the data is enabled;

that the store accessibility to the first copy of the data is disabled; and that, where the first invalidation of the first copy of the data is detected, the second invalidation of the second copy of the data is to be quashed; and return an identifier of a pointer to the location.

2. The apparatus of claim 1, wherein the first field is to identify a vector register.

3. The apparatus of claim 1, wherein the first field is to identify a memory location.

4. The apparatus of claim 1, wherein the single instruction is further to include a third field which is to provide an identifier of a second source operand to indicate a size of the data indicated by the first source operand.

5. The apparatus of claim 1, wherein the pointer is to be accessible by any of multiple threads or by any of multiple processor cores.

6. The apparatus of claim 1, wherein the execution circuitry is to execute the decoded instruction according to the opcode to update an entry of a page attribute table.

7. A method, comprising:

fetching a single instruction-having which comprises:

a first field which provides an opcode; and a second field which provides an identifier of a first source operand;

decoding the single instruction to generate a decoded instruction;

scheduling execution of the decoded instruction; and executing the decoded instruction according to the opcode to update coherency bypass information, comprising:

performing an access to a parameter which corresponds to a location of data indicated by the first source operand, wherein the access sets the parameter to one of a first value or a second value, wherein:

the first value indicates:

that a load accessibility to a first copy of the data is enabled;

that a store accessibility to the first copy of the data is enabled; and that, where a first invalidation of the first copy of the data is detected, a second invalidation of a second copy of the data is to be permitted; and the second value indicates:

that the load accessibility to the first copy of the data is enabled;

that the store accessibility to the first copy of the data is disabled; and that, where the first invalidation of the first copy of the data is detected, the second invalidation of the second copy of the data is to be quashed; and returning an identifier of a pointer to the location.

8. The method of claim 7, wherein the single instruction further comprises a third field which provides an identifier of a second source operand to indicate a size of the data indicated by the first source operand.

9. The method of claim 7, wherein the pointer is accessible by any of multiple threads or by any of multiple processor cores.

10. The method of claim 7, wherein executing the decoded instruction according to the opcode comprises updating an entry of a page attribute table.

11. The method of claim 7, wherein executing the decoded instruction according to the opcode comprises:

flushing any modified copies of the data indicated by the first source operand from one or more caches;

invalidating any shared copies of the data indicated by the first source operand;

flushing any translation look-aside buffer entries which each comprise a respective copy of the data indicated by the first source operand; and transitioning the parameter from the first value to the second value.

* * * * *